(12) United States Patent
Katchinoff et al.

(10) Patent No.: US 11,964,233 B2
(45) Date of Patent: Apr. 23, 2024

(54) SYSTEMS AND METHODS FOR CARBON SEQUESTRATION USING ENHANCED WEATHERING

(71) Applicant: YALE UNIVERSITY, New Haven, CT (US)

(72) Inventors: Joachim Katchinoff, New Haven, CT (US); Noah Planavsky, New Haven, CT (US); Jacob Jordan, Lawrence, KS (US); Dean Takahashi, New Haven, CT (US); Sinead Crotty, New Haven, CT (US); Justin Freiberg, New Haven, CT (US)

(73) Assignee: YALE UNIVERSITY, New Haven, CT (US)

( * ) Notice: Subject to any disclaimer, the term of this patent is extended or adjusted under 35 U.S.C. 154(b) by 0 days.

(21) Appl. No.: 18/298,149

(22) Filed: Apr. 10, 2023

(65) Prior Publication Data
US 2023/0302404 A1    Sep. 28, 2023

Related U.S. Application Data

(63) Continuation of application No. PCT/US2022/075770, filed on Aug. 31, 2022.

(60) Provisional application No. 63/239,044, filed on Aug. 31, 2021.

(51) Int. Cl.
*B01D 53/62*    (2006.01)
*B01D 53/02*    (2006.01)
(Continued)

(52) U.S. Cl.
CPC .......... *B01D 53/62* (2013.01); *B01D 53/025* (2013.01); *B01D 53/1406* (2013.01);
(Continued)

(58) Field of Classification Search
CPC ..... B01D 53/62; B01D 2257/504; C02F 1/20; C02F 1/66; C02F 1/688; C02F 5/083;
(Continued)

(56) References Cited

U.S. PATENT DOCUMENTS 3,972,965 A  8/1976 Higgins
5,914,046 A  6/1999 Watten
(Continued)

OTHER PUBLICATIONS

International Search Report and Written Opinion issued for PCT Application No. PCT/US2022/075770 dated Jan. 17, 2023.

*Primary Examiner* — Anita Nassiri-Motlagh
(74) *Attorney, Agent, or Firm* — Saul Ewing LLP; Kathryn Doyle; Domingos J. Silva

(57) ABSTRACT

The present disclosure relates, in part, to enhanced weathering systems and/or apparatuses and methods of use thereof. In one aspect, the present disclosure provides a method of at least partially sequestering $CO_2$ from an influent aqueous solution comprising aqueous and/or gaseous $CO_2$. In another aspect, the present disclosure provides a method of at least partially sequestering $CO_2$ from a gaseous $CO_2$ source. In another aspect, the present disclosure provides systems and/or apparatuses suitable for use in the methods described herein. In another aspect, the present disclosure provides a method of optimizing the design and operation of a system for at least partial sequestration of $CO_2$ from a water source.

20 Claims, 28 Drawing Sheets

(51) Int. Cl.
- *B01D 53/14* (2006.01)
- *C02F 1/00* (2023.01)
- *C02F 1/20* (2023.01)
- *C02F 1/28* (2023.01)
- *C02F 1/66* (2023.01)
- *C02F 1/68* (2023.01)
- *C02F 5/08* (2023.01)

(52) U.S. Cl.
CPC ..... *B01D 53/1412* (2013.01); *B01D 53/1475* (2013.01); *B01D 53/1493* (2013.01); *C02F 1/001* (2013.01); *C02F 1/20* (2013.01); *C02F 1/281* (2013.01); *C02F 1/66* (2013.01); *C02F 1/688* (2013.01); *C02F 5/083* (2013.01); *B01D 2252/103* (2013.01); *B01D 2253/106* (2013.01); *B01D 2253/1124* (2013.01); *B01D 2253/304* (2013.01); *B01D 2257/504* (2013.01); *C02F 2209/06* (2013.01); *C02F 2209/07* (2013.01); *C02F 2209/11* (2013.01); *C02F 2209/24* (2013.01)

(58) Field of Classification Search
CPC .............. C02F 2209/06; C02F 2209/07; C02F 2209/11; C02F 2209/24

USPC ........................................................ 423/225

See application file for complete search history.

(56) References Cited

U.S. PATENT DOCUMENTS

| | | |
|---|---|---|
| 6,890,497 B2 | 5/2005 | Rau et al. |
| 7,491,322 B1 | 2/2009 | Sibrell |
| 8,247,009 B2 | 8/2012 | Datta et al. |
| 10,456,744 B2 | 10/2019 | Park et al. |
| 2001/0022952 A1 | 9/2001 | Rau et al. |
| 2001/0051844 A1 | 12/2001 | Prober |
| 2007/0114178 A1 | 5/2007 | Coppola et al. |
| 2010/0083828 A1 | 4/2010 | Duncan et al. |
| 2011/0070137 A1 | 3/2011 | Brock et al. |
| 2013/0171720 A1 | 7/2013 | McKenna et al. |
| 2013/0209339 A1 | 8/2013 | Park et al. |
| 2015/0044757 A1 | 2/2015 | Park et al. |
| 2015/0132207 A1 | 5/2015 | Tanaka et al. |
| 2016/0177344 A1 | 6/2016 | Subhas et al. |
| 2016/0319991 A1 | 11/2016 | Caldeira et al. |
| 2017/0106330 A1 | 4/2017 | Gebald et al. |
| 2020/0129916 A1 | 4/2020 | Constantz et al. |
| 2021/0121826 A1 | 4/2021 | Kolodji |
| 2022/0176310 A1 | 6/2022 | Suter et al. |
| 2022/0332655 A1 | 10/2022 | Keulen et al. |
| 2022/0347650 A1 | 11/2022 | Kelemen et al. |
| 2023/0312374 A1 | 10/2023 | Takahashi et al. |

SYSTEMS AND METHODS FOR CARBON SEQUESTRATION USING ENHANCED WEATHERING

CROSS-REFERENCE TO RELATED APPLICATIONS

This application is a continuation of, and claims priority to, PCT International Patent Application No. PCT/US2022/075770, filed Aug. 31, 2022, which claims priority under 35 U.S.C. § 119(e) to U.S. Provisional Application No. 63/239,044, filed Aug. 31, 2021, all of which are hereby incorporated herein by reference in their entireties.

BACKGROUND

Natural chemical weathering of rocks results in the sequestration of approximately 1.1 billion tons of carbon dioxide ($CO_2$) annually. By crushing minerals and/or rocks (e.g., silicates and/or carbonates) into fine particles and applying to land or aquatic systems, this natural process can be dramatically enhanced to promote consumption of atmospheric $CO_2$ during mineral dissolution accompanied by a release of mineral dissolution products (e.g., alkalinity, Si, Ca, Mg, Fe, and Ni, inter alia).

Research into enhanced weathering (EW) has largely been focused on applying crushed minerals and/or rocks in tropical agricultural settings, with optimistic cost estimates of $80-$180 per ton of captured $CO_2$. However, fundamental questions remain about the efficacy, cost, safety, and verification strategies for the application of EW in various settings.

Thus, there is a need in the art for systems and/or apparatuses for enhanced weathering, and methods of use thereof. The present disclosure addresses this need.

BRIEF SUMMARY

In one aspect, the present disclosure provides a method of at least partially sequestering $CO_2$ from an influent aqueous solution comprising aqueous and/or gaseous $CO_2$. In certain embodiments, the method comprises (a) measuring in the influent aqueous solution comprising dissolved aqueous and/or gaseous $CO_2$, at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g). In certain embodiments, the method comprises (b) feeding the influent aqueous solution through at least one container comprising a mineral feedstock, wherein the mineral feedstock comprises at least one selected from the group consisting of a metal silicate, a metal carbonate, and a metal oxide. In certain embodiments, the method comprises (c) contacting the influent aqueous solution with the mineral feedstock to provide an effluent aqueous solution comprising one or more metal ions and/or carbonate ions dissolved therein. In certain embodiments, the method comprises (d) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g). In certain embodiments, the method comprises (e) comparing the at least two measured parameters of the influent aqueous solution and the at least two measured parameters of the effluent aqueous solution to calculate a change in dissolved $CO_2$ concentration. In certain embodiments, the method comprises (f) modifying at least one parameter of the influent aqueous solution and/or contacting step if the change comprises a decrease in dissolved $CO_2$ concentration of less than about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%.

In another aspect, the present disclosure provides an aqueous solution treatment system. In certain embodiments, the treatment system comprises (a) an influent aqueous solution inlet connected to a container by an optionally sealable junction. In certain embodiments, the container comprises at least one optionally sealable inlet suitable for addition of at least one acidifying agent to an aqueous solution contained therein. In certain embodiments, the container is suitable to contain a mineral feedstock, wherein the mineral feedstock comprises at least one selected from the group consisting of a metal silicate, a metal carbonate, and a metal oxide. In certain embodiments, the treatment system comprises (b) an effluent aqueous solution outlet connected to the container by an optionally sealable junction. In certain embodiments, each container is equipped with at least two sensors suitable to measure at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g), and optionally further suitable to measure at least one parameter of an aqueous solution contained therein selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration. In certain embodiments, the dissolved metal is optionally at least one metal selected from the group consisting of calcium, magnesium, nickel, iron, cobalt, chromium. In certain embodiments, the dissolved non-metal is optionally at least one non-metal or metalloid selected from the group consisting of phosphorus and silica. In certain embodiments, each of the at least two sensors are positioned within the container at different distances from the inlet junction and/or outlet junction. In certain embodiments, the treatment system comprises (c) a means for comparing the at least two measured parameters at two of the at least two sensors in the container to calculate a change in dissolved $CO_2$ concentration. In certain embodiments, the means for comparing comprises using at least two sensors suitable to measure at least two parameters selected from the group consisting of pH, alkalinity, dissolved $CO_2$ concentration, dissolved inorganic carbon concentration, bicarbonate ion concentration, carbonate ion concentration, and partial pressure of $CO_2$ in the influent and effluent and comparing the two results. In certain embodiments, the comparing is performed using computer software.

In certain embodiments, the treatment system comprises a means for controlling the change in dissolved $CO_2$ concentration. In certain embodiments, the means for controlling comprises addition of an acidifying agent. In certain embodiments, the means for controlling comprises aeration. In certain embodiments, the means for controlling comprises agitation. In certain embodiments, the means for controlling comprises increasing the partial pressure of $CO_2$.

In another aspect, the present disclosure provides a method of at least partially sequestering $CO_2$ from a gaseous $CO_2$ source. In certain embodiments, the method comprises (a) providing an optionally compressed gas stream comprising $CO_2$ at a concentration ranging from about 1% (v/v) to about 100% (v/v). In certain embodiments, the method comprises (b) feeding the compressed gas stream into an influent aqueous solution to provide a second influent aqueous solution comprising $CO_2$. In certain embodiments, the method comprises (c) measuring in the second influent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g). In certain embodiments, the method comprises (d) feeding the second influent aqueous solution into at least one container comprising a mineral feedstock, wherein the mineral feedstock is selected from the group consisting of a metal silicate, a metal carbonate, and a metal oxide, and combinations thereof. In certain embodiments, the method comprises (e) contacting the second influent aqueous solution and the mineral feedstock in the container to form an effluent aqueous solution. In certain embodiments, the method comprises (f) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g). In certain embodiments, the method comprises (g) comparing the at least two measured parameters of the second influent aqueous solution and the at least two measured parameters of the effluent aqueous solution to calculate a change in dissolved $CO_2$ concentration. In certain embodiments, the method comprises (h) modifying at least one parameter of the influent aqueous solution and/or contacting step if the change comprises a decrease in dissolved $CO_2$ concentration of less than about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%.

In another aspect, the present disclosure provides a method of optimizing the design and operation of a system for at least partial sequestration of $CO_2$ from a water source. In certain embodiments, the method comprises (a) determining values for at least two parameters of the water source. In certain embodiments, the method comprises (b) determining at least one parameter related to selecting, transporting, and procuring at least one mineral feedstock, wherein the at least one mineral feedstock comprises a metal silicate, a metal carbonate, and a metal oxide, or any combination thereof. In certain embodiments, the method comprises (c) performing a geospatial information systems (GIS) transport network analysis of the at least one parameter related to selecting, transporting, and procuring the at least one mineral feedstock. In certain embodiments, the method comprises (d) calculating a weathering model (also referred to as reactive transport model) of the at least two parameters of the water source and the GIS transport network analysis results. In certain embodiments, the method comprises (e) designing and operating an aqueous solution treatment system comprising at least one container for at least partially sequestering $CO_2$ from the source of water according to an output of the weathering model.

BRIEF DESCRIPTION OF THE FIGURES

The drawings illustrate generally, by way of example, but not by way of limitation, various embodiments of the present application.

FIG. 25A represents measured data from an experiment of the present disclosure conducted with medium-grained dolomitic limestone with a mean grain size of 200 μm. FIG. 25B represents an experiment conducted with fine-grained olivine with a mean grain size of <63 μm.

DETAILED DESCRIPTION

Figure 1:
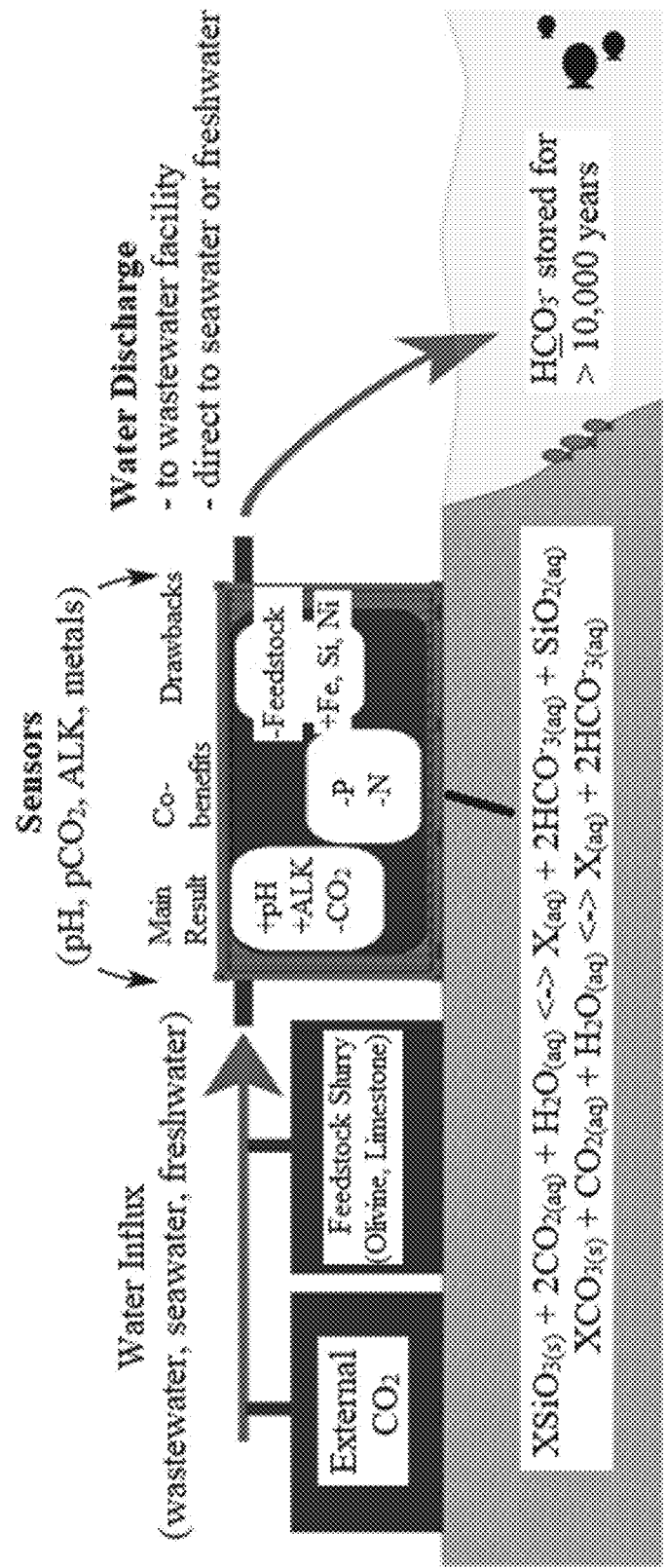
FIG. 1 depicts a schematic of an exemplary enhanced weathering system of the present disclosure. The schematic provides a conceptual overview of deployment of a containerized enhanced weathering unit. An influent aqueous solution flows into the containerized unit and a mineral feedstock slurry is further introduced. Inside the treatment vessel are one or more reactors which mix the water and feedstock, thereby permitting the weathering reaction to occur. During this process, feedstock dissolves, increasing pH and alkalinity, thereby producing bicarbonate from $CO_2$. An array of sensors, which can be positioned at the front and back ends of the unit, measure various parameters of the aqueous solution contained therein upon entry and exit, providing a high level of $CO_2$ removal confidence, while also monitoring the release of major or trace elements during enhanced weathering. Once the treated water reaches a pH of 7-8 it can be discharged.

It has been surprisingly and unexpectedly discovered that when certain types, particle sizes, and surface areas of silicate and/or carbonate minerals and/or metal oxides are containerized in certain inventive process configurations, they may be used to efficiently capture large quantities of carbon dioxide from an aqueous solution by reacting with the $CO_2$ contained therein to form bicarbonate ions. Specifically, it has been discovered that the inventive systems and/or apparatuses described herein, and methods of use thereof utilizing certain containerized metal silicate and/or metal carbonate minerals and/or metal oxides for sequestering carbon dioxide from aqueous solutions yield unexpected and surprising decreases in dissolved $CO_2$ concentration between the influent aqueous solution entering the container and the effluent aqueous solution discharged from the container. The present disclosure thus provides inventive systems and/or apparatuses, and methods of use thereof, for sequestering $CO_2$ utilizing naturally occurring compositions. There has been a long felt need for these presently disclosed inventive systems and/or apparatuses, and methods of use thereof utilizing these naturally occurring compositions for helping to combat global warming due to increasing concentrations of atmospheric $CO_2$.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

DESCRIPTION

To prevent average global warming from exceeding 2° C., or even 1.5° C., greenhouse gas (GHG) removal is seen as necessary given the continued global increase in emissions (59.1±5.9 Gt CO2e in 2019, including land-use change) and reliance on fossil fuels, which accounts for 65% of total emissions. If warming exceeds this 2° C. threshold, dangerous consequences have been predicted such as threats to food and water security, ecosystem degradation, and many other environmental and socio-economic impacts. This has motivated research into a range of negative emissions technologies (NETs).

One of the major pathways for carbon cycling and removal on Earth is through weathering of silicate rocks—leading to permanent carbon capture on geologic timescales—and through weathering of carbonate rocks—leading to carbon capture on timescales of ~10,000 years. Carbon dioxide in the atmosphere or from alternative sources such as organic matter degradation, will naturally equilibrate with water on Earth. $CO_2$ rapidly equilibrates with water, at a proportion following Henry's Law:

$$CO_{2(g)} \leftrightarrow CO_{2(aq)} \quad (Eq\ 1)$$

The amount of $CO_2$ that will dissolve into water is proportional to the partial pressure of the gas in the system. When more $CO_2$ is added to the system, more will dissolve, forming the weak acid, carbonic acid, which will reduce the pH of the water:

(Eq 2)

Depending on the chemistry of the water, the species of carbon will be portioned as carbonic acid, bicarbonate, and carbonate ion:

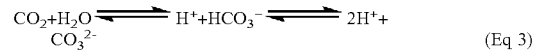
(Eq 3)

These carbon species can then be related by four equations:

$$ALK=[HCO_3^-]+[2CO_3^{2-}]-[H^+] \quad (Eq\ 4)$$

$$DIC=[CO_2]+[HCO_3^-]+[CO_3^{2-}] \quad (Eq\ 5)$$

$$K1=[HCO_3^-][H^+]/[CO_2] \quad (Eq\ 6)$$

$$K2=[CO_3^{2-}][H^+]/[HCO_3^-] \quad (Eq\ 7)$$

which, with assumptions about dissociation constants ($K_1$ and $K_2$), temperature, salinity, and pressure, can be solved if two parameters are known or measured.

Carbonic acid reacts with naturally occurring rocks according to Equations 8-9:

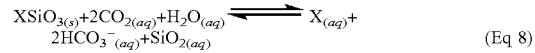
(Eq 8)

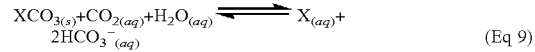
(Eq 9)

where X represents a divalent cation (e.g., $Ca^{2+}$, $Mg^{2+}$, $Fe^{2+}$). Feedstock dissolution or weathering rates (R), and therefore $CO_2$ capture, can be quantified as:

$$R=K*SSA*m*(1-\Omega)^n*a^p \quad (Eq\ 10)$$

wherein R is dissolution rate, k is the rate constant in mol/cm²/s, SSA is the specific surface area (cm²/g), m is mass of the feedstock (g), Q is the saturation threshold, a is the activity of promoting or inhibiting species in the fluid (such as $H^+$ ions, i.e., pH), and n and p are the reaction orders. Most weathering rates are highly dependent on pH; for example, olivine dissolution rates are multiple orders of magnitude larger at low pH than at high pH.

During this weathering process, the rock is dissolved, transforming carbonic acid into the bicarbonate ion ($HCO_3^-$), in which carbon is trapped or stored and can no longer easily equilibrate with the atmosphere. These dissolved ions will eventually reach the oceans via river water or groundwater, where the carbon in bicarbonate will be trapped for >10,000 years as it cycles through the oceans. This pathway for carbon dioxide removal (CDR), via enhanced weathering, represents a method of carbon sequestration.

Natural chemical weathering of rocks results in the capture of approximately 1.1 billion tons of carbon dioxide ($CO_2$) annually. By crushing minerals and/or rocks (e.g., silicates and/or carbonates) into fine particles and applying to land or aquatic systems, this natural process can be dramatically enhanced to promote consumption of atmospheric $CO_2$ during mineral dissolution accompanied by a release of mineral dissolution products (e.g., alkalinity, Si, Ca, Mg, Fe, and Ni, inter alia).

To achieve significant CDR, as described herein, an enhanced weathering strategy has been employed to develop engineered containerized reactors. In this modular framework, mineral feedstocks are dissolved in one or more reactors (e.g., fluidized bed reactors, batch reactors, fixed-bed reactors, etc.), consuming acidity from dissolved $CO_2$ and/or other sources (FIG. 1). Thus, in one aspect, the present disclosure describes enhanced weathering systems and methods of use thereof.

Carbon Dioxide Removal (CDR)

Figure 2:
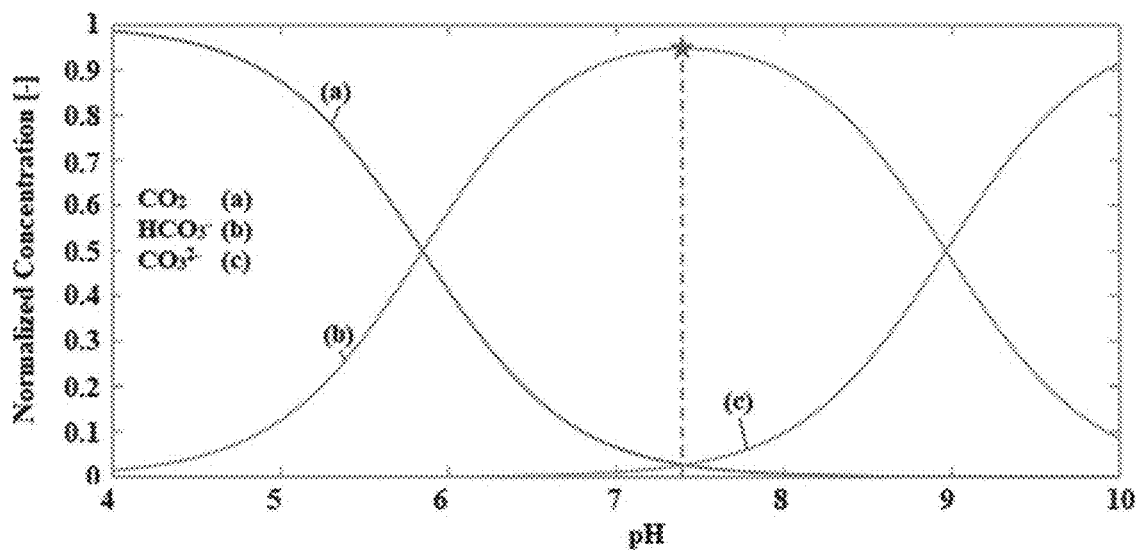
FIG. 2 provides a speciation calculation showing that $HCO_3$ becomes the dominant aqueous form of dissolved inorganic carbon at pH~7 under standard temperature and pressure conditions.

$CO_2$ dissolved in water takes the form of carbonic acid (Eq. 1-7). As the amount of $CO_2$ dissolved in water increases, the acidity increases. Upon interaction with the acidic water the feedstock contained in the reactor columns begins to dissolve (Eq. 8-9). The dissolution of the feedstock results in the release of positively charged ions and the reportioning of carbonic acid into negatively charged dissolved bicarbonate ion (FIG. 2). Thus, the dissolution of feedstock provides stoichiometric conversion of dissolved $CO_2$ to bicarbonate thereby storing the carbon in a dissolved mineral phase that is stable for approximately 10,000 years or greater.

Deployment Strategy—Municipal and/or Industrial Wastewater

Weathering on land is limited by the availability of both minerals for dissolution as well as water given the weathering reaction occurs only in aqueous solutions. Thus, in one aspect, the vast quantities of wastewater represent a desirable target for the enhanced weathering methods of the present disclosure. Globally, about 95 trillion gallons of wastewater are produced annually, with the U.S. accounting for approximately 20%. Wastewater infrastructure in the U.S. channelizes and concentrates large volumes of water to discrete locations for treatment which can be leveraged to facilitate carbon capture rapidly through enhanced weathering.

Wastewaters can be considered ideal for enhanced weathering, given the periodically low pH of the water (i.e., high $CO_2$ content) and low concentrations of other chemical constituents that could cause the $CO_2$ to be released. Organic matter degradation, which occurs in significant amounts in municipal wastewaters releases $CO_2$ and is summarized by the equation:

$$CH_3COOH_{(aq)} + 2H_2O \rightarrow 8H^+ + 2CO_2 + 8e^- \quad (Eq\ 11)$$

Additionally, most wastewater treatment facilities aerate the wastewater by pumping large amounts of air from the atmosphere, which adds additional atmospheric $CO_2$ into the wastewaters. Furthermore, municipal wastewater systems can generate acidic, $CO_2$-rich effluent, primarily resulting from sludge incineration. As organic matter sludge is incinerated, a portion of the influent waters are used to quench the $CO_2$-rich exhaust, dissolving large amounts of $CO_2$ into the waters, producing large volumes of highly acidic effluent.

Figure 3:
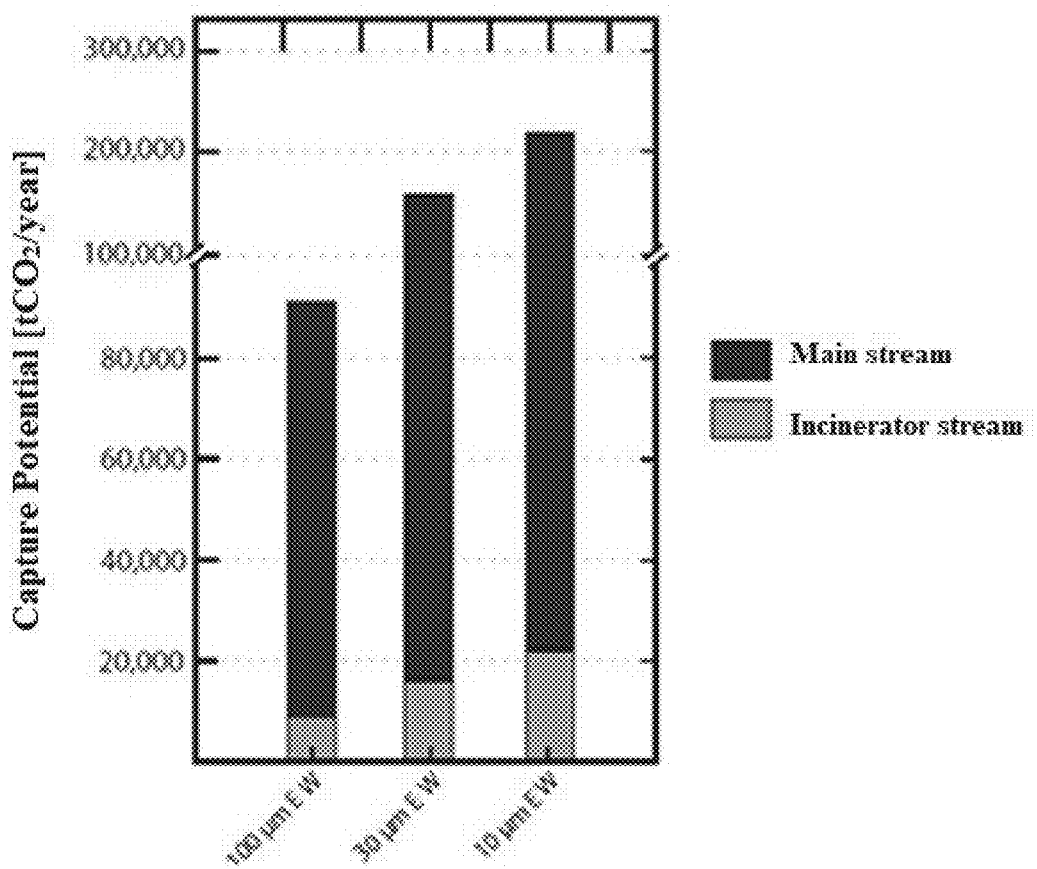
FIG. 3 provides a bar graph depicting modeled results of the present disclosure for a municipal wastewater treatment facility using an embodiment of the enhanced weathering system of the present disclosure, wherein a type of olivine (i.e., forsterite) is used as a mineral feedstock at 100 µm, 30 µm, and 10 µm particle sizes. Capture using the main municipal flow stream and/or incinerator flow streams are indicated.

For example, a wastewater treatment facility can produce >1.5 million gallons per day at a pH of 3-3.5 from its incineration quenching process. Approximately 15% of all US sludge is incinerated, with larger proportions of sludge incineration occurring in Europe, with Germany incinerating >70% of all sludge. As summarized by Eqs. 1 and 2, these sources of $CO_2$ can be captured via the enhanced weathering apparatuses and methods described herein, by conversion to bicarbonate (FIG. 3).

In certain embodiments with carbon capture from ambient air and enrichment from organic matter degradation in wastewaters, the system and/or apparatus of the present disclosure is configured to capture >1 gigatons of $CO_2$ annually in the USA alone if all wastewater sites adopted this system. In certain embodiments, the system and/or apparatus may be used to decrease nutrient load of municipal and industrial wastewaters for the benefit of downstream aquatic ecosystems.

Deployment Strategy—Carbon Capture with External $CO_2$ Source

Because mineral reaction rates (and thus $CO_2$ capture rates) are orders of magnitude faster at low pH, equilibrating extra $CO_2$ with an influent aqueous solution can be a means of producing water streams that are conducive for enhanced weathering as a form of carbon dioxide removal. The pH of aqueous solutions equilibrated with $CO_2$ can be calculated using the Henderson-Hasselbalch equation:

$$pH = pK + \log([HCO_3^-]/[H_2CO_3]) \quad (Eq\ 12)$$

Figure 4:
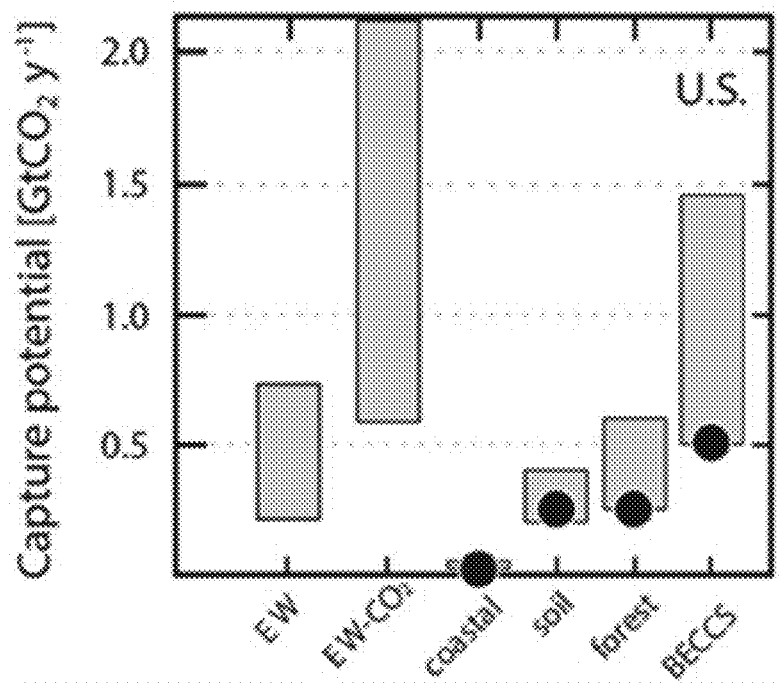
FIG. 4 depicts carbon dioxide capture potential for U.S. municipal wastewater systems and U.S. municipal systems optimized with $CO_2$-charged water (EW-$CO_2$). Capture potential is compared to estimates for a range of other negative emissions technologies in the U.S. Boxes show ranges for estimated carbon capture potential, while filled circles show high confidence estimates. For EW, lower-bound estimates reflect a conservative wastewater and feedstock composition, while upper-bound estimates assume an increase in the total volume of low pH wastewater and more reactive particle sizes. For EW-$CO_2$, lower-bound estimates reflect a conservative use of $CO_2$-fluid optimization and feedstock composition, while upper-bound estimates assume tripling of $CO_2$-fluid optimization and more reactive particle sizes.

In certain embodiments, application of Eq 12 permits estimation of the quantity of $CO_2$ in water with a certain alkalinity to achieve a desired pH. Thus, by adding $CO_2$ from an external source (e.g., $CO_2$ captured from traditional point sources, direct air capture techniques, and/or organic matter incineration) to an aqueous solution, and feeding that into one or more of the apparatuses and/or systems described herein, the $CO_2$ capture capacity can be drastically increased (FIG. 4).

Aqueous Solution Sources (i.e., Influent Sources)

In certain embodiments, the apparatuses and/or systems, and methods of use thereof, described herein for enhanced weathering comprise the use of an aqueous solution comprising dissolved $CO_2$. In certain embodiments, the dissolved $CO_2$ is introduced into an aqueous solution from an external source. In certain embodiments, the aqueous solution naturally comprises dissolved $CO_2$. In certain embodiments, the aqueous solution comprising dissolved $CO_2$ is derived from at least one selected from the group consisting of municipal wastewater, industrial wastewater, rainwater, river water, lake water, freshwater, tap water, runoff, storm water, groundwater, and seawater. Properties and/or characteristics of non-limiting examples of aqueous solutions are provided herein (Table 1).

TABLE 1

| | | | Selected properties of various aqueous solutions | | | | |
|---|---|---|---|---|---|---|---|
| Aqueous Solution | pH | TA (mol/kg) | DIC (mol/kg) | Fe (ppm) | Ni (ppm) | Co (ppm) | Cr (ppm) |
| Incinerator Fluids | 3.2-3.8 | 0.0-0596 | 0.001-0.003 | 0.492-1.02 | 0.0069-0.04 | 0.000004 | 0.002 |
| Primary Municipal Influent Fluids | 6.96 | 0.00128 | 0.00136 | 0.6 | BDL | BDL | 0.007 |
| Primary Municipal Effluent Fluids | 6.8 | 0.00076 | 0.00084 | 0.1 | BDL | 0.000043 | 0.004 |

TABLE 1-continued

Selected properties of various aqueous solutions

| Aqueous Solution | pH | TA (mol/kg) | DIC (mol/kg) | Fe (ppm) | Ni (ppm) | Co (ppm) | Cr (ppm) |
|---|---|---|---|---|---|---|---|
| Tap Water | 7 | — | — | — | — | — | — |
| Milli-Q | 6.998 | — | BDL | BDL | BDL | BDL | BDL |
| Milli-Q + HCl | 3.5 | — | BDL | BDL | BDL | BDL | BDL |
| Milli-Q + NaHCO$_3$ + HCl | 3.5 | 0.0000075 | 0.01 | BDL | BDL | BDL | BDL |

Incinerator fluids, primary municipal influent fluids, and primary municipal effluent fluids were taken from a municipal wastewater treatment facility; incinerator fluid was taken from the organic matter sludge incinerator quench stream; Milli-Q is deionized water prepared through filtration of tap water. HCl is 5% HCl (aq), wherein HCl is added to water to a pH of 3.5. Below detection limit (BDL).

Wastewater Processing

In certain embodiments, the apparatuses and/or methods of the present disclosure may be utilized in wastewater processing. In such embodiments, enhanced weathering reactions occur in existing wastewater infrastructure. In such embodiments, wastewater is shunted from a wastewater stream and rerouted into a buffer tank. In certain embodiments, the buffer tank can reduce the velocity of fast, pressurized flow. In certain embodiments, the buffer tank allows large particulate matter that is initially suspended in the wastewater stream to settle prior to introduction to the main portion of the enhanced weathering apparatus and/or system. In certain embodiments, the wastewater is drawn from the buffer tank and pumped into a pressurized diaphragm tank. In certain embodiments, an inline flow meter is used to digitally control an electronic gate valve, permitting control of the rate at which the wastewater is drawn from the diaphragm tank.

In certain embodiments, upon leaving the diaphragm tank, the influent stream enters the main plumbing of the apparatus where extensive monitoring allows for measurement of pH, temperature, conductivity, dissolved $CO_2$, alkalinity, and metals, inter alia, to occur in-line. In certain embodiments, after one or more measurements are performed, the influent water is directed to a reactor (e.g., fluidized bed reactor) containing milled mineral feedstock. The primary reactions which occur in the apparatus occur due to the dissolution of feedstock within the reactor. In certain embodiments, the system comprises a fluidized bed reactor. In certain embodiments, as the water traverses the column containing the fluidized bed, the heavier mineral feedstock settles, and clear water is drawn from the top of the reactor as effluent.

Dissolved metals (e.g., Fe) may be initially present in the effluent stream due to impurities in a candidate mineral feedstock. Accordingly, in certain embodiments, effluent from the reactor (e.g., fluidized bed reactor) is subsequently directed to an aeration chamber. In certain embodiments, the effluent solution is oxidized in the aeration chamber, resulting in the rapid precipitation and settling of metal oxides (e.g., iron oxides). In certain embodiments, the aeration chamber is equipped with a baffle and/or collector arm to remove settled material. In certain embodiments, after aeration and/or at least partial precipitation of dissolved metals, the treated stream is optionally filtered and reintroduced into the main wastewater processing stream.

Processing Aqueous Solutions with Added $CO_2$

An influent aqueous solution may be charged with additional $CO_2$ (g) to permit and/or facilitate carbon capture. Thus, the carbon capture methods described herein may be augmented by the addition of $CO_2$, thereby permitting the methods described herein to store quantities of $CO_2$ exceeding the concentrations dissolved in an ordinary wastewater stream and/or may facilitate use of aqueous solutions derived from alternative sources, non-limiting examples including freshwater, ocean water, and river water, inter alia. Additionally, water containing very little or no dissolved $CO_2$ initially may be charged with a stream of $CO_2$ gas as a vehicle for CDR using the methods and/or apparatuses of the present disclosure.

In such embodiments, the influent aqueous solution is diverted to a carbonation container and/or vessel, wherein $CO_2$ is added (e.g., via bubbling $CO_2$ (g) into the influent) while the influent is optionally continuously introduced. In certain embodiments, the aqueous solution and $CO_2$ flow together across interior devices which promote increased contact surface area (e.g., pall rings), thereby facilitation $CO_2$ dissolution in the aqueous solution. The apparatuses described herein can accept $CO_2$ (g) of varying levels of purity from any of a number of sources and/or suppliers.

In such embodiments, the addition of $CO_2$ (g) acts to acidify the aqueous solution, resulting in greater mineral dissolution within the one or more reaction chambers (FIG. 1). Accordingly, in certain embodiments, the addition of $CO_2$ (g) can reduce the amount of time needed for significant CDR.

DirectAir Capture (DAC)

Direct air capture (DAC) is a process of capturing carbon dioxide ($CO_2$) directly from ambient air and generating a concentrated stream of $CO_2$ for geological sequestration (e.g., injection and storage in geological formations) or $CO_2$ utilization (e.g., production of a synthetic fuel). DAC may be based on utilizing a liquid to capture $CO_2$ from the air (i.e., liquid based DAC system) or utilizing a solid to capture $CO_2$ from the air (i.e., solid based DAC system). Liquid based DAC systems pass air through chemical solutions (e.g., a hydroxide solution, such as sodium hydroxide), which removes $CO_2$ by precipitating out a carbonate salt (e.g., sodium carbonate). The system reintegrates the chemicals (e.g., hydroxide solution) back into the process by applying a high temperature to the carbonate to produce a highly pure gaseous $CO_2$ stream while returning the $CO_2$-deplete air to the environment. U.S. Patent Publication No. 2020/0129916 A1, herein incorporated by references in its entirety, discloses methods of sequestering $CO_2$ utilizing an aqueous capture liquid, such as aqueous ammonia, to produce an aqueous carbonate liquid.

Solid based DAC makes use of solid sorbent filters that chemically bind with $CO_2$ via chemisorption. When the filters are heated and placed under a vacuum, they release the concentrated $CO_2$, which is then captured for storage or use. U.S. Patent Publication No. 2017/0106330 A1, herein incorporated by references in its entirety, discloses a direct air capture device including a vacuum chamber enclosing an adsorber structure for capturing $CO_2$ from air. U.S. Patent Publication No. 2021/0121826 A1, herein incorporated by references in its entirety, discloses an apparatus and method for direct air capture that utilizes a membrane unit to capture $CO_2$ from atmospheric air. U.S. Patent Publication No. 2022/0176310 A1, herein incorporated by references in its entirety, discloses a high throughput DAC device and method of use for separating $CO_2$ from air by utilizing at least one gas adsorption structure.

Because the concentration of $CO_2$ in air is quite low (i.e., about 415 ppm on average in 2021), DAC processes are extremely energy intensive in order to provide a highly concentrated $CO_2$ stream (i.e., greater than 80 vol. % $CO_2$) for either sequestration or utilization. This makes DAC unattractive from a cost standpoint (from $200 to $1000 per tonne of $CO_2$ depending on price of electricity and carbon emissions from said energy source). However, utilizing the systems and methods of capturing and removing $CO_2$ in gaseous form utilizing an aqueous solution disclosed herein, the DAC process may be much more economical by operating and providing a low pressure $CO_2$ containing stream with a lower concentration of $CO_2$ (10 to 90 vol. %, or 15 to 80 vol. %, or 20 to 75 vol. %, or 25 to 70 vol. %, or 20 to 65 vol. %, or 25 to 60 vol. %, or 30 to 55 vol. %, or 35 to 50 vol. %, or 40 to 45 vol. %). Hence, the coupling of a DAC system operating to produce a gaseous stream with a lower $CO_2$ concentration with the systems of capturing and removing $CO_2$ in gaseous form utilizing an aqueous solution disclosed herein provides a more economically feasible approach for the direct capture of $CO_2$ from air with the goal of sequestration or utilization than DAC systems on their own.

Feedstock Addition System(s)

As the processing and dissolution of minerals within the containers proceeds, replacement of mineral feedstock is necessary to maintain efficiency. In certain embodiments, to fill the apparatus with feedstock, a slurry pumping system is in place to directly add feedstock to one or more reactors without opening and/or draining the reactors. In certain embodiments, mineral feedstock is placed in a container and/or vessel where it is vigorously mixed with water to create a water-rock suspension or slurry. In certain embodiments, using a system of submersible pumps this slurry is then directly diverted into the reactor chamber.

In certain embodiments, feedstock is added to the one or more reactors as a solid with a conveyor. In certain embodiments, the conveyor is a screw conveyor.

In certain embodiments, the mineral feedstock is not perfectly uniform. In certain embodiments, the mineral feedstock comprises compositional, textural, and grainsize inhomogeneity. The grainsize of the mineral feedstock is related to the characteristic dissolution timescale of the feedstock and thus the timescales for $CO_2$ capture. An important consideration is the variation in size of mineral feedstock particles for which dissolution in the reactor (e.g., fluidized bed reactor) is desired. Accordingly, a description of schedule feedstock addition is provided herein, such that addition of mineral feedstock can be added to optimize reaction-dissolution kinetics.

A brief description is provided herein regarding scheduled feedstock addition to the fluidized bed system may be optimized for the most favorable reaction-dissolution kinetics. The model described herein seeks to capture the effect of particle size distribution on the dissolution of solid particles suspended in a slurry using a population balance technique.

Based on a simple constitutive model for dissolution of spheres and a population balance technique, we derive a partial differential equation has been derived that describes the dissolution of feedstock in an ever-changing distribution of suspended particles. A parameterization is included that allows probing of instances in which secondary minerals form on the surface of the grains and/or passive halos reactively form around grains thereby limiting surface reactions.

Figure 5:
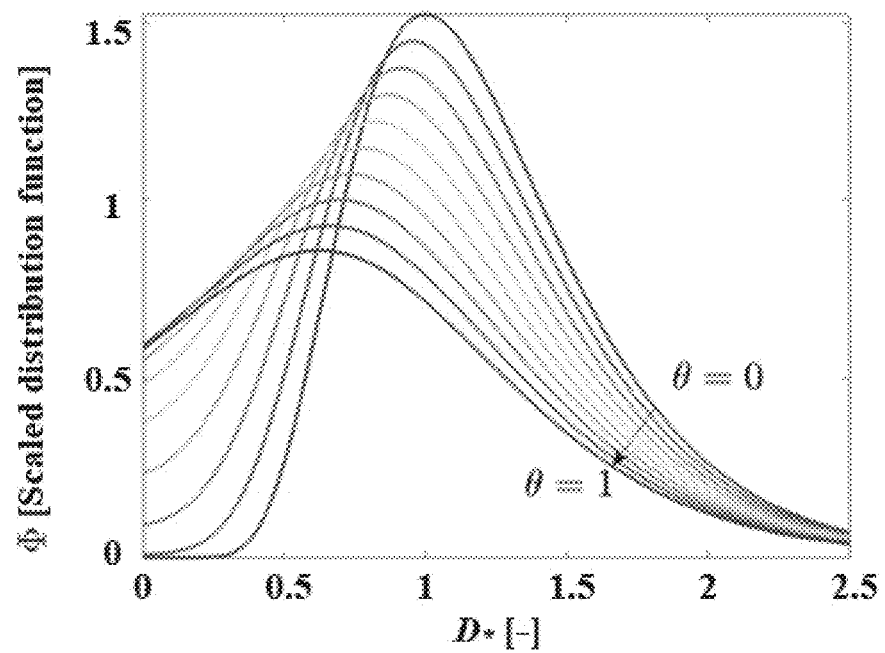
FIG. 5 provides a graph of modeled results of the present disclosure showing the results of a grainsize distribution model. Theta=1 is the time required to dissolve a particle of $D_*=1$. $D_*=1$ is the characteristic value of an initial log-normal distribution of particles dissolving in suspension. Over time, larger particles dissolved to become smaller particles and some smaller particles dissolve completely.

Importantly, large particles dissolve slowly compared to small particles, as larger particles have a lower surface area to volume ratio than smaller particles (FIG. 5). Available surface area is an important factor in driving weathering reactions. Because surface area in contact with solution is an important factor in determining the dissolution rate of feedstock in a reactor (e.g., fluidized bed), a simple criterion for efficiency of dissolution is defined herein.

Reactions that result in an increase in surface-area per unit mass are efficient and reactions that result in a loss of surface area per unit mass are inefficient. The dissolution of a mono-disperse population of particles necessarily results in an increase in surface area per mass. Given an initial distribution of particle sizes, the point at which dissolution begins to slow can be theoretically predicted.

Figure 6:
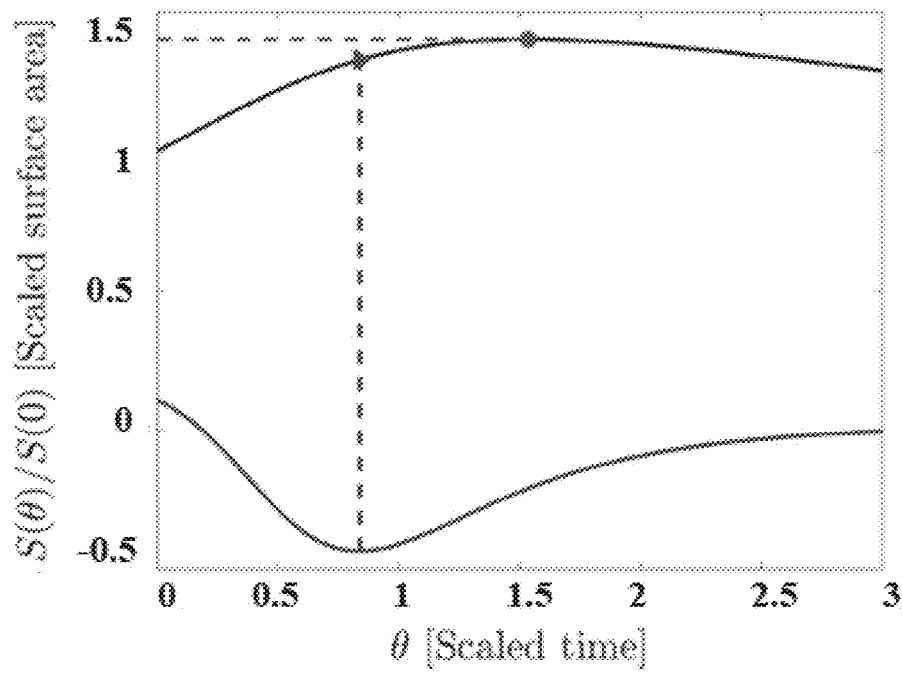
FIG. 6 provides a graph of modeled results of the present disclosure showing the relationship between scaled surface area and scaled time, wherein the triangle and associated line indicate curvature minimum, and the circle and associated line indicate surface area maximum per unit mass. At the inflection point of the scaled surface area curve (i.e., triangle) the creation of surface area per unit mass begins to slow (i.e., efficiency of reaction-dissolution slows).
Figure 7:
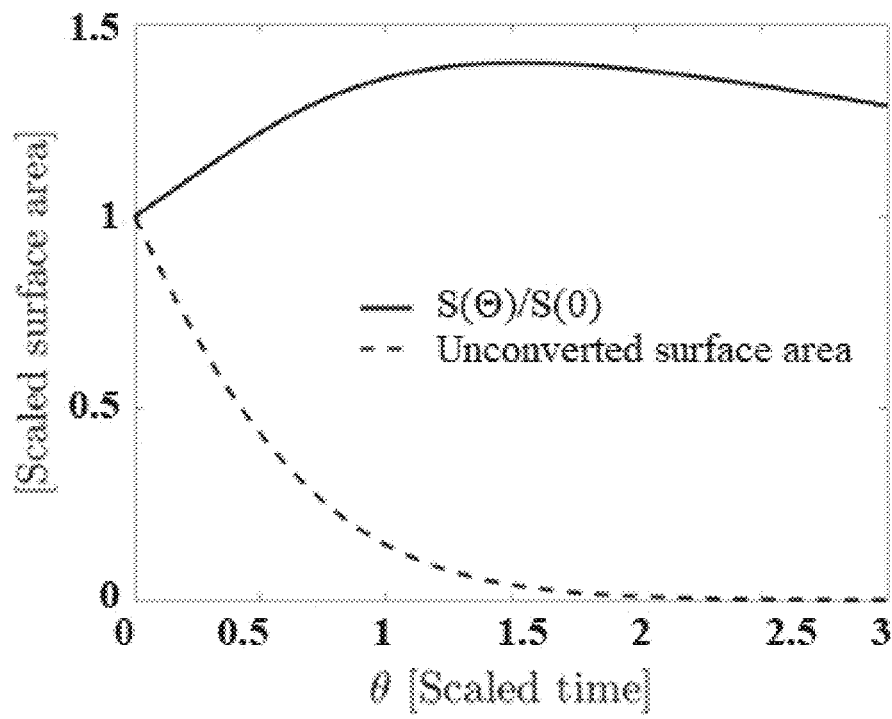
FIG. 7 provides a graph of modeled results of the present disclosure depicting the total surface area available for reaction in the theoretical model results presented herein (i.e., FIGS. 8A-8B). In this graph, the solid curve is the same as depicted in FIGS. 8A-8B. The dotted line corresponds to unreacted surface area available for dissolution. This graph shows the balance between surface area creation and total mass available for dissolution for a reactive feedstock. This model may aid in designing system operation.

At the inflection point of the scale area curve the creation of surface area per unit mass begins to slow (FIG. 6). That is, the efficiency of reaction-dissolution begins to slow. Counter to reasonable intuition, this point in the system is not efficient for promoting reaction progression by injection of additional mineral feedstock. The ideal point of addition comprises maintaining maximal surface area per unit mass (i.e., max(dS/dt)). However, it is also possible that increasing the amount of available unconverted (i.e., non-reacted) surface area can be important for increasing capture rates (FIG. 7).

Practical Limits for Water Flux and Container Geometry

Figure 8A:
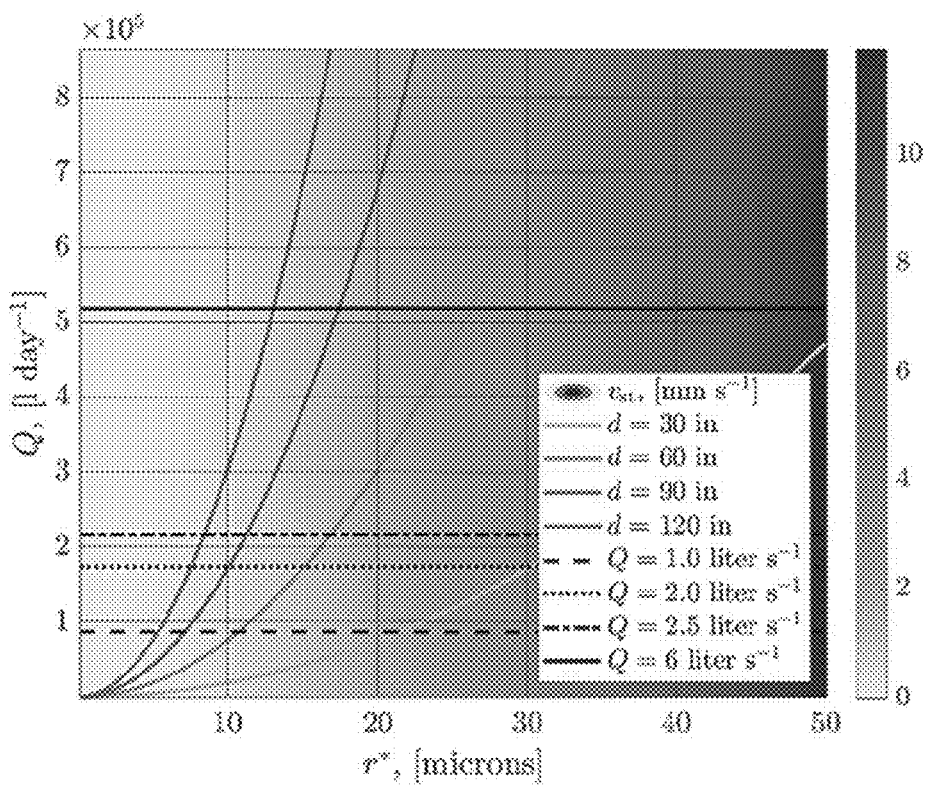
FIGS. 8A-8B provide modeled results of the present disclosure providing an instructive diagram for comparing the stokes settling velocity of a sphere with radius r to the stokes settling time scale, calculating using olivine (FIG. 8A) and limestone (FIG. 8B). It has been shown that combinations of high water-velocity and low particle radius will be washed out of the reactor. Such combinations plot above and to the left of any given curve in either plot. As the diameter of a reactor increases, any given volumetric flux of water induces a lower flow speed. Thus, larger reactor columns allow for larger water fluxes without washing out mineral feedstock.
Figure 8B:
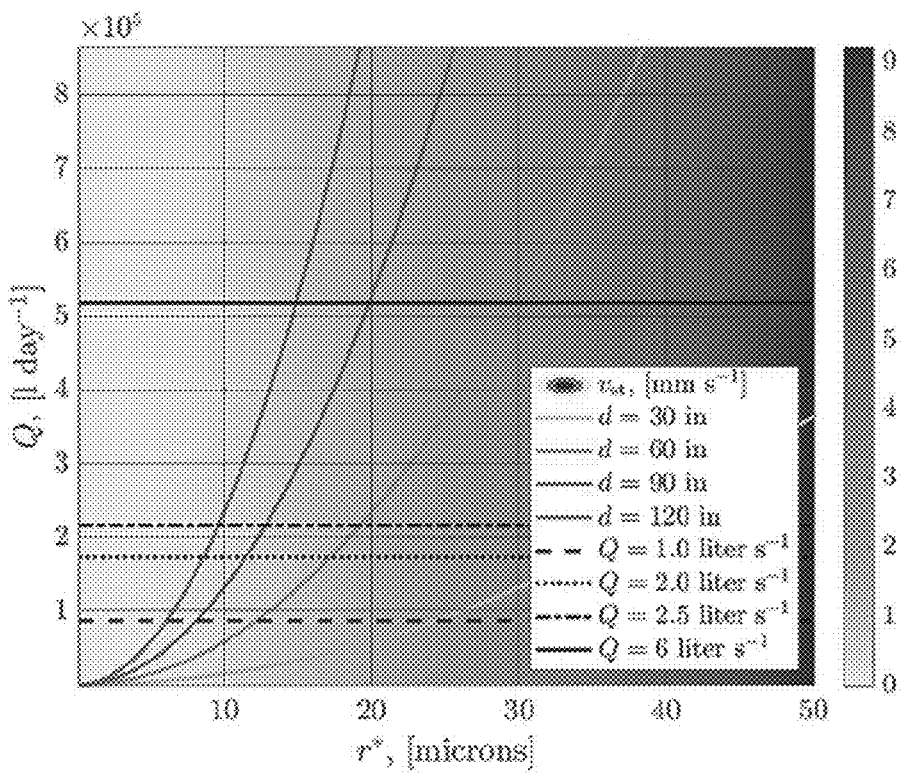

In certain embodiments, the enhanced weathering apparatus and/or methods of use thereof comprise a fluidized bed reactor. In such embodiments, a consistent balance between aqueous solution velocity within the fluidized bed container and the settling time of mineral feedstock are of critical importance. If the velocity of the water exceeds the Stokes' settling velocity of a particle, the likelihood that it is washed out of the container for the fluidized bed become quite high. Although this is a highly simplified model, it becomes highly predictive as the smallest particles in the particle size distribution are sorted to the top of the bed via elutriation. Moreover, smaller particles are much more likely to dragged into the upper portions of the column where the water rock ratio is high, and particle concentrations are therefore small. Once smaller particles reach the upper portions of the column, their slow settling timescale makes it likely for them to be washed out of the fluidized bed containers (FIGS. 8A-8B).

$CO_2$ Capture, Sensor Array Design, and Verification

The present disclosure demonstrates neutralization of acidic wastewater from a wastewater treatment facility using one embodiment of the enhanced weathering system of the present disclosure, wherein olivine is used as a mineral feedstock under various water:mineral ratios. With a starting pH of ~3.2, the acidic wastewater stream is adjusted by 1.5-6 pH units within 20 minutes employing rapid conversion of dissolved $CO_2$ in the wastewater stream to bicarbonate ($HCO_3^-$).

The initial parameters (i.e., pH) imply that all carbon in is in the form of dissolved $CO_2$ in the untreated water. As weathering reaction proceeds, acidity from $CO_2$ is consumed, the concentration of $CO_2$ decreases as it is converted to $HCO_3^-$ when pH increases. Carbon in this form is trapped and can no longer easily equilibrate with the atmosphere. Under typical wastewater operations, this dissolved $HCO_3^-$ would return to the main wastewater flow, where it will be discharged.

Figure 9A:
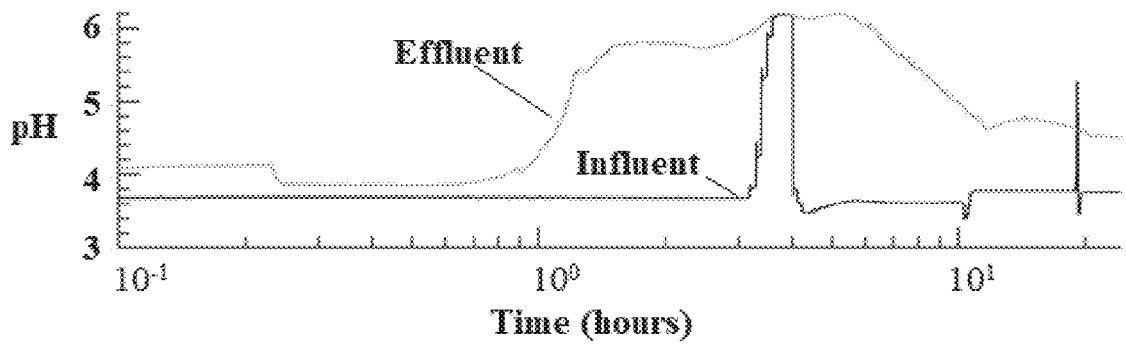
FIGS. 9A-9B depict influent/effluent pH (FIG. 9A) and effluent total alkalinity (FIG. 9B) measured during a 24-hour actual enhanced weathering experiment of the present disclosure. Feedstock used was forsteritic olivine and the flow rate was set to 1.5 L/min. Samples shown for total alkalinity were taken at the beginning, middle, and end of the experiment. Note that temporary spikes in influent pH are the result of refilling the influent tank. The changes in pH between the influent and effluent are the result of olivine dissolution under pH conditions relevant to wastewater. The difference in pH appears to decrease near 24 hours of reaction, indicating a decrease in dissolution rate. Without wishing to be bound by theory, this may be attributable to a decrease in surface area as the finest grain size fully dissolves.
Figure 9B:
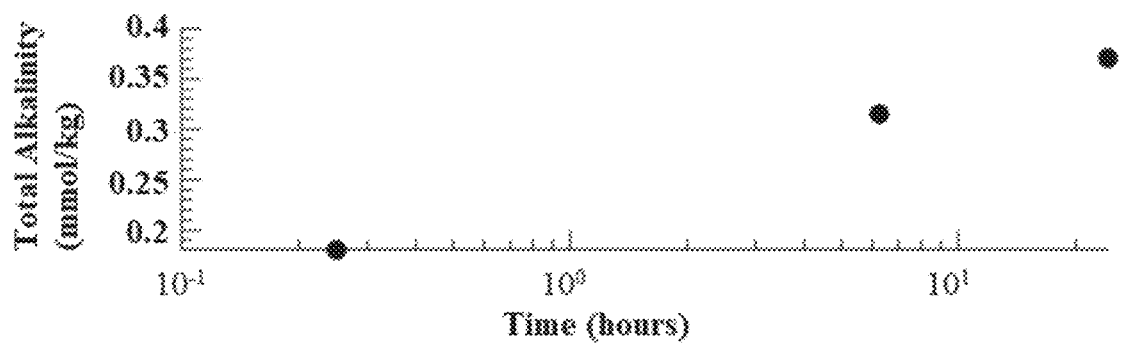
Figure 9C:
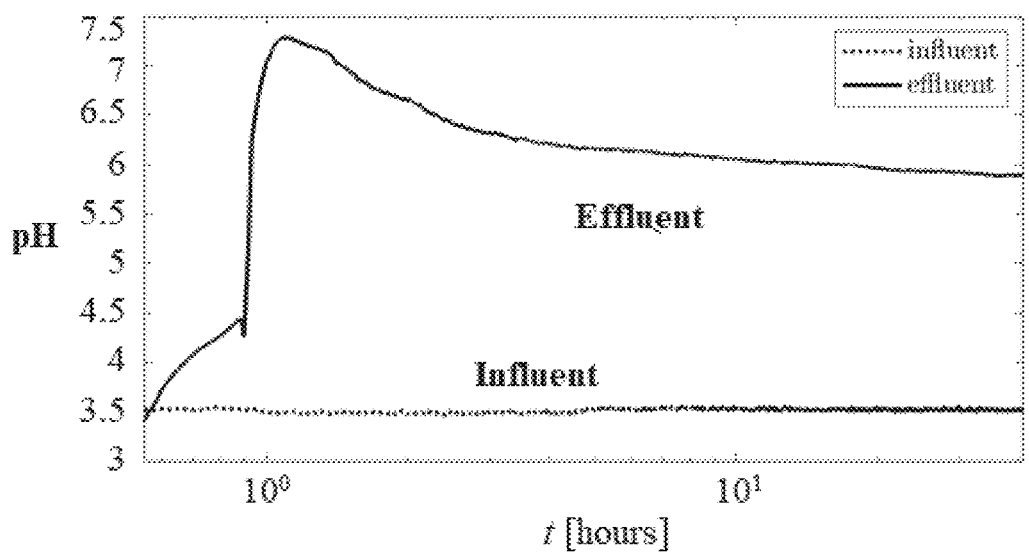
FIG. 9C depicts influent/effluent pH measured during an actual enhanced weathering experiment of the present disclosure. Feedstock used was coarse-grained calcitic limestone with a mean particle size of ~1 mm and the flow rate was set to 0.4 L/min. In the experiment, the acidic influent had pH of about 3.5, wherein pH and inflow rate can be adjusted by the operator. Upon entering the container, the acidic aqueous solution percolates through a granular bed of calcitic limestone. After exiting the bed, the pH of the aqueous solution is measured again (i.e., effluent). The difference between the pH of the influent and effluent waters is indicative of dissolution of the feedstock. The free protons in solution convert the solid calcium carbonate to dissolved bicarbonate and a calcium cation. This process results in the rising pH across the container. This figure demonstrates that carbonic acid, resulting from dissolution of $CO_2$ in an aqueous solution, may be converted to bicarbonate using the systems, apparatuses, and/or methods of the present disclosure.
Figure 10A:
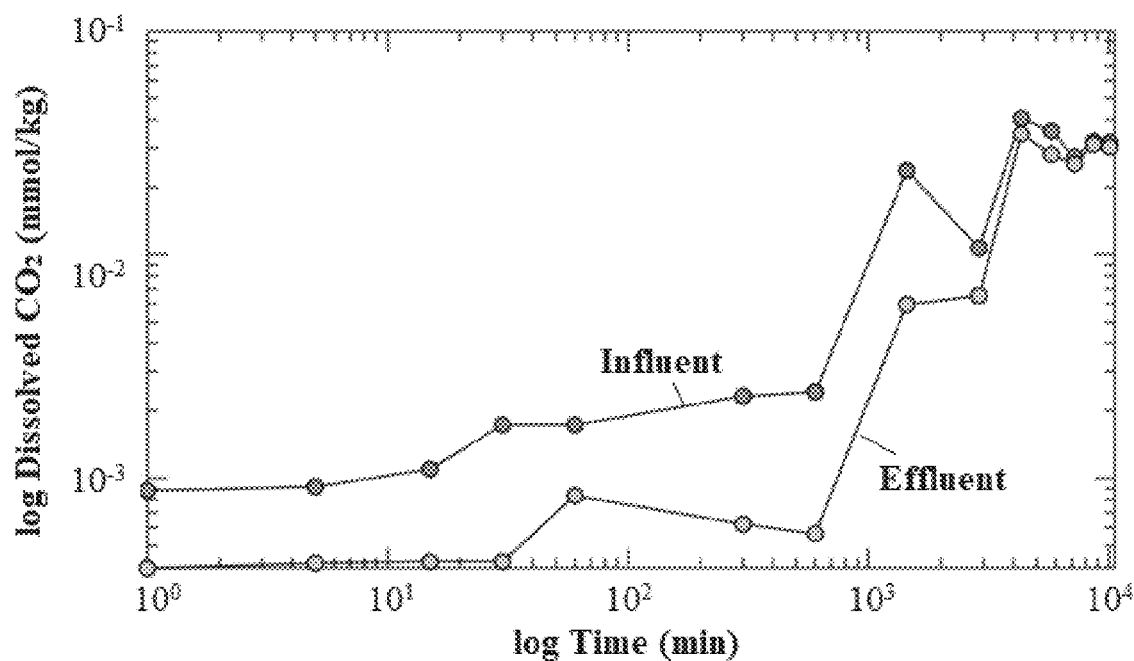
FIGS. 10A-10B depict the change in dissolved $CO_2$ concentration with time measured using embodiments of the enhanced weathering system of the present disclosure with differing olivine grain sizes (i.e., ~100 μm, FIG. 10A; and <63 μm, FIG. 10B). In these experiments, $CO_2$ was bubbled into the influent tank and was used as the acid source for olivine dissolution. The decrease in dissolved $CO_2$ demonstrates that $CO_2$ can be removed through dissolution of mineral feedstock.
Figure 10B:
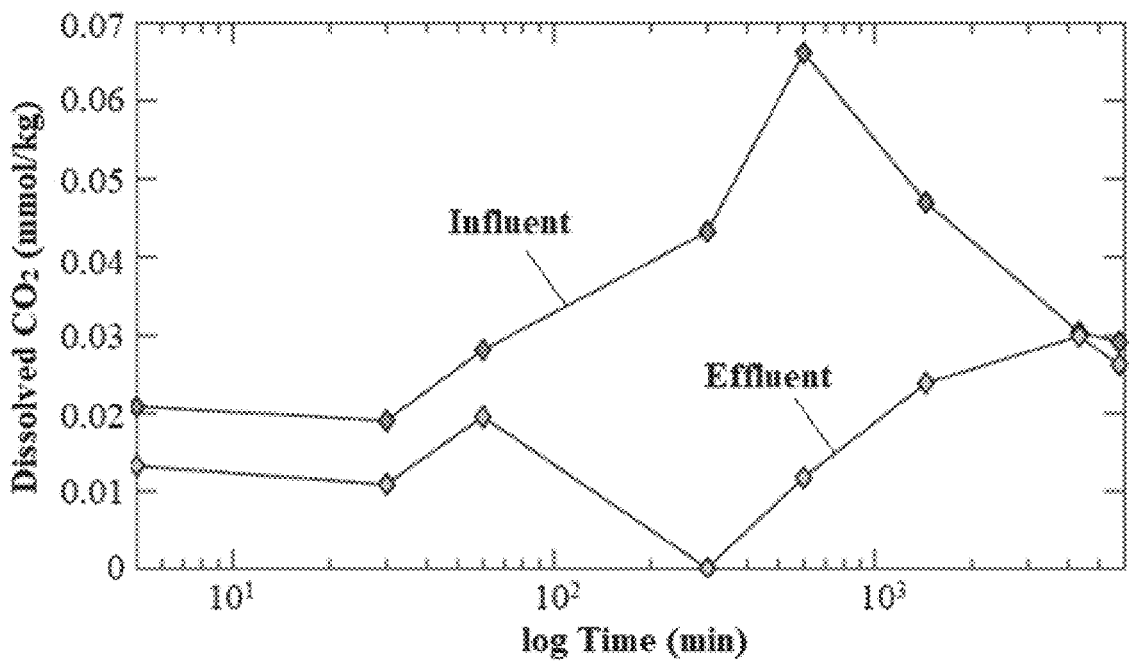

The present disclosure further provides data relating to the relationship between alkalinity and dissolved inorganic carbon, influent/effluent pH and/or alkalinity (FIGS. 9A-9B) and dissolved $CO_2$ concentration (FIGS. 10A-10B), as a function of time with use of the enhanced weathering systems and/or apparatuses described herein.

Selected Properties of Weathered Minerals

Figure 11A:
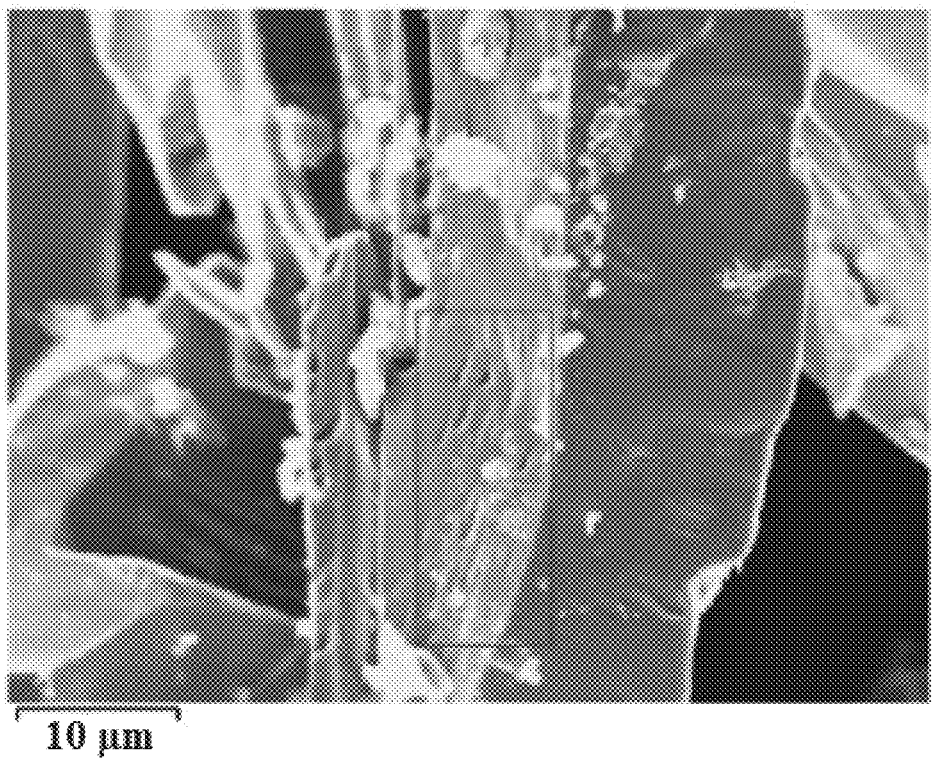
FIGS. 11A-11C provide images depicting an increase in surface roughness or etch pits of olivine grains with (FIGS. 11A-11B) or without (FIG. 11C) etching with 1M HCl resulting from actual experiments of the present disclosure. Given that reaction rates are partially correlated with specific surface area (SSA), by contacting mineral feedstock with an acidifying agent (e.g., HCl) the reaction rates may increase either due to etching or removal of weathering rinds with HCl.
Figure 11B:
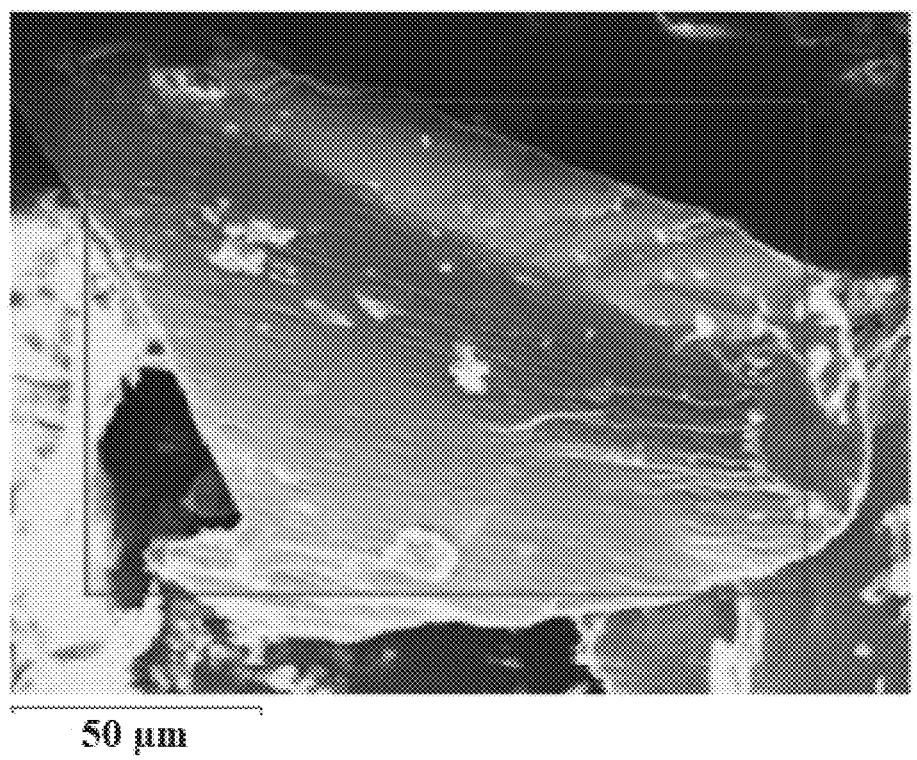
Figure 11C:
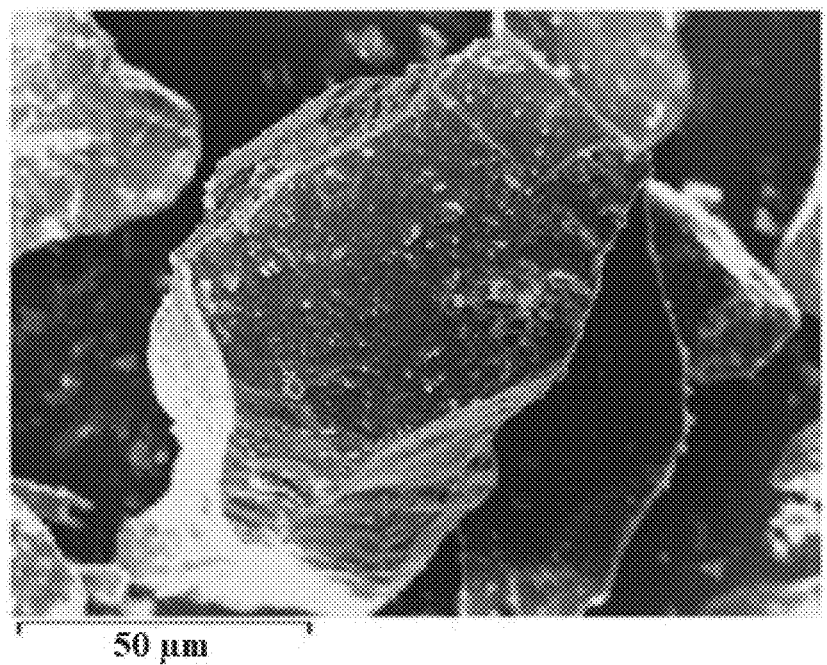

The present disclosure describes certain physical properties of minerals (e.g., forsteritic olivine) which are impacted by the weathering methods described herein, as assessed by scanning electron microscopy and/or energy-dispersive X-ray spectroscopy (EDS) (FIGS. 11A-11C). In certain embodiments, weathering results in altered roughness and/or topography, as well as secondary mineral formation.

Sensors, Measurements, and Verification

In certain embodiments, the apparatuses, systems, and/or methods of the present disclosure comprise the use of one or more sensors or sensor arrays. In certain embodiments, the sensors and/or sensor arrays measure one or more properties and/or parameters of an aqueous solution contained in, or passing through, the systems and/or apparatuses described herein. In certain embodiments, the one or more properties and/or parameters measured in an aqueous solution include, but are not limited to, pH, alkalinity, dissolved $CO_2$ concentration, dissolved inorganic carbon (DIC) concentration, bicarbonate ion concentration, carbonate ion concentration, partial pressure of $CO_2$ (g), temperature, conductivity, turbidity, salinity, dissolved oxygen concentration, total suspended solids concentration, total dissolved solids concentration, hardness, dissolved metal concentration, dissolved non-metal concentration, and dissolved metalloid concentration. Certain non-limiting parameters and/or properties of an aqueous solution measured by the sensor(s) and/or sensor array(s), and the nature of the measurement, are provided herein.

Further, non-limiting applications and/or utility for selected measurements is indicated herein. Any two parameters selected from dissolved $CO_2$ concentration, pH, partial pressure of $CO_2$, total alkalinity, dissolved inorganic carbon concentration, dissolved bicarbonate ion concentration, and dissolved carbonate ion concentration can be used to solve the carbonic acid system algebraically (Eqs. 4-7). In certain embodiments, dissolved $CO_2$ and pH is used to solve the carbonic acid system algebraically (Eqs. 4-7), and thus, measurement of dissolved $CO_2$ concentration and pH permit calculation of bicarbonate concentration. In certain embodiments, temperature can be used to assess and/or manipulate the kinetics and efficiency of mineral dissolution. In certain embodiments, acidification, aeration, and/or agitation can be used to facilitate degassing of an aqueous solution. Further, a neutral pH of effluent is required to avoid $CO_2$ degassing process.

Turbidity measurements can be used to assess feedstock washout from one or more reactors in the systems and/or apparatuses described herein. Turbidity of a fluid changes as a result of suspended particulate matter and measurement of turbidity can facilitate detection of feedstock washout. Further, conductivity and/or turbidity can be used to determine if changes to flow rate are required.

In certain embodiments, the systems and/or apparatuses for enhanced weathering described herein comprise an aeration tank and/or aeration process. In such embodiments, measurement of dissolved oxygen is useful and/or necessary for monitoring oxygen levels as necessitate for the oxidation of dissolved metals, non-metals, and/or metalloids (e.g., Fe).

In certain embodiments, aliquots of the aqueous solution treated by the methods described herein and/or contained in the systems and/or apparatuses described herein may be subjected to analyses which are not performed by the one or more sensors and/or sensor arrays. Non-limiting examples of such analytical methods include spectrophotometry, colorimetry, scanning electron microscopy (SEM), energy-dispersive X-ray spectroscopy (EDS), x-ray diffraction (XRD), inductively coupled plasma mass spectrometry (ICP-MS), Brunauer Emmett-Teller (BET) method.

Effluent Water Impurity Mitigation and Metal Capture

Figure 12:
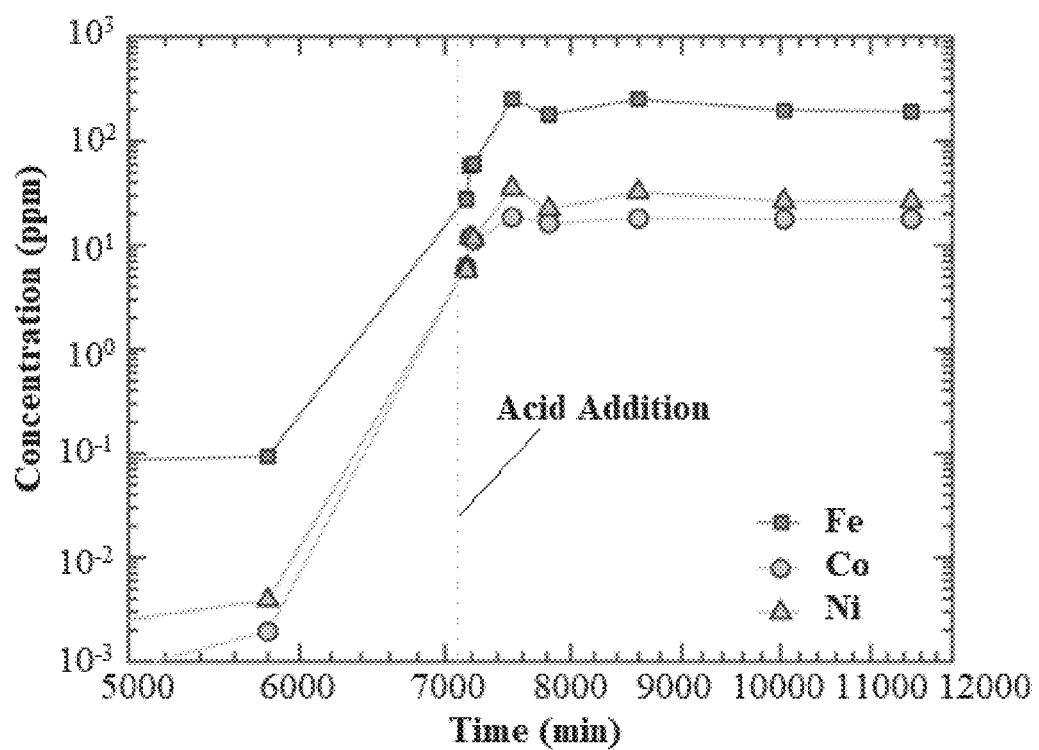
FIG. 12 shows the concentration of Fe, Co, and Ni from olivine feedstock before and after addition of 1N hydrochloric acid resulting from actual experiments of the present disclosure. The rate of metals released increases with increasing olivine dissolution resulting from the decrease in pH. Thus, efficient metal recovery is dependent on maintaining high dissolution rates in a containerized EW system.
Figure 13:
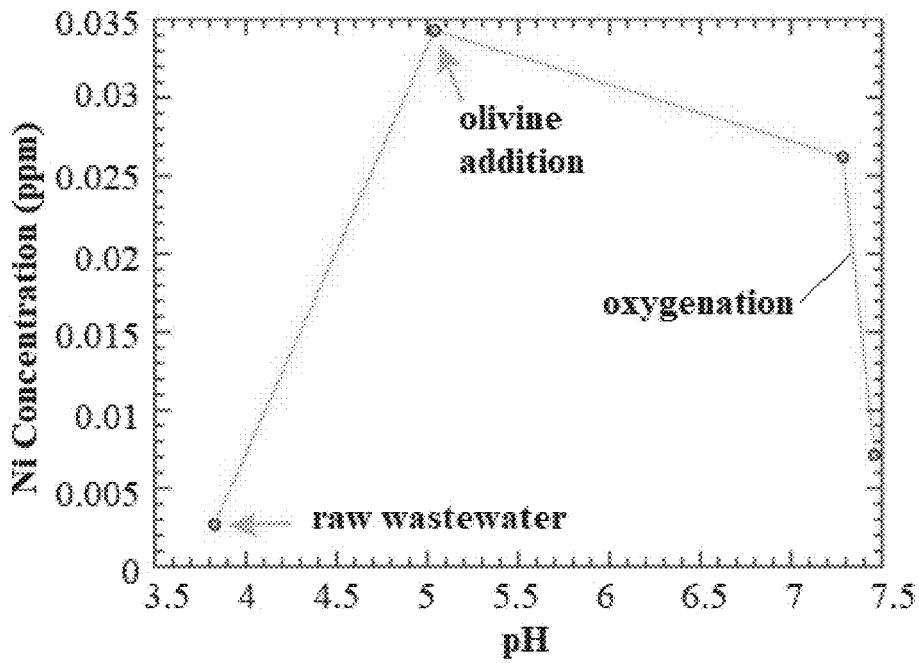
FIG. 13 depicts changes in Ni concentration during an olivine dissolution experiment in a low-pH aqueous solution resulting from actual experiments of the present disclosure. Ni rises substantially at the onset of dissolution and is subsequently removed during oxygenation due to sorption on Fe-oxides. These Fe-oxides can be collected, and the sorbed Ni can be released, captured, and sold commercially.
Figure 14:
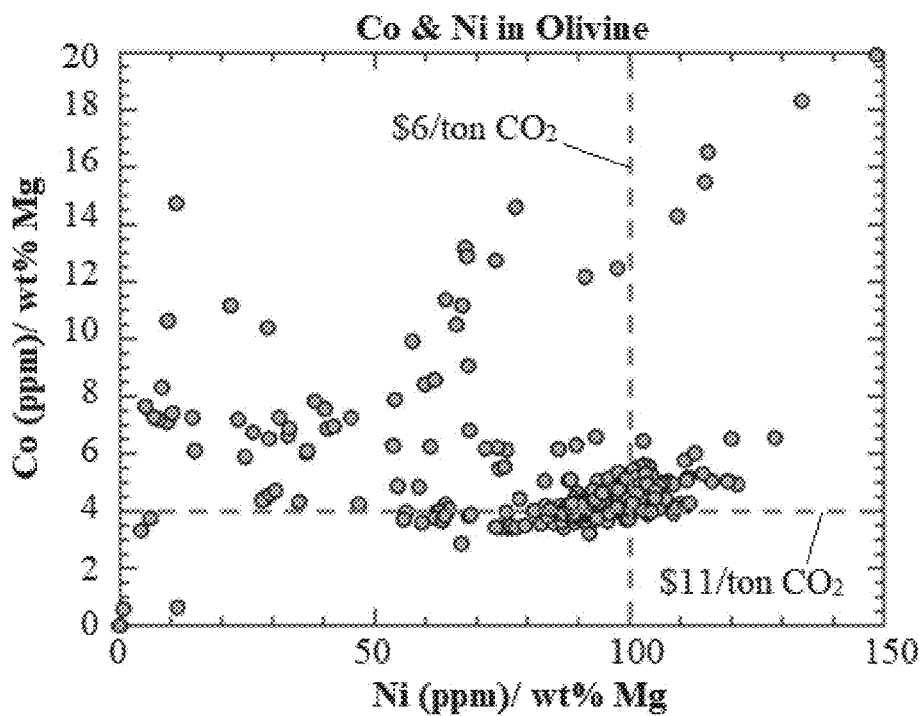
FIG. 14 shows Co and Ni concentrations relative to the weight percent of Mg in a selection of olivines (data taken from GEOROC database). On the basis of these concentrations, and with the assumption of complete dissolution of mineral feedstock and recovery of metals, a cost of $70/tonne $CO_2$ capture has been calculated.
Figure 15:
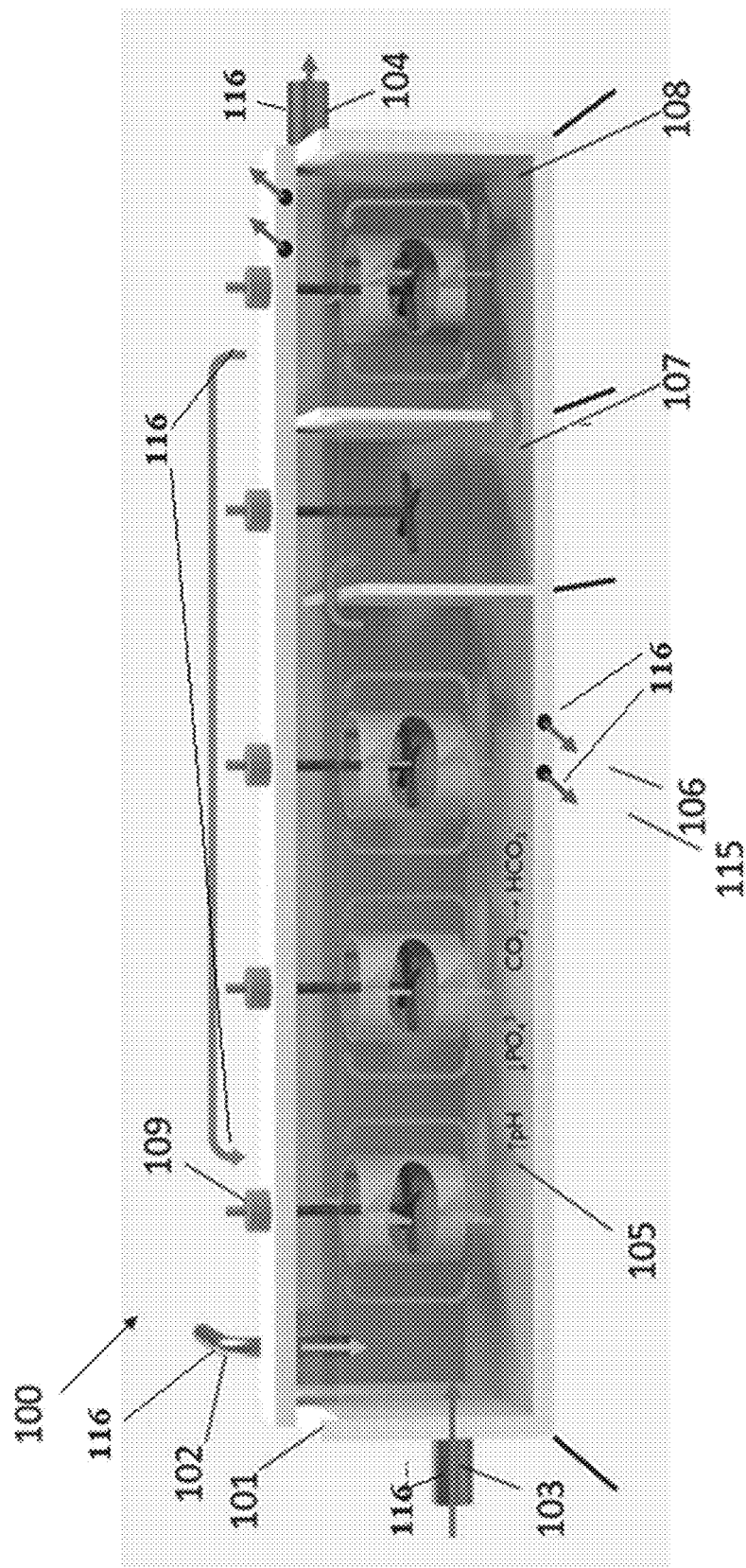
FIG. 15 depicts an exemplary enhanced weathering device of the present disclosure in accordance with some embodiments. An influent aqueous solution flows into a reactor tank, mixing with mineral feedstock that may be fed in at various grain sizes. A series of agitators or specific flow designs may be used to maintain either a laminar or turbulent flow regime through the reactor. In some embodiments, a reactor tank may comprise one or more diffusers or aerators, for example running along a portion or all of one or more walls of the reactor tank, configured to alter the flow entering or within the reactor tank. In some embodiments, one or more point flow sources may be positioned in the reactor tank, for example a point flow source with varying velocity to alter the flow within the reactor tank. In some embodiments, a series of filtering and clarification mechanisms may be used to remove particulate matter. Flows may be recirculated to ensure complete weathering and $CO_2$ capture. Sampling and monitoring ports allow for tracking of changes in physiochemical conditions of the waters and mineral feedstock. In certain embodiments, the effluent can be discharged to a wastewater treatment facility for further treatment.
Figure 16:
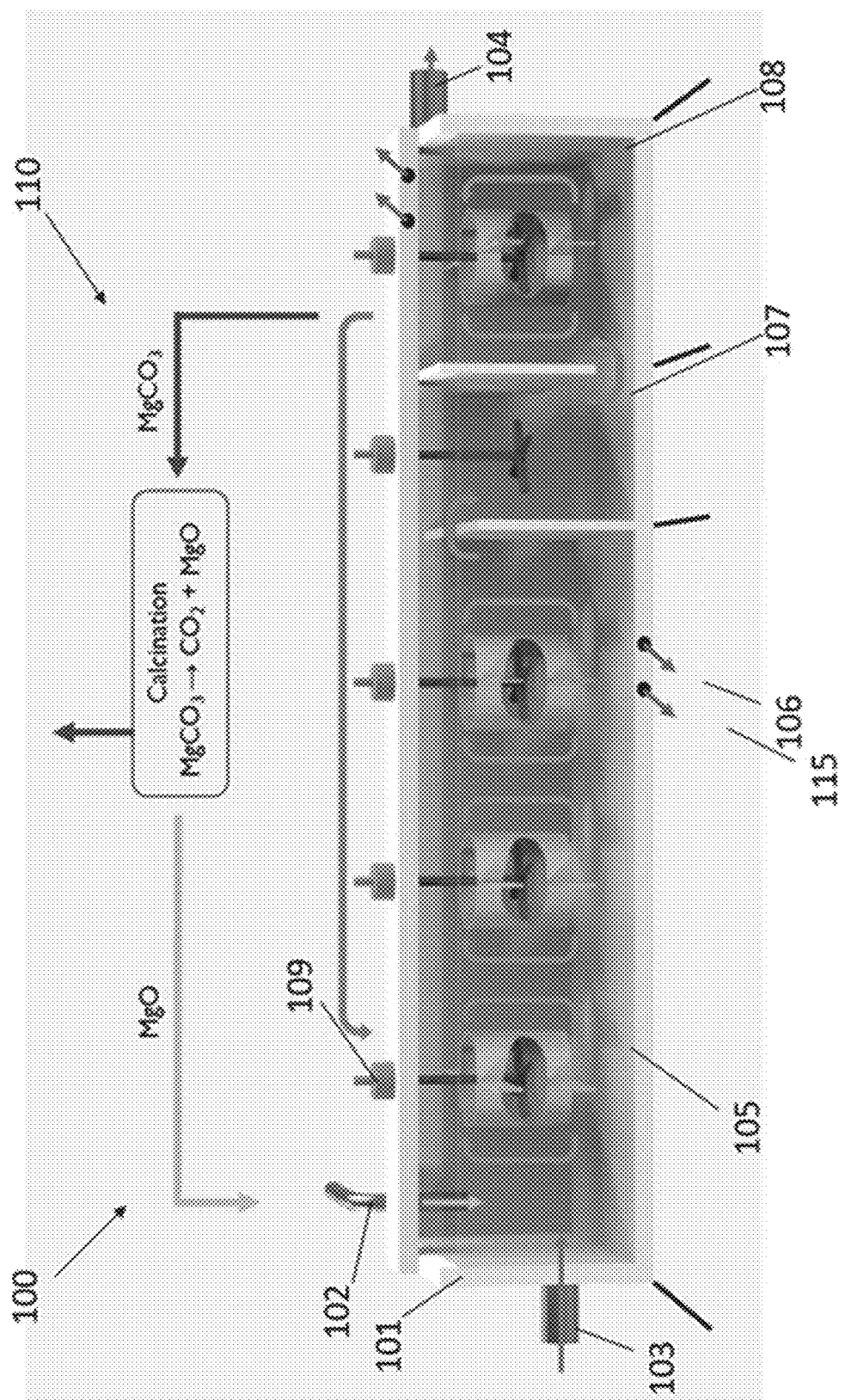
FIG. 16 depicts another exemplary enhanced weathering device of the present disclosure in accordance with some embodiments. An influent aqueous solution flows into a reactor tank, mixing with mineral feedstock that may be fed in at various grain sizes. A series of agitators or specific flow designs may be used to maintain either a laminar or turbulent flow regime through the reactor, and a series of filtering and clarification mechanisms may be used to remove particulate matter generated during the process of enhanced weathering. Flows may be recirculated to ensure complete mineral reaction and $CO_2$ capture. The system could be coupled to a calcination loop, where metal oxides (e.g., MgO) is contacted with the aqueous solution to form carbonates, such as magnesite ($MgCO_3$) which are then captured, calcinated to form a $CO_2$ stream, and the renewed mineral feedstock can be reintroduced to the reaction tank. Sampling and monitoring ports can allow for tracking of changes in physiochemical conditions of the waters and mineral feedstock. In certain embodiments, the effluent aqueous solution can be discharged to a wastewater treatment facility for further treatment.
Figure 17:
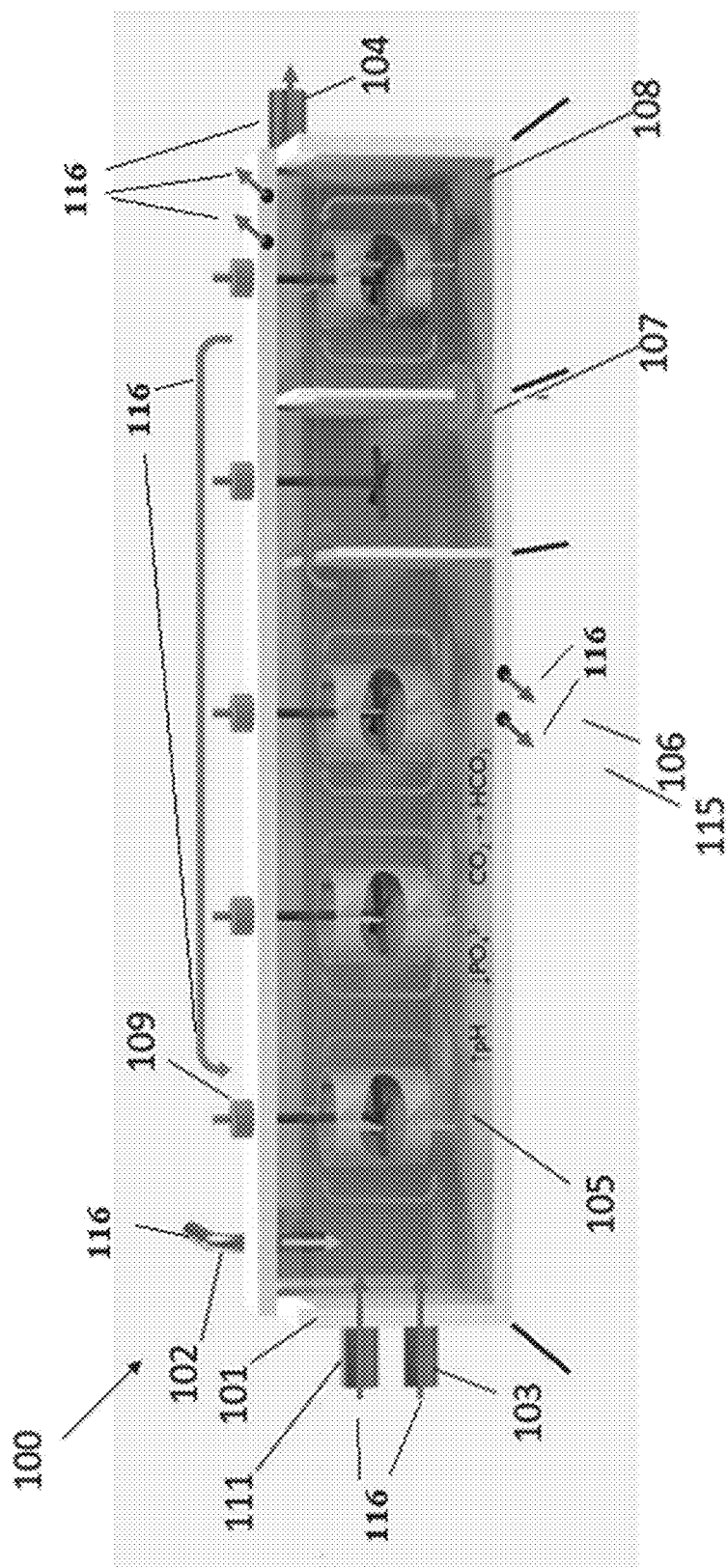
FIG. 17 depicts another exemplary enhanced weathering device of the present disclosure in accordance with some embodiments. An influent aqueous solution flows into a reactor tank, mixing with mineral feedstock that may be fed in at various grain sizes. A series of agitators or specific flow designs may be used to maintain either a laminar or turbulent flow regime through the reactor, and a series of filtering and clarification mechanisms may be used to remove particulate matter. Flows may be recirculated to ensure complete mineral reaction and $CO_2$ capture. A concentrated $CO_2$ stream can be introduced to the reaction tank to further enhance weathering. Unreacted $CO_2$ may be recirculated into the reactor to ensure complete capture. Sampling and monitoring ports can allow for tracking of changes in physiochemical conditions of the waters and mineral feedstock. In certain embodiments, the effluent aqueous solution can be discharged to a wastewater treatment facility for further treatment.
Figure 18:
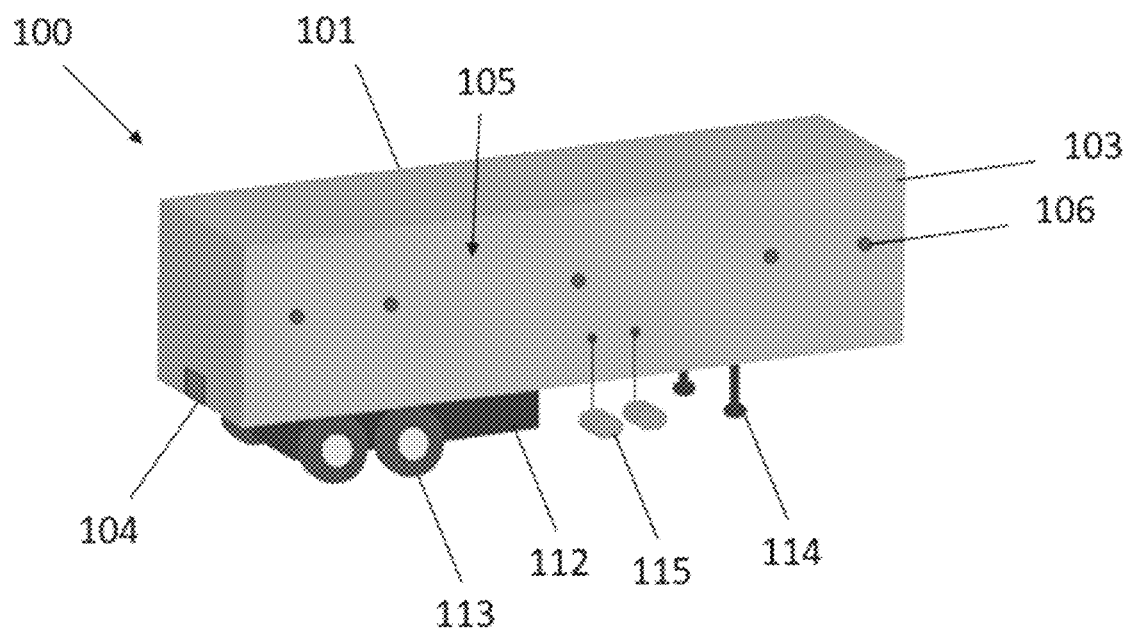
FIG. 18 depicts an exemplary mobile enhanced weathering system of the present disclosure in accordance with some embodiments.

In certain embodiments, dissolution of minerals (e.g., silicate minerals such as olivine) may introduce metals (e.g., Fe, Co, Cr, and Ni, inter alia) into the effluent stream (FIG. 12). Thus, in certain embodiments, dissolved metal impurities are removed during the processes and/or methods described herein (FIG. 13). In certain embodiments, the aqueous solution (e.g., effluent and/or influent) is subjected to aeration by one or more methods. In certain embodiments, dissolved metals are oxidized upon exposure to dissolved oxygen to provide a metal oxide (e.g., iron oxide). In certain embodiments, the metal oxide(s) are captured. In certain embodiments, the dissolved metals are contacted with one or more agents suitable to afford metal oxides (e.g., iron oxide). In certain embodiments, the one or more agents comprise biochar. In certain embodiments, the metal oxide(s) are captured. In certain embodiments, the captured metals (e.g., Ni and/or Co) are commercially valuable (FIG. 14).

Definitions

The term "about" as used herein can allow for a degree of variability in a value or range, for example, within 10%, within 5%, or within 1% of a stated value or of a stated limit of a range, and includes the exact stated value or range.

The term "atm" as used herein refers to a pressure in atmospheres under standard conditions. Thus, 1 atm is a pressure of 101 kPa, 2 atm is a pressure of 202 kPa, and so on.

The terms "container", "chamber", and/or "reactor" are used interchangeably herein to describe an at least partially enclosed vessel.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "room temperature", "standard temperature", and/or "ambient temperature" as used herein refers to a temperature of about 15° C. to 28° C., preferably about 20° C. to 22° C.

The term "sequestration" as used herein relates to carbon removal, capture, and/or storage, and refers to a process by which carbon dioxide is removed from the atmosphere, an aqueous solution, or an alternative source, and held in solid or liquid form (e.g., bicarbonate). In certain regards, the carbon can be sequestered as carbonate salts. The terms carbon capture, carbon sequestration, carbon storage, and carbon removal are used interchangeably herein.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %. The term "substantially less than" as used herein indicates that the compared terms differ by a non-trivial amount, for example greater than or equal to about 4.5, 4, 3.5, 3, 2.5, 2, 1.5, 1, 0.9, 0.8, 0.7, 0.6, 0.5, 0.4, 0.3, 0.2, 0.1, 0.01, or about 0.001%.

Enhanced Weathering Methods

In one aspect, the present disclosure provides a method of at least partially sequestering $CO_2$ from an influent aqueous solution comprising aqueous and/or gaseous $CO_2$.

In certain embodiments, the method comprises (a) measuring in the influent aqueous solution comprising dissolved aqueous and/or gaseous $CO_2$, at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g).

In certain embodiments, the method comprises (b) feeding the influent aqueous solution through at least one container comprising a mineral feedstock, wherein the mineral feedstock comprises at least one selected from the group consisting of a metal silicate, a metal carbonate, and a metal oxide.

In certain embodiments, the method comprises (c) contacting the influent aqueous solution with the mineral feedstock to provide an effluent aqueous solution comprising one or more metal ions and/or carbonate ions dissolved therein.

In certain embodiments, the method comprises (d) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g).

In certain embodiments, the method comprises (e) comparing the at least two measured parameters of the influent aqueous solution and the at least two measured parameters of the effluent aqueous solution to calculate a change in dissolved $CO_2$ concentration.

In certain embodiments, the method comprises (f) modifying at least one parameter of the influent aqueous solution and/or contacting step if the change comprises a decrease in dissolved $CO_2$ concentration of less than about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%.

In certain embodiments, the method further comprises measuring in the influent and effluent at least one parameter selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration,
    wherein the dissolved metal is optionally at least one metal selected from the group consisting of calcium, magnesium, sodium, aluminum, nickel, iron, cobalt, and chromium, and
    wherein the dissolved non-metal is optionally at least one non-metal or metalloid selected from the group consisting of phosphorus, silica, and oxygen.

In certain embodiments, the at least one parameter measured in the effluent is pH. In certain embodiments, the at least one parameter measured in the effluent is alkalinity.

In certain embodiments, the method is repeated beginning at step (b), by recirculation of the effluent to provide a recirculated effluent, if the pH of the effluent is less than about 8.5, 8.0, 7.5, or 7.0. In certain embodiments, the method is repeated beginning at step (b), by recirculation of the effluent to provide a recirculated effluent, if the change comprises a decrease in dissolved $CO_2$ concentration of less than about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%. In certain embodiments, the method is repeated beginning at step (b), by recirculation of the effluent to provide a recirculated effluent, if the alkalinity of the effluent aqueous solution is less than 5% different than the alkalinity in the influent aqueous solution.

In certain embodiments, if the pH of the influent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the influent. In certain embodiments, if the pH of the effluent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the recirculated effluent.

In certain embodiments, the acidifying agent is $CO_2$ (g). In certain embodiments, the acidifying agent is $CO_2$ (aq). In certain embodiments, the acidifying agent is an organic acid. In certain embodiments, the acidifying agent is an inorganic acid.

In certain embodiments, the inorganic acid is $H_2CO_3$. In certain embodiments, the inorganic acid is $H_2SO_4$. In certain embodiments, the inorganic acid is $HNO_3$. In certain embodiments, the inorganic acid is HCl (aq). In certain embodiments, the inorganic acid is HCl (g).

In certain embodiments, the effluent is subjected to gas stripping if the dissolved $CO_2$ concentration of the effluent is greater than the dissolved $CO_2$ concentration of the influent. In certain embodiments, the effluent is subjected to gas stripping if the partial pressure of $CO_2$ of the effluent is greater than atmospheric partial pressure of $CO_2$.

In certain embodiments, step (a) further comprises measuring in the influent at least one selected from the group consisting of dissolved metal concentration and dissolved non-metal or metalloid concentration. In certain embodiments, step (d) further comprises measuring in the effluent at least one selected from the group consisting of dissolved metal concentration and dissolved non-metal or metalloid concentration.

In certain embodiments, the method further comprises treating the effluent to provide a second effluent, wherein the second effluent has at least one selected from the group consisting of a dissolved metal concentration and a dissolved non-metal or metalloid concentration which is less than that of the influent and/or effluent In certain embodiments, the method further comprises treating comprises aerating the effluent.

In certain embodiments, aeration results in formation of at least one selected from the group consisting of a metal oxide, a non-metal oxide, a metal hydroxide, a non-metal hydroxide, a metal oxyhydroxide, and a non-metal oxyhydroxide.

In certain embodiments, the metal is Fe. In certain embodiments, the metal is Ni. In certain embodiments, the metal is Cr. In certain embodiments, the metal is Co. In certain embodiments, the non-metal is P.

In certain embodiments, the treating comprises contacting the effluent with at least one sorbent. In certain embodiments, the at least one sorbent is selected from the group consisting of activated carbon, one or more clay minerals, and biochar, and combinations thereof.

In certain embodiments, the at least one sorbent adsorbs P. In certain embodiments, the at least one sorbent adsorbs Fe. In certain embodiments, the at least one sorbent adsorbs Ni. In certain embodiments, the at least one sorbent adsorbs Cr. In certain embodiments, the at least one sorbent adsorbs Co.

In certain embodiments, the method further comprises measuring in the second effluent at least two parameters selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), and optionally at least one selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

In certain embodiments, the at least one container comprises at least two containers. In certain embodiments, the at least two containers are arranged in series, parallel, or any combination thereof. In certain embodiments, the at least two containers are arranged in series.

In certain embodiments, the metal silicate, metal carbonate, and/or metal oxide have a particle size which decreases in each subsequent container arranged in series. In certain embodiments, the particle size in the upstream container can be at least 2, 4, 6, 8, 10, 50, or 100 times larger than the particle size in the downstream container.

In certain embodiments, the method further comprises feeding the effluent or second effluent through at least one filter.

In certain embodiments, the filter has a porosity selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm.

In certain embodiments, the influent aqueous solution comprising dissolved aqueous and/or gaseous $CO_2$ comprises municipal wastewater. In certain embodiments, the influent aqueous solution comprising dissolved aqueous and/or gaseous $CO_2$ comprises industrial wastewater. In certain embodiments, the influent aqueous solution comprising dissolved aqueous and/or gaseous $CO_2$ comprises rainwater. In certain embodiments, the influent aqueous solution comprising dissolved aqueous and/or gaseous $CO_2$ comprises river water. In certain embodiments, the influent aqueous solution comprising dissolved aqueous and/or gaseous $CO_2$ comprises lake water. In certain embodiments, the influent aqueous solution comprising dissolved aqueous and/or gaseous $CO_2$ comprises freshwater. In certain embodiments, the influent aqueous solution comprising dissolved aqueous and/or gaseous $CO_2$ comprises tap water. In certain embodiments, the influent aqueous solution comprising dissolved aqueous and/or gaseous $CO_2$ comprises runoff. In certain embodiments, the influent aqueous solution comprising dissolved aqueous and/or gaseous $CO_2$ comprises storm water. In certain embodiments, the influent aqueous solution comprising dissolved aqueous and/or gaseous $CO_2$ comprises groundwater. In certain embodiments, the influent aqueous solution comprising dissolved aqueous and/or gaseous $CO_2$ comprises seawater.

In certain embodiments, the metal carbonate has a formula of:

$$(M^1)_m(CO_3)_n(OH)_o(L^1)_p,$$

wherein:
  $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
    wherein each occurrence of $M^1$ can comprise one element, two identical elements, or two distinct elements;
  $L^1$ is a neutral ligand, wherein the neutral ligand is optionally $H_2O$; and
    wherein m, n, o, and p are each independently numbers which are selected such that the metal carbonate has a net zero charge, and
    wherein each number is independently optionally an integer.

In certain embodiments, the metal carbonate has a formula of:

$$(M^1)_m(CO_3)_n(OH)_o(L^1)_p,$$

wherein:
  $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
    wherein each occurrence of $M^1$ can comprise one element, two identical elements, or two distinct elements;
  $L^1$ is a neutral ligand, wherein the neutral ligand is optionally $H_2O$;
  m is an integer selected from the group consisting of 1, 2, 3, and 4;
  n is an integer selected from the group consisting of 1, 2, 3, and 4;
  o is an integer ranging from 0 to 10;
  p is an integer ranging from 0 to 10; and
wherein m, n, and o are selected such that the metal carbonate has a net zero charge.

In certain embodiments, the metal silicate has a formula of:

$$(M^2)_q(SiO_4)_r(OH)_s(L^2)_t,$$

wherein:
M² comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M² can comprise one element, two identical elements, or two distinct elements;
L² is a neutral ligand, wherein the neutral ligand is optionally H₂O; and
  wherein q, r, s, and t are each independently numbers which are selected such that the metal silicate has a net zero charge, and
  wherein each number is independently optionally an integer.

In certain embodiments, the metal silicate has a formula of:

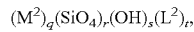

$(M^2)_q(SiO_4)_r(OH)_s(L^2)_t,$ wherein:
M² comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M² can comprise one element, two identical elements, or two distinct elements;
L² is a neutral ligand, wherein the neutral ligand is optionally H₂O;
q is an integer selected from the group consisting of 2, 3, and 4;
r is an integer selected from the group consisting of 1, 2, 3, and 4;
s is an integer ranging from 0 to 10;
t is an integer ranging from 0 to 10; and
wherein q, r, and s are selected such that the metal silicate has a net zero charge.

In certain embodiments, the metal oxide has a formula of:

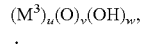

$(M^3)_u(O)_v(OH)_w,$ wherein:
M³ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M³ can comprise one element, two identical elements, or two distinct elements; and
wherein u, v, and w are each independently numbers which are selected such that the metal oxide has a net zero charge, and
wherein each number is independently optionally an integer.

In certain embodiments, the metal oxide has a formula of:

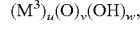

$(M^3)_u(O)_v(OH)_w,$ wherein:
M³ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M³ can comprise one element, two identical elements, or two distinct elements;

u is an integer selected from the group consisting of 1, 2, 3, and 4;
v is an integer selected from the group consisting of 0, 1, 2, 3, and 4;
w is an integer selected from the group consisting of 0, 1, 2, 3, and 4;
wherein if v is 0, then w is at least 2; and
wherein u, v, and w are selected such that the metal oxide has a net zero charge.

In certain embodiments, the metal silicate is a nesosilicate. In certain embodiments, the metal silicate is a sorosilicate. In certain embodiments, the metal silicate is a cyclosilicate. In certain embodiments, the metal silicate is an inosilicate. In certain embodiments, the metal silicate is a phyllosilicate. In certain embodiments, the metal silicate is a tectosilicate.

In certain embodiments, the nesosilicate is selected from the group consisting of a phenakite (e.g., phenakite and willemite), an olivine (e.g., forsterite (Mg₂SiO₄), fayalite, and tephroite), a garnet (e.g., pyrope, almandine, spessartine, grossular, andradite, uvarovite, and hydrogrossular), Al₂SiO₅ (e.g., andalusite, kyanite, sillimanite, dumortierite, topaz, staurolite), a humite (e.g., norbergite, chondrodite, humite, chlinohumite), datolite, titanite, chloritoid, and mullite.

In certain embodiments, the sorosilicate is selected from the group consisting of hemimorphite, lawsonite, axinite, ilvaite, epidote, zoisite, tanzanite, clinozoisite, allanite, dollaseite, and vesuvianite.

In certain embodiments, the cyclosilicate is selected from the group consisting of benitoite, papgoite, beryl, bazzite, sugilite, tourmaline, pezzottaite, osumilite, cordierite, sekaninaite, eudialyte, and milarite.

In certain embodiments, the inosilicate is selected from the group consisting of a pyroxene (e.g., enstatite, ferrosilite, pigeonite, diopside, hedenbergite, augite, jadeite, aegirine, spodumene, and pyroxferroite, a pyroxenoid (e.g., wollastonite, rhodonite, and pectolite), an amphibole (e.g., anthophyllite, cummingtonite, grunerite, tremolite, actinolite, hornblende, glaucophane, ribeckite (i.e., asbestos), and arfvednosite).

In certain embodiments, the phyllosilicate is selected from the group consisting of a serpentine (e.g., antigorite, chrysotile, lizardite), a clay mineral (e.g., halloysite, kaolinite, pyrophyllite, talc, illite, montmorillonite (i.e., smectite), chlorite, vermiculite, sepiolite, and palygorskite), a mica (e.g., biotite, fuchsite, muscovite, phlogopite, lepidolite, margarite, and glauconite).

In certain embodiments, the tectosilicate is selected from the group consisting of a 3D-silicate (e.g., quartz, tridymite, cristobalite, coesite, stishovite, moganite, and chalcedony), a feldspar (e.g., microcline, orthoclase, anorthoclase, sanidine, albite, oligoclase, andesine, labradorite, bytownite, and anorthite), a feldspathoid (e.g., nosean, cancrinite, leucite, nepheline, sodalite, hauyne, and lazurite), a scapolite (e.g., marialite and meionite); and a zeolite (e.g., natrolite, erionite, chabazite, heulandite, stilbite, scolecite, mordenite, and analcime).

In certain embodiments, the metal carbonate is a calcite. In certain embodiments, the metal carbonate is an aragonite. In certain embodiments, the metal carbonate is a dolomite. In certain embodiments, the metal carbonate is a halo- or hydroxy-carbonate. In certain embodiments, the metal carbonate is a hydrated carbonate.

In certain embodiments, the calcite is selected from the group consisting of calcite, gaspeite, magnesite, otavite, rhodochrosite, siderite, smithsonite, and spherocobaltite.

In certain embodiments, the aragonite is selected from the group consisting of aragonite, cerussite, strontianite, witherite, rutherfordine, and natrite.

In certain embodiments, the dolomite is selected from the group consisting of ankerite, dolomite, huntite, minrecordite, and barytocalcite.

In certain embodiments, the halo- or hydroxy-carbonate is selected from the group consisting of azurite, hydrocerussite, malachite, rosasite, phosgenite, hydrozincite, and aurichalcite.

In certain embodiments, the hydrated carbonate is selected from the group consisting of hydromagnesite, ikaite, lansfordite, monohydrocalcite, natron, and zellerite.

In certain embodiments, the metal oxide is magnesium oxide. In certain embodiments, the metal oxide is sodium oxide. In certain embodiments, the metal oxide is calcium oxide.

In certain embodiments, the at least one container is agitated. In certain embodiments, the agitation is performed using an agitator. In certain embodiments, the agitation is performed using a baffle. In certain embodiments, the agitation is performed using a flow pulsator. In certain embodiments, the agitation is performed using an aerator. In certain embodiments, the agitation is performed using an impellor.

In certain embodiments, the method further comprises increasing influent flow rate. In certain embodiments, the method further comprises decreasing influent flow rate. In certain embodiments, the method further comprises increasing effluent flow rate. In certain embodiments, the method further comprises decreasing effluent flow rate. In certain embodiments, the influent flow rate is increased by a factor of at least 2, 4, 6, 8, 10, 50, or 100. In certain embodiments, the influent flow rate is decreased by a factor of at least 0.99, 0.9, 0.8, 0.7, 0.6, 0.5, 0.4, 0.3, 0.2, 0.1, 0.05, or 0.01.

In certain embodiments, the metal silicate has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 µm. In certain embodiments, the metal silicate has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, the metal carbonate has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 µm. In certain embodiments, the metal carbonate has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, the metal oxide has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 µm. In certain embodiments, the metal oxide has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, measurement steps (a) and (d) are performed in discrete containers.

In certain embodiments, at least one selected from the group consisting of turbidity and total suspended solids of the effluent is measured at a first time point and a second time point, wherein the first time point precedes the second time point. In certain embodiments, the turbidity and/or total suspended solids measurements of the effluent are performed in the container in which influent and mineral feedstock contacting occurs. In certain embodiments, the turbidity and/or total suspended solids measurements of the effluent are performed in a container other than that in which the influent and mineral feedstock contacting occurs.

In certain embodiments, if the turbidity and/or total suspended solids of the effluent at the second time point is substantially less than the turbidity and/or total suspended solids of the effluent at the first time point, mineral feedstock comprising at least one selected from the group consisting of a metal silicate, a metal carbonate, and a metal oxide is added to the at least one container.

In certain embodiments, the mineral feedstock is added to the at least one container manually as a solid or as a slurry. In certain embodiments, the addition occurs via a conveyor as a solid. In certain embodiments, the addition occurs via a pump as a slurry.

In certain embodiments, the feedstock slurry is made by mixing feedstock with at least one aqueous fluid selected from the group consisting of municipal wastewater, industrial wastewater, rainwater, river water, lake water, freshwater, tap water, runoff, storm water, groundwater, and seawater, and wherein the mineral feedstock comprises at least 1% (w/w) of the slurry.

In certain embodiments, the effluent is discharged to a river. In certain embodiments, the effluent is discharged to a lake. In certain embodiments, the effluent is discharged to an ocean. In certain embodiments, the effluent is discharged to a sea. In certain embodiments, the effluent is discharged to a bay. In certain embodiments, the effluent is discharged to groundwater. In certain embodiments, the effluent is discharged to a pond. In certain embodiments, the effluent is discharged to a stream. In certain embodiments, the effluent is discharged to a wastewater reservoir.

In certain embodiments, the at least one container comprises a fluidized bed reactor. In certain embodiments, the at least one container comprises a continuous stirred tank reactor. In certain embodiments, the at least one container comprises a batch reactor. In certain embodiments, the at least one container comprises a semi-batch reactor. In certain embodiments, the at least one container comprises a pulsed bed reactor. In certain embodiments, the at least one container comprises a plug flow reactor. In certain embodiments, the at least one container comprises a fixed-bed reactor.

In another aspect, the present disclosure provides a method of at least partially sequestering $CO_2$ from a gaseous $CO_2$ source.

In certain embodiments, the method comprises: (a) providing an optionally compressed gas stream comprising $CO_2$ at a concentration ranging from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, to about 100% (v/v).

In certain embodiments, the method comprises: (b) feeding the compressed gas stream into an influent aqueous solution to provide a second influent aqueous solution comprising $CO_2$.

In certain embodiments, the method comprises: (c) measuring in the second influent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g).

In certain embodiments, the method comprises: (d) feeding the second influent aqueous solution into at least one container comprising a mineral feedstock, wherein the mineral feedstock is selected from the group consisting of a metal silicate, a metal carbonate, and a metal oxide, and combinations thereof.

In certain embodiments, the method comprises: (e) contacting the second influent aqueous solution and the mineral feedstock in the container to form an effluent aqueous solution.

In certain embodiments, the method comprises: (f) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g).

In certain embodiments, the method comprises: (g) comparing the at least two measured parameters of the second influent aqueous solution and the at least two measured parameters of the effluent aqueous solution to calculate a change in dissolved $CO_2$ concentration.

In certain embodiments, the method comprises: (h) modifying at least one parameter of the influent aqueous solution and/or contacting step if the change comprises a decrease in dissolved $CO_2$ concentration of less than about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%.

In certain embodiments, the optionally compressed gas stream comprising $CO_2$ is obtained from a direct air capture (DAC) unit. In certain embodiments, the optionally compressed gas stream comprising $CO_2$ is obtained from $CO_2$ from organic component combustion. In certain embodiments, the optionally compressed gas stream comprising $CO_2$ is obtained from direct $CO_2$ sources (e.g., flue gas). In certain embodiments, the optionally compressed gas stream comprising $CO_2$ is obtained from $CO_2$ from an industrial source. In certain embodiments, the optionally compressed gas stream comprising $CO_2$ is obtained from $CO_2$ captured from high-purity oxygen activate sludge process. In certain embodiments, the optionally compressed gas stream comprising $CO_2$ is obtained from $CO_2$ from hydrogen production. In certain embodiments, the optionally compressed gas stream comprising $CO_2$ is obtained from $CO_2$ from syngas production. In certain embodiments, the optionally compressed gas stream comprising $CO_2$ is obtained from $CO_2$ from biogas production.

In certain embodiments, the direct air capture (DAC) unit is a liquid based DAC system or a solid based DAC system.

In certain embodiments, the method further comprises measuring in the second influent aqueous solution and/or effluent aqueous solution at least one parameter selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

In certain embodiments, the at least one parameter measured in the effluent is pH. In certain embodiments, the at least one parameter measured in the effluent is alkalinity.

In certain embodiments, if the pH of the influent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the influent. In certain embodiments, if the pH of the effluent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the recirculated effluent.

In certain embodiments, the acidifying agent is $CO_2$ (g). In certain embodiments, the acidifying agent is $CO_2$ (aq). In certain embodiments, the acidifying agent is an organic acid. In certain embodiments, the acidifying agent is an inorganic acid.

In certain embodiments, the inorganic acid is $H_2CO_3$. In certain embodiments, the inorganic acid is $H_2SO_4$. In certain embodiments, the inorganic acid is $HNO_3$. In certain embodiments, the inorganic acid is HCl (aq). In certain embodiments, the inorganic acid is HCl (g).

In certain embodiments, the effluent is subjected to gas stripping if the dissolved $CO_2$ concentration of the effluent is greater than the dissolved $CO_2$ concentration of the influent. In certain embodiments, the effluent is subjected to gas stripping if the partial pressure of $CO_2$ of the effluent is greater than atmospheric partial pressure of $CO_2$.

In certain embodiments, step (c) further comprises measuring in the influent at least one selected from the group consisting of dissolved metal concentration and dissolved non-metal or metalloid concentration. In certain embodiments, step (f) further comprises measuring in the effluent at least one selected from the group consisting of dissolved metal concentration and dissolved non-metal or metalloid concentration.

In certain embodiments, the method further comprises treating the effluent to provide a second effluent, wherein the second effluent has at least one selected from the group consisting of a dissolved metal concentration and a dissolved non-metal or metalloid concentration which is less than that of the influent and/or effluent In certain embodiments, the method further comprises treating comprises aerating the effluent.

In certain embodiments, aeration results in formation of at least one selected from the group consisting of a metal oxide, a non-metal oxide, a metal hydroxide, a non-metal hydroxide, a metal oxyhydroxide, and a non-metal oxyhydroxide.

In certain embodiments, the metal is Fe. In certain embodiments, the metal is Ni. In certain embodiments, the metal is Cr. In certain embodiments, the metal is Co. In certain embodiments, the non-metal is P.

In certain embodiments, the treating comprises contacting the effluent with at least one sorbent. In certain embodiments, the at least one sorbent is selected from the group consisting of activated carbon, one or more clay minerals, and biochar, and combinations thereof.

In certain embodiments, the at least one sorbent adsorbs P. In certain embodiments, the at least one sorbent adsorbs Fe. In certain embodiments, the at least one sorbent adsorbs Ni. In certain embodiments, the at least one sorbent adsorbs Cr. In certain embodiments, the at least one sorbent adsorbs Co.

In certain embodiments, the method further comprises measuring in the second effluent at least two parameters selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), and optionally at least one selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

In certain embodiments, the at least one container comprises at least two containers. In certain embodiments, the at least two containers are arranged in series, parallel, or any combination thereof. In certain embodiments, the at least two containers are arranged in series.

In certain embodiments, the metal silicate, metal carbonate, and/or metal oxide have a particle size which decreases in each subsequent container arranged in series. In certain embodiments, the particle size in the upstream container can be at least 2, 4, 6, 8, 10, 50, or 100 times larger than the particle size in the downstream container.

In certain embodiments, the method further comprises feeding the effluent or second effluent through at least one filter.

In certain embodiments, the filter has a porosity selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm.

In certain embodiments, the influent aqueous solution comprising dissolved aqueous and/or gaseous $CO_2$ comprises municipal wastewater. In certain embodiments, the influent aqueous solution comprising dissolved aqueous and/or gaseous $CO_2$ comprises industrial wastewater. In certain embodiments, the influent aqueous solution comprising dissolved aqueous and/or gaseous $CO_2$ comprises rainwater. In certain embodiments, the influent aqueous solution comprising dissolved aqueous and/or gaseous $CO_2$ comprises river water. In certain embodiments, the influent aqueous solution comprising dissolved aqueous and/or gaseous $CO_2$ comprises lake water. In certain embodiments, the influent aqueous solution comprising dissolved aqueous and/or gaseous $CO_2$ comprises freshwater. In certain embodiments, the influent aqueous solution comprising dissolved aqueous and/or gaseous $CO_2$ comprises tap water. In certain embodiments, the influent aqueous solution comprising dissolved aqueous and/or gaseous $CO_2$ comprises runoff. In certain embodiments, the influent aqueous solution comprising dissolved aqueous and/or gaseous $CO_2$ comprises storm water. In certain embodiments, the influent aqueous solution comprising dissolved aqueous and/or gaseous $CO_2$ comprises groundwater. In certain embodiments, the influent aqueous solution comprising dissolved aqueous and/or gaseous $CO_2$ comprises seawater.

In certain embodiments, the metal carbonate has a formula of:

$$(M^1)_m(CO_3)_n(OH)_o(L^1)_p,$$

wherein:
 $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of $M^1$ can comprise one element, two identical elements, or two distinct elements;
 $L^1$ is a neutral ligand, wherein the neutral ligand is optionally $H_2O$; and
  wherein m, n, o, and p are each independently numbers which are selected such that the metal carbonate has a net zero charge, and
  wherein each number is independently optionally an integer.

In certain embodiments, the metal carbonate has a formula of:

$$(M^1)_m(CO_3)_n(OH)_o(L^1)_p,$$

wherein:
 $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of $M^1$ can comprise one element, two identical elements, or two distinct elements;
 $L^1$ is a neutral ligand, wherein the neutral ligand is optionally $H_2O$;
 m is an integer selected from the group consisting of 1, 2, 3, and 4;
 n is an integer selected from the group consisting of 1, 2, 3, and 4;
 o is an integer ranging from 0 to 10;
 p is an integer ranging from 0 to 10; and
wherein m, n, and o are selected such that the metal carbonate has a net zero charge.

In certain embodiments, the metal silicate has a formula of:

$$(M^2)_q(SiO_4)_r(OH)_s(L^2)_t,$$

wherein:
 $M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of $M^2$ can comprise one element, two identical elements, or two distinct elements;
 $L^2$ is a neutral ligand, wherein the neutral ligand is optionally $H_2O$; and wherein q, r, s, and t are each independently numbers which are selected such that the metal silicate has a net zero charge, and
wherein each number is independently optionally an integer.

In certain embodiments, the metal silicate has a formula of:

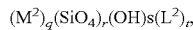
$(M^2)_q(SiO_4)_r(OH)s(L^2)_p$, wherein:
M² comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M² can comprise one element, two identical elements, or two distinct elements;
L² is a neutral ligand, wherein the neutral ligand is optionally H₂O;
q is an integer selected from the group consisting of 2, 3, and 4;
r is an integer selected from the group consisting of 1, 2, 3, and 4;
s is an integer ranging from 0 to 10;
t is an integer ranging from 0 to 10; and
wherein q, r, and s are selected such that the metal silicate has a net zero charge.

In certain embodiments, the metal oxide has a formula of:

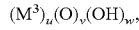
$(M^3)_u(O)_v(OH)_w$, wherein:
M³ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M³ can comprise one element, two identical elements, or two distinct elements; and
  wherein u, v, and w are each independently numbers which are selected such that the metal oxide has a net zero charge, and
  wherein each number is independently optionally an integer.

In certain embodiments, the metal oxide has a formula of:

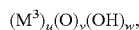
$(M^3)_u(O)_v(OH)_w$, wherein:
M³ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M³ can comprise one element, two identical elements, or two distinct elements;
u is an integer selected from the group consisting of 1, 2, 3, and 4;
v is an integer selected from the group consisting of 0, 1, 2, 3, and 4;
w is an integer selected from the group consisting of 0, 1, 2, 3, and 4;
wherein if v is 0, then w is at least 2; and
wherein u, v, and w are selected such that the metal oxide has a net zero charge.

In certain embodiments, the metal silicate is a nesosilicate. In certain embodiments, the metal silicate is a sorosilicate. In certain embodiments, the metal silicate is a cyclosilicate. In certain embodiments, the metal silicate is an inosilicate. In certain embodiments, the metal silicate is a phyllosilicate. In certain embodiments, the metal silicate is a tectosilicate.

In certain embodiments, the nesosilicate is selected from the group consisting of a phenakite (e.g., phenakite and willemite), an olivine (e.g., forsterite (Mg₂SiO₄), fayalite, and tephroite), a garnet (e.g., pyrope, almandine, spessartine, grossular, andradite, uvarovite, and hydrogrossular), Al₂SiO₅ (e.g., andalusite, kyanite, sillimanite, dumortierite, topaz, staurolite), a humite (e.g., norbergite, chondrodite, humite, chlinohumite), datolite, titanite, chloritoid, and mullite.

In certain embodiments, the sorosilicate is selected from the group consisting of hemimorphite, lawsonite, axinite, ilvaite, epidote, zoisite, tanzanite, clinozoisite, allanite, dollaseite, and vesuvianite.

In certain embodiments, the cyclosilicate is selected from the group consisting of benitoite, papgoite, beryl, bazzite, sugilite, tourmaline, pezzottaite, osumilite, cordierite, sekaninaite, eudialyte, and milarite.

In certain embodiments, the inosilicate is selected from the group consisting of a pyroxene (e.g., enstatite, ferrosilite, pigeonite, diopside, hedenbergite, augite, jadeite, aegirine, spodumene, and pyroxferroite, a pyroxenoid (e.g., wollastonite, rhodonite, and pectolite), an amphibole (e.g., anthophyllite, cummingtonite, grunerite, tremolite, actinolite, hornblende, glaucophane, ribeckite (i.e., asbestos), and arfvednosite).

In certain embodiments, the phyllosilicate is selected from the group consisting of a serpentine (e.g., antigorite, chrysotile, lizardite), a clay mineral (e.g., halloysite, kaolinite, pyrophyllite, talc, illite, montmorillonite (i.e., smectite), chlorite, vermiculite, sepiolite, and palygorskite), a mica (e.g., biotite, fuchsite, muscovite, phlogopite, lepidolite, margarite, and glauconite).

In certain embodiments, the tectosilicate is selected from the group consisting of a 3D-silicate (e.g., quartz, tridymite, cristobalite, coesite, stishovite, moganite, and chalcedony), a feldspar (e.g., microcline, orthoclase, anorthoclase, sanidine, albite, oligoclase, andesine, labradorite, bytownite, and anorthite), a feldspathoid (e.g., nosean, cancrinite, leucite, nepheline, sodalite, hauyne, and lazurite), a scapolite (e.g., marialite and meionite); and a zeolite (e.g., natrolite, erionite, chabazite, heulandite, stilbite, scolecite, mordenite, and analcime).

In certain embodiments, the metal carbonate is a calcite. In certain embodiments, the metal carbonate is an aragonite. In certain embodiments, the metal carbonate is a dolomite. In certain embodiments, the metal carbonate is a halo- or hydroxy-carbonate. In certain embodiments, the metal carbonate is a hydrated carbonate.

The calcite is selected from the group consisting of calcite, gaspeite, magnesite, otavite, rhodochrosite, siderite, smithsonite, and spherocobaltite.

In certain embodiments, the aragonite is selected from the group consisting of aragonite, cerussite, strontianite, witherite, rutherfordine, and natrite.

In certain embodiments, the dolomite is selected from the group consisting of ankerite, dolomite, huntite, minrecordite, and barytocalcite.

In certain embodiments, the halo- or hydroxy-carbonate is selected from the group consisting of azurite, hydrocerussite, malachite, rosasite, phosgenite, hydrozincite, and aurichalcite.

In certain embodiments, the hydrated carbonate is selected from the group consisting of hydromagnesite, ikaite, lansfordite, monohydrocalcite, natron, and zellerite.

In certain embodiments, the metal oxide is magnesium oxide. In certain embodiments, the metal oxide is sodium oxide. In certain embodiments, the metal oxide is calcium oxide.

In certain embodiments, the metal silicate has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm. In certain embodiments, the metal silicate has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, the metal carbonate has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm. In certain embodiments, the metal carbonate has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, the metal oxide has an average particle size selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm. In certain embodiments, the metal oxide has an average particle size selected from the group consisting of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 mm.

In certain embodiments, measurement steps (a) and (d) are performed in discrete containers.

In certain embodiments, at least one selected from the group consisting of turbidity and total suspended solids of the effluent is measured at a first time point and a second time point, wherein the first time point precedes the second time point. In certain embodiments, the turbidity and/or total suspended solids measurements of the effluent are performed in the container in which influent and mineral feedstock contacting occurs. In certain embodiments, the turbidity and/or total suspended solids measurements of the effluent are performed in a container other than that in which the influent and mineral feedstock contacting occurs.

In certain embodiments, if the turbidity and/or total suspended solids of the effluent at the second time point is substantially less than the turbidity and/or total suspended solids of the effluent at the first time point, mineral feedstock comprising at least one selected from the group consisting of a metal silicate, a metal carbonate, and a metal oxide is added to the at least one container.

In certain embodiments, the mineral feedstock is added to the at least one container manually as a solid or as a slurry. In certain embodiments, the addition occurs via a conveyor as a solid. In certain embodiments, the addition occurs via a pump as a slurry.

In certain embodiments, the feedstock slurry is made by mixing feedstock with at least one aqueous fluid selected from the group consisting of municipal wastewater, industrial wastewater, rainwater, river water, lake water, freshwater, tap water, runoff, storm water, groundwater, and seawater, and wherein the mineral feedstock comprises at least 1% (w/w) of the slurry.

In certain embodiments, the effluent is discharged to a river. In certain embodiments, the effluent is discharged to a lake. In certain embodiments, the effluent is discharged to an ocean. In certain embodiments, the effluent is discharged to a sea. In certain embodiments, the effluent is discharged to a bay. In certain embodiments, the effluent is discharged to groundwater. In certain embodiments, the effluent is discharged to a pond. In certain embodiments, the effluent is discharged to a stream. In certain embodiments, the effluent is discharged to a wastewater reservoir.

In certain embodiments, the at least one container comprises a fluidized bed reactor. In certain embodiments, the at least one container comprises a continuous stirred tank reactor. In certain embodiments, the at least one container comprises a batch reactor. In certain embodiments, the at least one container comprises a semi-batch reactor. In certain embodiments, the at least one container comprises a pulsed bed reactor. In certain embodiments, the at least one container comprises a plug flow reactor. In certain embodiments, the at least one container comprises a fixed-bed reactor.

Enhanced Weathering Systems and/or Apparatuses

In another aspect, the present disclosure provides an aqueous solution treatment system.

In certain embodiments, the treatment system comprises: (a) an influent aqueous solution inlet connected to a container by an optionally sealable junction, wherein the container comprises at least one optionally sealable inlet suitable for addition of at least one acidifying agent to an aqueous solution contained therein, and wherein the container is suitable to contain a mineral feedstock, wherein the mineral feedstock comprises at least one selected from the group consisting of a metal silicate, a metal carbonate, and a metal oxide.

In certain embodiments, the treatment system comprises: (b) an effluent aqueous solution outlet connected to the container by an optionally sealable junction,
  wherein each container is equipped with at least two sensors suitable to measure at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g), and optionally further suitable to measure at least one parameter of an aqueous solution contained therein selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration,
wherein the dissolved metal is optionally at least one metal selected from the group consisting of calcium, magnesium, nickel, iron, cobalt, chromium,
wherein the dissolved non-metal is optionally at least one non-metal or metalloid selected from the group consisting of phosphorus and silica, and
wherein each of the at least two sensors are positioned within the container at different distances from the inlet junction and/or outlet junction.

In certain embodiments, the treatment system comprises: (c) a means for comparing the at least two measured parameters at two of the at least two sensors in the container to calculate a change in dissolved $CO_2$ concentration.

In certain embodiments, the means for comparing comprises using at least two sensors suitable to measure at least two parameters selected from the group consisting of pH, alkalinity, dissolved $CO_2$ concentration, dissolved inorganic carbon concentration, bicarbonate ion concentration, carbonate ion concentration, and partial pressure of $CO_2$ in the influent and effluent and comparing the two results. In certain embodiments, the comparing is performed using computer software.

In certain embodiments, the treatment system comprises: (d) a means for controlling the change in dissolved $CO_2$ concentration via a closed loop process controller. In certain embodiments, the means for controlling comprises addition of an acidifying agent via a closed loop process controller. In certain embodiments, the means for controlling comprises aeration via a closed loop process controller. In certain embodiments, the means for controlling comprises agitation via a closed loop process controller. In certain embodiments, the means for controlling comprises increasing the partial pressure of $CO_2$ via a closed loop process controller. In certain embodiments, the means for controlling comprises recirculating the effluent flow via a closed loop process controller. In certain embodiments, the means for controlling comprises modifying the flow rate to increase, decrease, or pulse the flow via a closed loop process controller.

In certain embodiments, the acidifying agent is $CO_2$ (g). In certain embodiments, the acidifying agent is $CO_2$ (aq). In certain embodiments, the acidifying agent is an organic acid. In certain embodiments, the acidifying agent is an inorganic acid.

In certain embodiments, the inorganic acid is $H_2CO_3$. In certain embodiments, the inorganic acid is $H_2SO_4$. In certain embodiments, the inorganic acid is $HNO_3$. In certain embodiments, the inorganic acid is HCl (aq). In certain embodiments, the inorganic acid is HCl (g).

In certain embodiments, the means for controlling the change in dissolved $CO_2$ concentration comprises a closed loop process controller that modifies at least one measured parameter at the inlet junction. In certain embodiments, the means for controlling the change in dissolved $CO_2$ concentration comprises a closed loop process controller that modifies at least one contacting condition in the container which is selected from the group consisting of flow rate of the influent aqueous solution, agitation rate, flow recirculation rate or schedule, concentration (w/v %) of the metal silicate, the metal carbonate, and/or the metal oxide in the mineral feedstock.

In certain embodiments, the system comprises at least two instances of the container, which are arranged in parallel, series, or a combination thereof, and wherein each additional instance of the container is connected to each additional container by an optionally sealable junction.

In certain embodiments, the inlet and outlet junction of each instance of the container are positioned at opposing termini of the container.

In certain embodiments, the system further comprises a recirculating line, wherein the recirculating line connects a first point and a second point of the container, wherein the first point and second point are positioned within the container at different distances from the inlet junction and/or outlet junction. In certain embodiments, the system further comprises a recirculating line, wherein the recirculating line connects two instances of the container in series;
wherein the recirculating line comprises two termini which are each connected to the container with a sealable junctions.

In certain embodiments, the recirculating line permits upstream transfer of an aqueous solution.

In certain embodiments, the recirculating line facilitates recirculation of an aqueous solution contained therein upon detection of an aqueous solution having a pH less than about 8.5, 8.0, 7.5, or 7.0.

In certain embodiments, each instance of the container is equipped with a means for agitating at least one of an aqueous solution contained therein and a mineral feedstock contained therein.

In certain embodiments, the means for agitation is an agitator. In certain embodiments, the means for agitation is a baffle. In certain embodiments, the means for agitation is a flow pulsator. In certain embodiments, the means for agitation is an aerator. In certain embodiments, the means for agitation is an impellor.

In certain embodiments, the effluent outlet optionally connects to an ancillary pH adjustment system suitable to modify effluent pH to within a desired range upon detection of an aqueous liquid having a pH greater than 5 but less than 8.

In certain embodiments, each instance of the container is optionally connected to a mineral feedstock inlet by an optionally sealable junction.

In certain embodiments, the mineral feedstock inlet is connected to an aqueous mineral slurry container, wherein the aqueous mineral slurry container is equipped with a pump suitable to permit transfer of the aqueous mineral slurry contained therein to at least one instance of the container.

In certain embodiments, the system further comprises at least one gas stripper.

In certain embodiments, at least one instance of the container is equipped with a device suitable for aeration of an aqueous solution contained therein.

In certain embodiments, the system further comprises an aeration container connected to at least one instance of the container by an optionally sealable junction.

In certain embodiments, the aeration container comprises a device suitable for aeration of an aqueous solution contained therein.

In certain embodiments, the system further comprises a dissolved metal treatment container connected to at least one instance of the container by an optionally sealable junction.

In certain embodiments, the dissolved metal treatment container comprises at least one sorbent.

In certain embodiments, the at least one sorbent selected from the group consisting of activated carbon, one or more clay minerals, and biochar, and combinations thereof.

In certain embodiments, the at least one sorbent adsorbs at least one metal or non-metal.

In certain embodiments, the metal is Fe. In certain embodiments, the metal is Ni. In certain embodiments, the metal is Cr. In certain embodiments, the metal is Co. In certain embodiments, the non-metal is P.

In certain embodiments, the aeration container has an inlet which comprises the connection to at least one instance of the container, and an outlet which is optionally connected to at least one instance of the container.

In certain embodiments, the dissolved metal treatment container has an inlet which comprises the connection to at least one instance of the container, and an outlet which is optionally connected to at least one instance of the container.

In certain embodiments, each instance of the effluent outlet is equipped with at least one filter. In certain embodiments, the filter has a porosity selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 μm.

In certain embodiments, the influent aqueous solution inlet is connected to at least one water source. In certain embodiments, the water source is municipal wastewater. In certain embodiments, the water source is industrial wastewater. In certain embodiments, the water source is rainwater. In certain embodiments, the water source is river water. In certain embodiments, the water source is lake water. In certain embodiments, the water source is freshwater. In certain embodiments, the water source is tap water. In certain embodiments, the water source is runoff. In certain embodiments, the water source is storm water. In certain embodiments, the water source is groundwater. In certain embodiments, the water source is seawater.

In certain embodiments, the metal carbonate has a formula of:

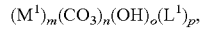
$(M^1)_m(CO_3)_n(OH)_o(L^1)_p$, wherein:
$M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^1$ can comprise one element, two identical elements, or two distinct elements;
$L^1$ is a neutral ligand, wherein the neutral ligand is optionally $H_2O$; and
wherein m, n, o, and p are each independently numbers which are selected such that the metal carbonate has a net zero charge, and
wherein each number is independently optionally an integer.

In certain embodiments, the metal carbonate has a formula of:

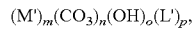
$(M')_m(CO_3)_n(OH)_o(L')_p$, wherein:
$M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^1$ can comprise one element, two identical elements, or two distinct elements;
$L^1$ is a neutral ligand, wherein the neutral ligand is optionally $H_2O$;
m is an integer selected from the group consisting of 1, 2, 3, and 4;
n is an integer selected from the group consisting of 1, 2, 3, and 4;
o is an integer ranging from 0 to 10;
p is an integer ranging from 0 to 10; and
wherein m, n, and o are selected such that the metal carbonate has a net zero charge.

In certain embodiments, the metal silicate has a formula of:

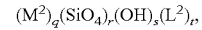
$(M^2)_q(SiO_4)_r(OH)_s(L^2)_t$, wherein:
$M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^2$ can comprise one element, two identical elements, or two distinct elements;
$L^2$ is a neutral ligand, wherein the neutral ligand is optionally $H_2O$; and
wherein q, r, s, and t are each independently numbers which are selected such that the metal silicate has a net zero charge, and
wherein each number is independently optionally an integer.

In certain embodiments, the metal silicate has a formula of:

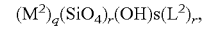
$(M^2)_q(SiO_4)_r(OH)s(L^2)_t$, wherein:
$M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^2$ can comprise one element, two identical elements, or two distinct elements;
$L^2$ is a neutral ligand, wherein the neutral ligand is optionally $H_2O$;
q is an integer selected from the group consisting of 2, 3, and 4;
r is an integer selected from the group consisting of 1, 2, 3, and 4;
s is an integer ranging from 0 to 10;
t is an integer ranging from 0 to 10; and
wherein q, r, and s are selected such that the metal silicate has a net zero charge.

In certain embodiments, the metal oxide has a formula of:

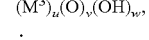
$(M^3)_u(O)_v(OH)_w$, wherein:
$M^3$ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of $M^3$ can comprise one element, two identical elements, or two distinct elements; and
  wherein u, v, and w are each independently numbers which are selected such that the metal oxide has a net zero charge, and
  wherein each number is independently optionally an integer.

In certain embodiments, the metal oxide has a formula of:

$$(M^3)_u(O)_v(OH)_w,$$

wherein:
  $M^3$ comprises at least one element selected from the group consisting of a Group IA, Group IIA, Group IIIA, Group IVA, Group IB, Group IIB, Group IIIB, Group IVB, Group VB, Group VIB, and Group VIIIB element,
    wherein each occurrence of $M^3$ can comprise one element, two identical elements, or two distinct elements;
  u is an integer selected from the group consisting of 1, 2, 3, and 4;
  v is an integer selected from the group consisting of 0, 1, 2, 3, and 4;
  w is an integer selected from the group consisting of 0, 1, 2, 3, and 4;
wherein if v is 0, then w is at least 2; and
wherein u, v, and w are selected such that the metal oxide has a net zero charge.

In certain embodiments, the metal silicate is a nesosilicate. In certain embodiments, the metal silicate is a sorosilicate. In certain embodiments, the metal silicate is a cyclosilicate. In certain embodiments, the metal silicate is an inosilicate. In certain embodiments, the metal silicate is a phyllosilicate. In certain embodiments, the metal silicate is a tectosilicate.

In certain embodiments, the nesosilicate is selected from the group consisting of a phenakite (e.g., phenakite and willemite), an olivine (e.g., forsterite ($Mg_2SiO_4$), fayalite, and tephroite), a garnet (e.g., pyrope, almandine, spessartine, grossular, andradite, uvarovite, and hydrogrossular), $Al_2SiO_5$ (e.g., andalusite, kyanite, sillimanite, dumortierite), topaz, staurolite), a humite (e.g., norbergite, chondrodite, humite, chlinohumite), datolite, titanite, chloritoid, and mullite.

In certain embodiments, the sorosilicate is selected from the group consisting of hemimorphite, lawsonite, axinite, ilvaite, epidote, zoisite, tanzanite, clinozoisite, allanite, dollaseite, and vesuvianite.

In certain embodiments, the cyclosilicate is selected from the group consisting of benitoite, papgoite, beryl, bazzite, sugilite, tourmaline, pezzottaite, osumilite, cordierite, sekaninaite, eudialyte, and milarite.

In certain embodiments, the inosilicate is selected from the group consisting of a pyroxene (e.g., enstatite, ferrosilite, pigeonite, diopside, hedenbergite, augite, jadeite, aegirine, spodumene, and pyroxferroite, a pyroxenoid (e.g., wollastonite, rhodonite, and pectolite), an amphibole (e.g., anthophyllite, cummingtonite, grunerite, tremolite, actinolite, hornblende, glaucophane, ribeckite (i.e., asbestos), and arfvednosite).

In certain embodiments, the phyllosilicate is selected from the group consisting of a serpentine (e.g., antigorite, chrysotile, lizardite), a clay mineral (e.g., halloysite, kaolinite, pyrophyllite, talc, illite, montmorillonite (i.e., smectite), chlorite, vermiculite, sepiolite, and palygorskite), a mica (e.g., biotite, fuchsite, muscovite, phlogopite, lepidolite, margarite, and glauconite).

In certain embodiments, the tectosilicate is selected from the group consisting of a 3D-silicate (e.g., quartz, tridymite, cristobalite, coesite, stishovite, moganite, and chalcedony), a feldspar (e.g., microcline, orthoclase, anorthoclase, sanidine, albite, oligoclase, andesine, labradorite, bytownite, and anorthite), a feldspathoid (e.g., nosean, cancrinite, leucite, nepheline, sodalite, hauyne, and lazurite), a scapolite (e.g., marialite and meionite); and a zeolite (e.g., natrolite, erionite, chabazite, heulandite, stilbite, scolecite, mordenite, and analcime).

In certain embodiments, the metal carbonate is a calcite. In certain embodiments, the metal carbonate is an aragonite. In certain embodiments, the metal carbonate is a dolomite. In certain embodiments, the metal carbonate is a halo- or hydroxy-carbonate. In certain embodiments, the metal carbonate is a hydrated carbonate.

In certain embodiments, the calcite is selected from the group consisting of calcite, gaspeite, magnesite, otavite, rhodochrosite, siderite, smithsonite, and spherocobaltite.

In certain embodiments, the aragonite is selected from the group consisting of aragonite, cerussite, strontianite, witherite, rutherfordine, and natrite.

In certain embodiments, the dolomite is selected from the group consisting of ankerite, dolomite, huntite, minrecordite, and barytocalcite.

In certain embodiments, the halo- or hydroxy-carbonate is selected from the group consisting of azurite, hydrocerussite, malachite, rosasite, phosgenite, hydrozincite, and aurichalcite.

In certain embodiments, the hydrated carbonate is selected from the group consisting of hydromagnesite, ikaite, lansfordite, monohydrocalcite, natron, and zellerite.

In certain embodiments, the metal oxide is magnesium oxide. In certain embodiments, the metal oxide is sodium oxide. In certain embodiments, the metal oxide is calcium oxide.

In certain embodiments, the system is a portable self-contained unit or incorporated into a non-portable structure. In certain embodiments, the system is contained in a shipping container. In certain embodiments, the system is contained in a trailer. In certain embodiments, the system is contained in a vessel equipped with wheels. In certain embodiments, the system is built on or in a barge. In certain embodiments, the system is built on or in a ship. In certain embodiments, non-portable embodiments of the system are built in a warehouse, industrial facility, municipal facility, factory, wastewater treatment plant, or dam, inter alia.

Herein are disclosed non-limiting exemplary embodiments of the systems and/or apparatuses of the present disclosure. While such exemplary embodiments may be depicted and/or described as independent embodiments, one skilled in the art appreciates that aspects of each embodiment may be modified and/or combined with features not explicitly recited in the descriptions thereof.

Exemplary Embodiment 1

Referring now to FIGS. 15-18, exemplary enhanced chemical weathering system and/or apparatus 100 of the present disclosure is shown. System and/or apparatus 100 comprises a housing unit 101 having an inlet port 103 with an optionally sealable junction 116, an outlet port 104 with an optionally sealable junction 116, and at least one reactor tank 105. In some embodiments, system and/or apparatus 100 can further include any combination of the following: a mineral feedstock port 102 with an optionally sealable junction 116, sampling and monitoring ports 106 with optionally sealable junction(s) 116, a coagulation tank 107, a flocculation tank 108, a plurality of agitators 109, a calcination loop 110 with an optionally sealable junction 116, and $CO_2$ source port 111 with an optionally sealable junction. In some embodiments, system and/or apparatus 100 may further include a recirculating air system accompanied to a $CO_2$ source, and sparging system or forced air system for fluid $CO_2$ enrichment. An air-handling system may be used to recover any unreacted $CO_2$ via vacuum to reintroduce the $CO_2$ into influent waters. With the force from inflowing water and/or with embedded agitators, the mineral feedstock may remain in suspension. In some embodiments, the mineral feedstock may not be fluidized. In some embodiments, agitators 109 comprise turbines.

In certain embodiments, system and/or apparatus 100 may further comprise one or more agitators, aerators, flow pulsators, diffusers, and/or point flow sources to maintain or introduce either a laminar or turbulent flow regime through reactor tank 105. In certain embodiments, an aqueous solution comprising dissolved $CO_2$ will first pass through a reactor tank 105 filled with mineral feedstock of larger grain sizes (i.e., greater permeability), and then subsequently through another reactor tank 105 filled with mineral feedstock of smaller grain sizes to maximize carbon capture and flow rate.

With reference now to FIGS. 15-18, the system and/or apparatus 100 can be a mobile system and/or apparatus. Housing unit 101 may be mounted on a trailer 112 having wheels 113. In certain embodiments, housing unit 101 may be fitted with a hitch to be attached to a truck. In certain embodiments, housing unit 101 may further comprise at least two stabilizing legs 114 configured to be deployed when system and/or apparatus 100 is parked for operation. In certain embodiments, housing unit 101 may be optimized for transportation with existing trucks. In certain embodiments, housing unit 101 may be any standard size available. In certain embodiments housing unit 101 may comprise a shipping container. In certain embodiments, housing unit 101 may be in or on a ship and/or barge. In certain embodiments, housing unit 101 may be in a warehouse, industrial facility, water treatment facility, and/or may be a standalone facility.

Referring now to FIGS. 15-18, housing unit 101 may have any shape known to one skilled in the art, including but not limited to rectangular, oval, etc. In certain embodiments, housing unit 101 may be made from any material known to one skilled in the art including but not limited to steel, aluminum, plastic, fiberglass or other suitable material. In various embodiments, housing unit 101 may have a length between 1 and 20, 1 and 100, or 1 and 1000 meters long. In certain embodiments, housing unit 101 may have a length greater than 1000 meters. In certain embodiments, housing unit 101 may have a length between 14-16 meters. In certain embodiments, housing unit 101 may have a length between 16-18 meters. In certain embodiments, housing unit 101 may have a length between 18-20 meters. In certain embodiments, housing unit 101 may have a length of more than 20 meters. In certain embodiments, housing unit 101 may have a length less than 14 meters. In certain embodiments, housing unit 101 may have a length between 12-14 meters. In certain embodiments, housing unit 101 may have a length between 10-12 meters. In certain embodiments, housing unit 101 may have a length between 8-10 meters. In certain embodiments, housing unit 101 may have a length between 6-8 meters. In certain embodiments, housing unit 101 may have a length between 4-6 meters. In certain embodiments, housing unit 101 may have a length between 2-4 meters.

In certain embodiments, housing unit 101 may have a height and a width of at least 2.5 meters. In certain embodiments, housing unit 101 may have a height and a width between 2-4 meters. In certain embodiments, housing unit 101 may have a height and a width between 4-6 meters. In certain embodiments, housing unit 101 may have a height and width of less than 2.5 meters. In certain embodiments, housing unit 101 may have a height and a width between 1-2.5 meters. In certain embodiments, house unit 101 may have a height and a width of greater than 2.5 meters. In certain embodiments, housing unit 101 may have a total volume of 1-50,000 m³. In certain embodiments, housing unit 101 may have a total volume of 1-50,000 m³, or 1-25,000 m³, or 1-1,000 m³, or 10-1,000 m³, or 10-5,000 m³, or 100-20,000 m³, or 200-10,000 m³, or 1,000-20,000 m³, or 5,000-10,000 m³, or 20,000-50,000 m³, or 30,000-50,000 m³, or 40,000-50,000 m³. In certain embodiments, housing unit 101 may have a total volume of greater than 50,000 m³.

In certain embodiments, inlet port 103 is positioned in an aqueous solution stream of interest and is fluidly connected to reactor tank 105. In certain embodiments, inlet port 103 comprises a pipe. In certain embodiments, inlet port 103 may further comprise an inlet pump. Inlet pump may be any pump known to one skilled in the art, configured to push water from the aqueous solution stream into reactor tank 105. In certain embodiments, inlet port 103 may have any applicable diameter ranging between approximately 10 and 1000 cm. In certain embodiments, inlet port 103 may have a diameter greater than 1000 cm. In certain embodiments, inlet port 103 may have length ranging between approximately 1 and 100 meters. In certain embodiments, inlets as contemplated and described herein may include one or more elements including but not limited to a pipe, a hose, a sprinkler, etc.

Reactor tank 105 may have any size applicable and known to one skilled in the art. In certain embodiments, a different size reactor tank 105 may be used and determined based on flow rate and chemical characteristics of the aqueous solution contained therein or designated for use therein. In certain embodiments, reactor tank 105 may have any shape including but not limited to rectangular, oval, circular, etc. Reactor tank 105 may be filled with any suitable feedstock, for example a regionally available feedstock. In some embodiments, plurality of reactor tanks 105 are fluidly connected. In certain embodiments, feedstock may be selected for the site of interest based on results from geochemical and geospatial modeling. In certain embodiments, feedstock may be suitable for capturing and sequestering carbon dioxide emissions via enhanced weathering reactions.

In certain embodiments, housing unit 101 may further comprise at least one chamber (107, 108) in fluid communication with reactor tank 105. In certain embodiments, at least one chamber may be configured for purification and filtration of an aqueous solution. In certain embodiments, at least one chamber may be any filtration means known to one skilled in the art, including but not limited to a plurality of parallel and/or sequentially arranged membrane filters, activated carbon, etc. In certain embodiments, at least one chamber may be positioned anywhere in housing unit 102. In some embodiments, at least one chamber may be fluidly connected to inlet pipe 103. In some embodiments, at least one chamber may be fluidly connected to outlet port 104. In certain embodiments, any number of chambers may be used within system and/or apparatus 100 to treat and purify an aqueous solution.

Outlet port 104 is configured to take treated aqueous solution out of housing unit 101. In certain embodiments outlet port 104 comprises a pipe. In certain embodiments, outlet port 104 may have any applicable diameter, for example ranging between approximately 10 and 1000 cm. In certain embodiments, outlet port 104 may have a length ranging between approximately 1 and 100 meters.

In certain embodiments, housing unit 101 may further comprise at least one sensor 115 including but not limited to a temperature sensor, a pH sensor, dissolved $CO_2$ sensor, partial pressure $CO_2$ sensor, alkalinity sensor(s), hardness sensor, conductivity sensor, an overflow sensor, high water level sensors, dissolved oxygen sensor, or other measurement system and/or apparatus. In certain embodiments, the at least one sensor 115 may be positioned anywhere on housing unit 101. In certain embodiments, at least one sensor 115 may be in contact with at least one chamber (105, 107, 108). In certain embodiments, at least one sensor 115 may be positioned on or inside inlet port 103. In certain embodiments, at least one sensor 115 may be positioned on or inside outlet port 104.

In certain embodiments, housing unit 101 may further comprise at least one sampling port 106. In certain embodiments, sampling port 106 may be positioned anywhere on housing unit 101 known to one skilled in the art. In certain embodiments, sampling port 106 may be positioned on or in inlet port 103. In certain embodiments, sampling port 106 may be positioned on or in outlet port 104. In certain embodiments, sampling port 106 may be positioned in fluid communication with reactor tank 105. In certain embodiments, sampling port 106 may be positioned in fluid communication with the at least one chamber (105, 107, 108).

In certain embodiments, system and/or apparatus 100 may be used with aqueous solution sources having a low pH, non-limit examples including industrial or municipal water sources. In certain embodiments, system and/or apparatus 100 may be used with aqueous solution sources having a high concentration of $CO_2$. In certain embodiments, system and/or apparatus 100 may be used with an aqueous solution source having a low concentration of chemical constituents that may foster back reactions (reactions that can cause $CO_2$ to be re-released). In certain embodiments, system and/or apparatus 100 may be used with an aqueous solution source having a high organic acid content (i.e., low molecular weight organic compounds), that is likely to inhibit the precipitation of secondary mineral phases like clays that slow down the weathering process or with added simple organics that inhibit the precipitation of secondary mineral phases. In certain embodiments, antifouling agents may be added to inlet port 103, outlet port 104, and/or reactor tank 105.

In certain embodiments, system and/or apparatus 100 may be added to an existing wastewater treatment plant, or other location where wastewaters are generated and/or treated. This may include wastewaters generated in the food and beverage industries (e.g., breweries, wineries, and dairy), pulp and papermaking processes, and automotive and metalworking industries, as well as mines (e.g., acid mine drainage). In certain embodiments, system and/or apparatus 100 may be positioned anywhere inside the water treatment plant. In certain embodiments, water from a waste stream may be configured to enter system and/or apparatus 100 before entering a wastewater treatment plant. In certain embodiments, water from the wastewater treatment plant may be directed to enter system and/or apparatus 100 after purification/filtration within the plant. In certain embodiments, water from the wastewater treatment plant may be directed to enter system and/or apparatus 100 after biological treatment within the plant. In certain embodiments, water from the wastewater treatment plant may be directed to enter system and/or apparatus 100 any time before, during, or after primary, secondary, and tertiary treatment within the plant.

In certain embodiments, reactor tank 105 includes a plurality of agitators 109 to keep feedstock and the aqueous solution contained therein well mixed. In certain embodiments, reactor tank 105 includes a specifically designed flow regime to keep feedstock and the aqueous solution contained therein in contact and/or well mixed. In certain embodiments, reactor tank 105 includes a series of filters, clarification and coagulation tanks 107 to remove and capture particulates. In some embodiments, the clarification and coagulation tanks 107 can be configured to capture metals such as nickel.

Exemplary Embodiment 2

Figure 19:
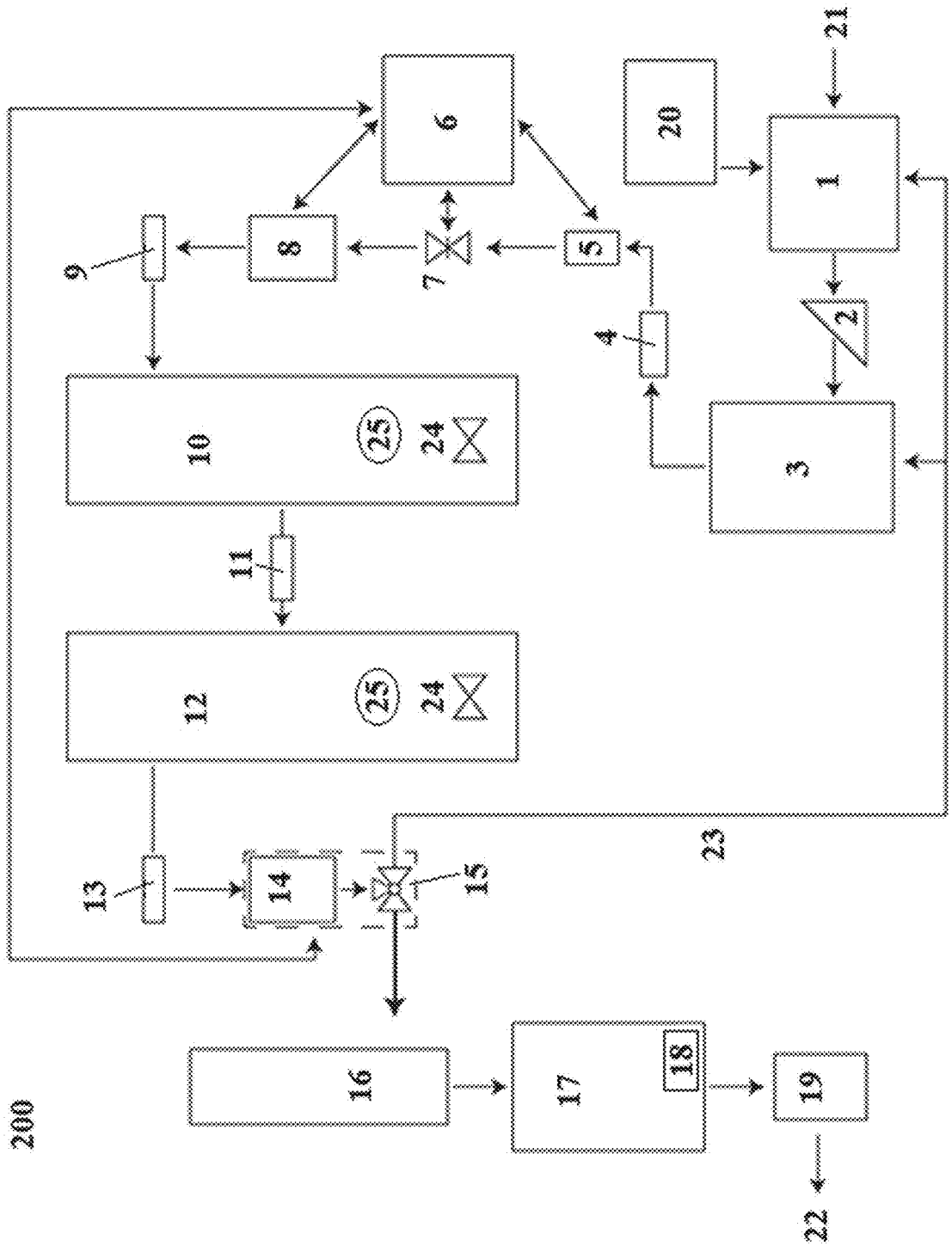
FIG. 19 provides a schematic of a prototype enhanced weathering system including a fluidized bed column design for containerized reactors.

Referring to FIG. 19, an exemplary enhanced weathering system and/or apparatus (200) of the present disclosure is shown. In certain embodiments, an influent aqueous solution (21) is in fluid communication with a holding and/or break container (1), permitting entry of the influent into the system and/or apparatus of the present disclosure. In certain embodiments, holding and/or break container (1) is in fluid communication with an external source of $CO_2$ (20). In certain embodiments, the external source of $CO_2$ can carbonate the influent aqueous solution (21) at least partially contained in the holding and/or break container (1).

In certain embodiments, the influent (21) at least partially contained in the holding and/or break container (1) can be transferred into a pressure tank and/or container (3), which is in fluid communication with the hold/break tank (1), by a pump (2). In certain embodiments, influent (21) at least partially contained in pressure tank and/or container (3) is in fluid communication with a first treatment container (10). In certain embodiments, the first treatment container (10) and the additional treatment container (12) may comprise fluidized bed reactors, batch reactors, pulsed bed reactors, fixed bed reactors, or any combination thereof. In certain embodiments, the influent (21) at least partially contained in the pressure tank and/or container (3) can be transferred to the first treatment container (10). In certain embodiments, the transfer of the influent (21) at least partially contained in the pressure tank and/or container (3) comprises contacting and/or passing through one or more components in fluid communication with the pressure tank and/or container (3) and the first treatment container (10), including a pressure regulator (4), flow meter (5), valve gate (7), influent sensor array (8), and influent sampling port (9). In certain embodiments, the flow meter (5) is in communication with and/or modified by a control system (6). In certain embodiments, the gate valve (7) is in communication with and/or modified by the control system (6). In certain embodiments, the sensor array (8) is in communication with and/or modified by the control system (6). In certain embodiments, aliquots of the influent aqueous solution (21) can be obtained using influent sampling port (9) before the influent enters the first treatment container (10).

In certain embodiments, the first treatment container (10) comprising mineral feedstock (25) further comprises an agitation system (24). In certain embodiments, the agitation system (24) is in communication with and/or is modified by the control system (6). In certain embodiments, the influent aqueous solution (21) contacts mineral feedstock (25) in the first treatment container (10). In certain embodiments, the first treatment container (10) is in fluid communication with an additional treatment container (12). In certain embodiments, an aqueous solution at least partially contained in the first treatment container (10) is transferred to the additional treatment container (12). In certain embodiments, aliquots of the aqueous solution can be obtained using intermediate sampling port (11) before the aqueous solution enters the additional treatment container (10).

In certain embodiments, the additional treatment container (12) comprising mineral feedstock (25) further comprises an agitation system (24). In certain embodiments, the influent aqueous solution (21) contacts mineral feedstock (25) in the additional treatment container (12).

In certain embodiments, the additional treatment container (12) is in fluid communication with a gas stripping container (16). In certain embodiments, the aqueous solution at least partially contained in the additional treatment container (12) can be transferred to the gas stripping container (16). In certain embodiments, the transfer of the aqueous solution to the gas stripping container (16) comprises contacting and/or passing through one or more components in fluid communication with the additional treatment container (12) and the gas stripping container (16), including an effluent sampling port (13), an effluent sensor array (14), and an automated valve (15). In certain embodiments, aliquots of the aqueous solution can be obtained using effluent sampling port (13) before the effluent contacts the effluent sensor array (14).

In certain embodiments, the effluent sensor array (14) is in communication with the control system (6). In certain embodiments, the automated valve (15) is in communication with the control system (6). In certain embodiments, the automated valve (15) is in fluid communication with each of the additional treatment container (12), gas stripping container (16), pressure container (3) via a recirculation system (23), and holding and/or break container (1) via a recirculation system (23). In certain embodiments, output data from the effluent sensor array (14) results in modification and of the automated valve (15) via control system (6).

In certain embodiments, output from the effluent sensor array (14) results in transfer of the aqueous solution from the additional container (12) to the pressure container (3) via recirculation system (23). In certain embodiments, output from the effluent sensor array (14) results in transfer of the aqueous solution from the additional container to holding and/or break container (1) via recirculation system (23). In certain embodiments, output from the effluent sensor array (14) results in transfer of the aqueous solution from the additional container (12) to the gas stripping container (16).

In certain embodiments, gas stripping container (16) is in fluid communication with aeration container (17). In certain embodiments, an aqueous solution at least partially contained in the gas stripping container can be transferred to aeration container (17).

In certain embodiments, aeration container (17) comprises an oxygen source and/or bubbler (18). In certain embodiments, aeration container (17) is in fluid communication with a filtration system (19). In certain embodiments, an aqueous solution at least partially contained in the aeration container (17) can be transferred to or through filtration system (19).

In certain embodiments, filtration system (19) is in fluid communication with an outlet. In certain embodiments, effluent (22) is discharged from the outlet.

In certain embodiments, effluent (22) can be discharged directly from automated valve (15). In certain embodiments, automated valve (15) is in fluid communication with aeration tank (17) or filtration system (19).

In certain embodiments, effluent (22) can be discharged directly from gas stripping container (16). In certain embodiments, an aqueous solution at least partially contained in the gas stripping container (16) can be transferred to filtration system (19).

In certain embodiments, effluent (22) can be discharged directly from aeration container (17).

Exemplary Embodiment 3

Figure 20:
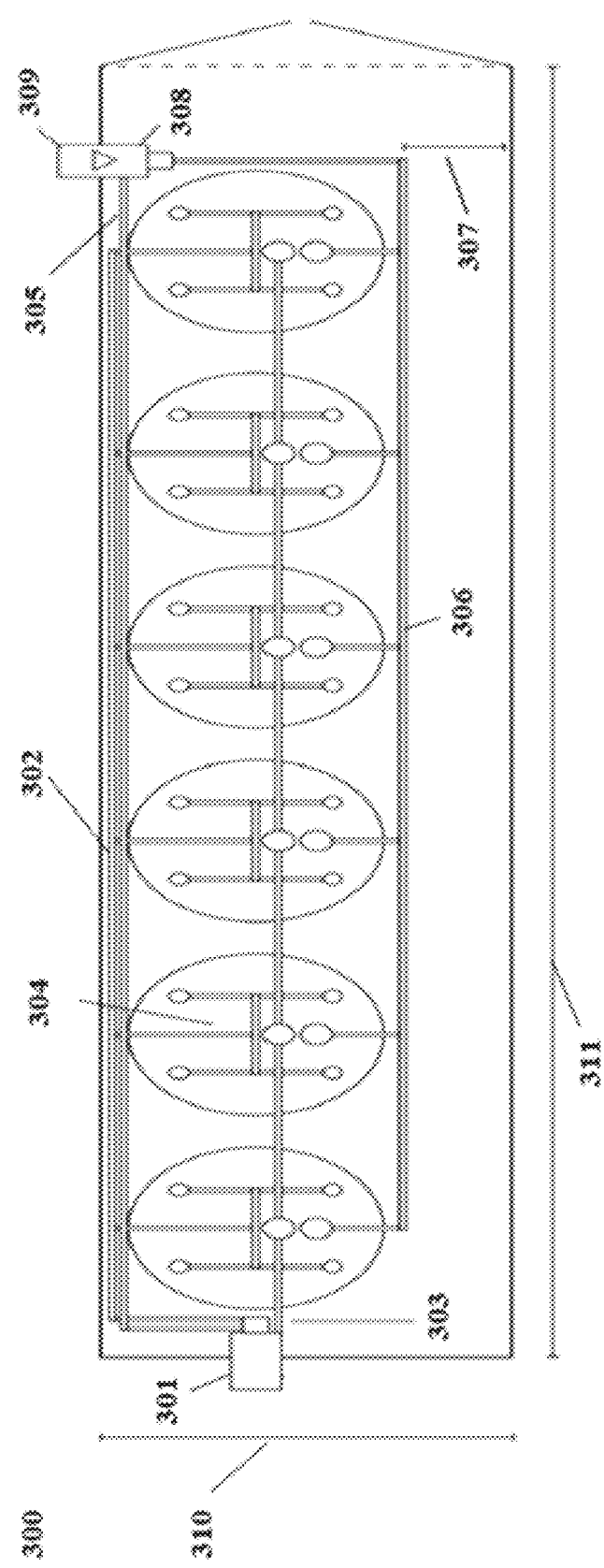
FIG. 20 depicts a schematic (top view) of an exemplary enhanced weathering system of the present disclosure, wherein the system is housed inside a standard shipping container.
Figure 21A:
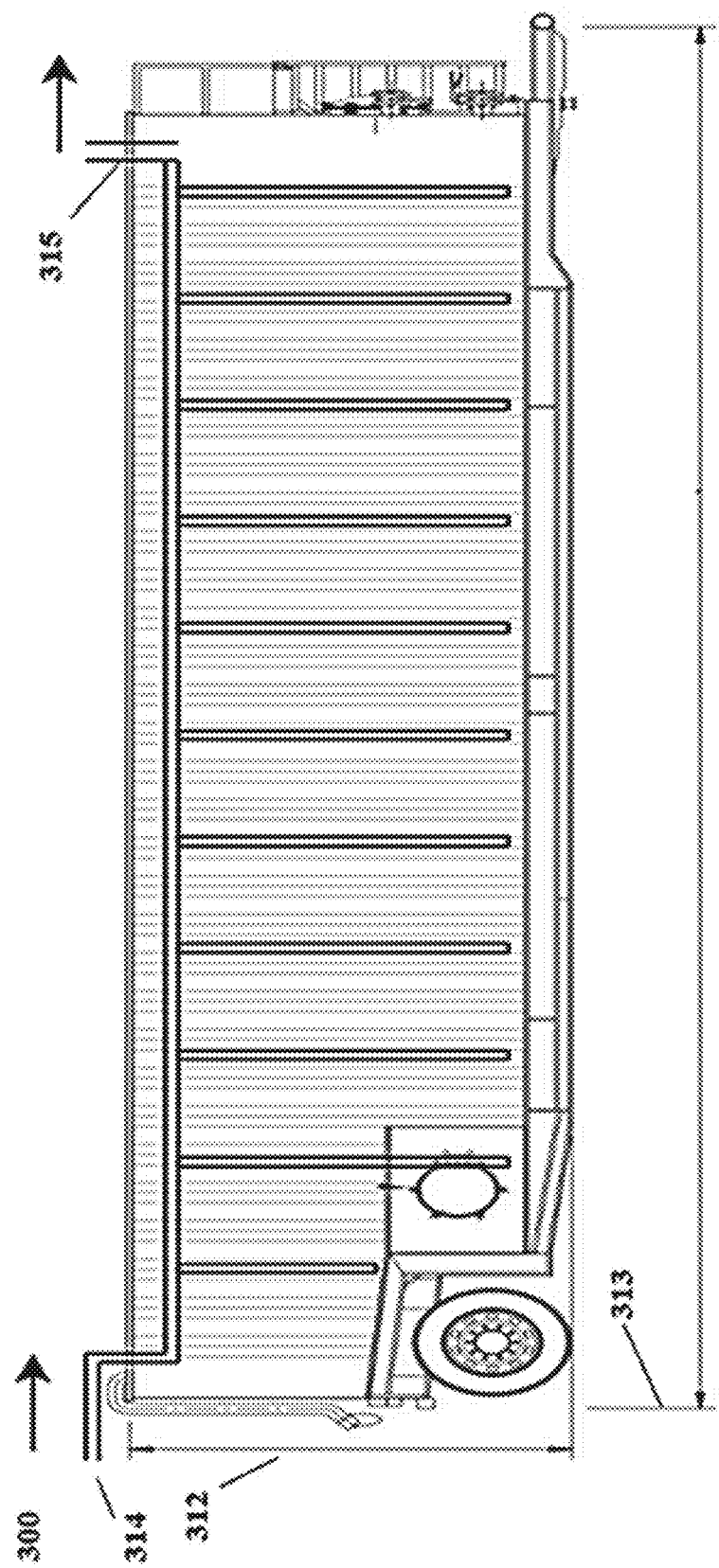
FIGS. 21A-21B depict side view (FIG. 21A) and front view (FIG. 21B) schematics of an exemplary enhanced weathering system of the present disclosure.
Figure 21B:
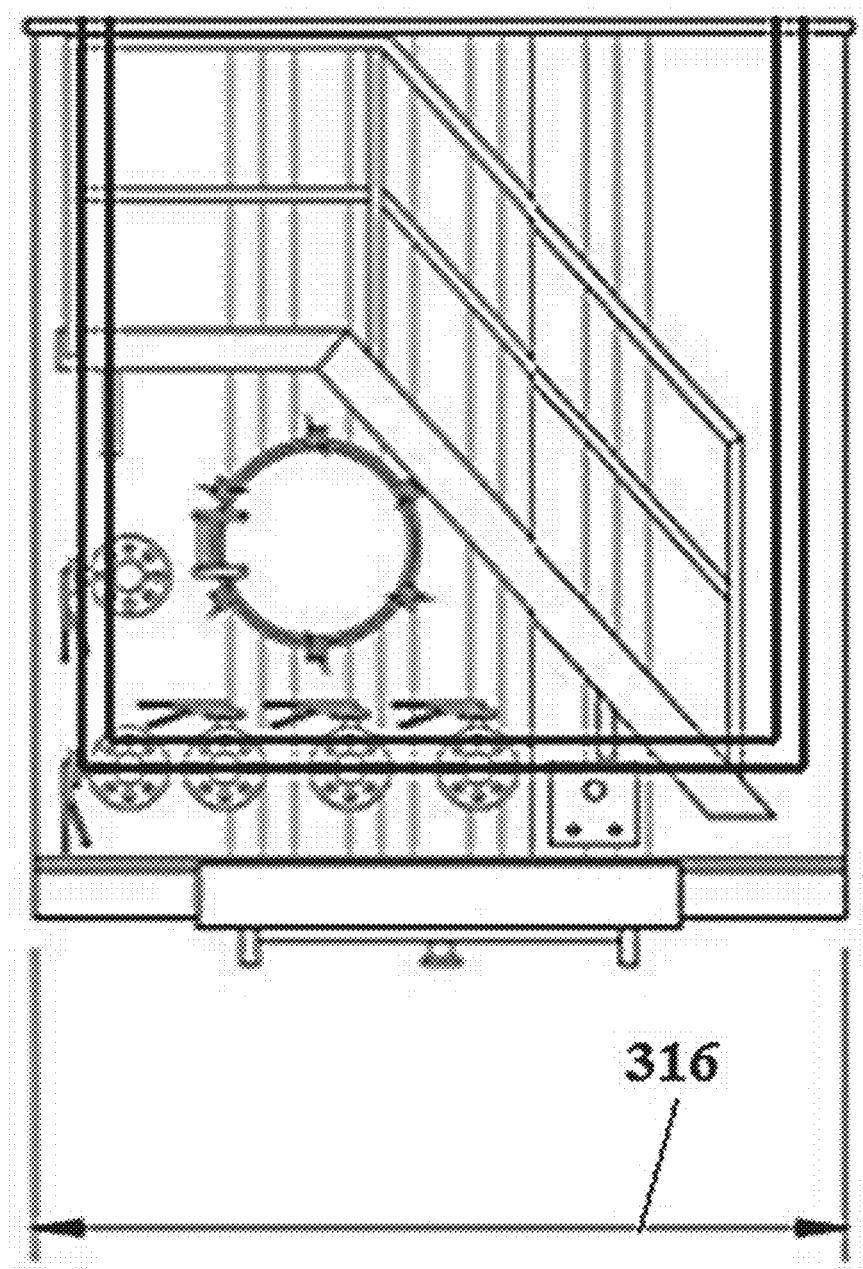

Referring to FIG. 20 and FIGS. 21A-21B, an exemplary enhanced weathering system and/or apparatus 300 of the present disclosure is shown. System and/or apparatus 300 is housed inside a shipping container. In certain embodiments, the shipping container has a length of 20-100' or more (314). In certain embodiments, the shipping container has a height of 80-160" or more (312). In certain embodiments, the shipping container has a width of approximately 2-15' or more (316). In certain embodiments, the shipping container has an inlet (314) and outlet (315) positioned at opposing termini of the container. In certain embodiments, the shipping container has an inlet (314) and outlet (315) which are not positioned at opposing termini of the container.

In certain embodiments, the shipping container further comprises one or more reactor containers. In certain embodiments, the one or more reactors occupy approximately 20-100' or more of the length of the internal compartment of the shipping container (311). In certain embodiments, the internal compartment of the shipping container is about 2-15' or more in width (310). In certain embodiments, the one or more reactors occupy about 2-15' or more of the shipping container internal compartment width, with an approximately 0-10' walkway available (307). In certain embodiments, influent enters the one or more containers and selected parameters are measured with a sensor array (301). In certain embodiments, in influent line (302) provides fluid communication of the influent source and one or more reactors, each having a diameter of about 20-100" or more, via an injection manifold (304). In certain embodiments, a feedstock injection line is in fluid communication with each of the one or more containers and permits addition of mineral feedstock as necessary (303). In certain embodiments, an effluent line (306) in fluid communication with one or more reactors transports effluent to a sensor array (308) positioned at the outlet of the internal compartment of the shipping container (309).

In certain embodiments, each container permits access to ancillary plumbing and/or electronics within the container. In certain embodiments, the use of a standard shipping container provides advantages including protection of electrical components and/or transportability. In certain embodiments, each container has a volume of about 700 gallons or more. In certain embodiments, the system has a processing capacity of about 3,500 gallons per hour or more. In certain embodiments, the configuration of the containers permit use of fluidized bed reactors, pulsed beds, and batch reactors, and any combinations thereof.

In certain embodiments, the system comprises a single fluidized bed container with a an injection manifold built into a trailer tank (e.g., epoxy-lined 40 ft shipping container designed to hold liquids and/or slurries). In such embodiments, each container comprises 360 square feet or more, with a capacity of 21,000 gallons or more. Modeling suggests that each container is capable of processing 60,000 gallons per hour or more and may capture carbon on a multi-kiloton scale. In certain embodiments, the configuration of the containers permit use of fluidized bed reactors, pulsed beds, and batch reactors, and any combinations thereof.

Exemplary Embodiment 4

Figure 22:
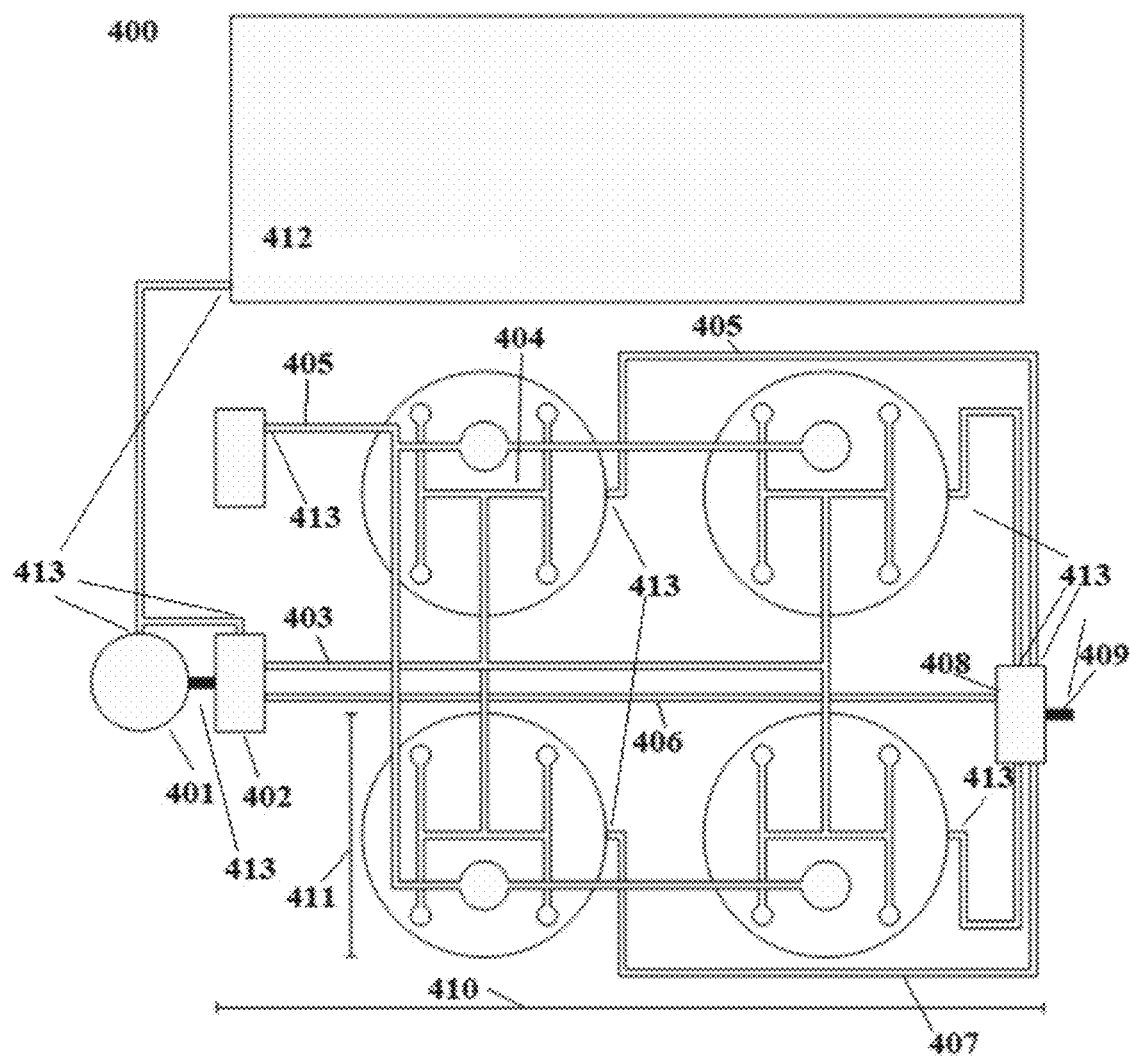
FIG. 22 depicts a schematic of an exemplary enhanced weathering system of the present disclosure. The schematic provides a conceptual overview of one embodiment of an enhanced weathering system comprising one or more containers commonly used in chemical processing.

FIG. 22 depicts a schematic of an exemplary enhanced weathering system of the present disclosure. The schematic provides a conceptual overview of one embodiment of an enhanced weathering system (400) comprising one or more containers (411) commonly used in chemical processing. In such embodiments, an external $CO_2$ source (412) is in fluid communication with the inlet via an optionally sealable junction (413) provides $CO_2(g)$ for the influent aqueous solution (e.g., freshwater) at the inlet (401). After carbonation, the bulk chemical characteristics can be measured at a sensor array (402). Next, the aqueous solution stream is passed through an influent line (403) in fluid communication with one or more reactors (e.g., fluidized beds, batch reactors, and fixed bed reactors, inter alia), which can be housed in one or more containers, via an injection manifold (404). The flow can be directed through fluidized beds, which can be arranged in parallel. Once the effluent has passed through the fluidized bed and through an effluent line (405/407), parameters of the aqueous solution can be measured again at a sensor array (408), which can result in recirculation (406) or continued flow to an oxic chamber, wherein one or more metals (e.g., iron) are precipitated. The aqueous solution can be further passed thorough an inline filter and/or stripped of any remaining $CO_2(g)$ before exiting the system (409). In certain embodiments, each container has a volume of about 100 to about 1000 gallons or more. In certain embodiments, the system has a processing capacity of about 1000 to about 10,000 gallons per hour or more. In certain embodiments, the configuration of the containers permit use of fluidized bed reactors, pulsed beds, and batch reactors, and any combinations thereof.

Exemplary Embodiment 5

Figure 23:
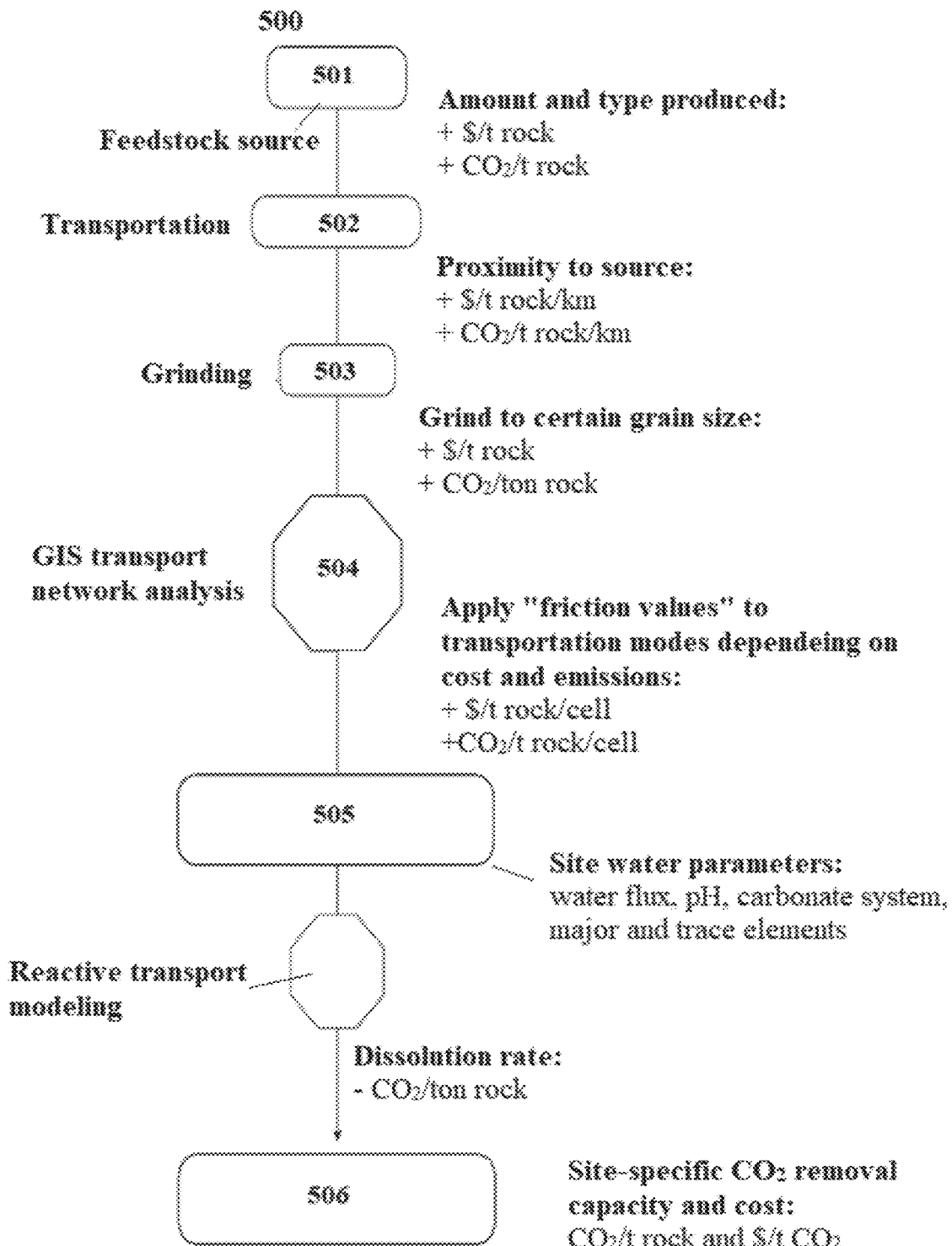
FIG. 23 is a flowchart schematic of geochemical and geospatial model of the present disclosure which is configured to identify, design, and improve site-specific $CO_2$ removal and cost, while providing a realistic estimate of how much $CO_2$ can be removed across potential clients in the market.

FIG. 23 depicts a flowchart schematic of geochemical and geospatial model (500) which is configured to identify, design, and improve site-specific $CO_2$ removal and cost, while providing a realistic estimate of how much $CO_2$ can be removed across potential clients in the market. In certain embodiments, a feedstock source is selected and financial parameters are evaluated (e.g., cost per ton mineral feedstock and/or $CO_2$ sequestration per ton mineral feedstock) (501). In certain embodiments, transportation costs are evaluated, considering the proximity to the site of deployment of the apparatus and/or system of the present disclosure (502). In certain embodiments, the cost is evaluated regarding grinding and/or preparation of the mineral feedstock (503). In certain embodiments, geospatial information systems (GIS) transport network analysis is performed by applying friction values to transportation modes depending on cost and/or emissions (504). In certain embodiments, the GIS transport network analysis (504) of the at least one parameter related to selecting, transporting, and procuring the at least one mineral feedstock is selected from the group consisting of a mineral-based feedstock type, a feedstock cost, a feedstock $CO_2$ capture rate, and a distance between a feedstock source and the water source to be treated. In certain embodiments, parameters of the aqueous solution at the potential site are evaluated (505) and a site-specific $CO_2$ removal capacity and/or cost is determined (506). In certain embodiments, the reactive transport modeling or mineral weathering modeling step (507) may include the weathering model generating a target average particle grind size of the at least one mineral feedstock. In certain embodiments, the weathering model (507) generates a flow design for the aqueous solution treatment system comprising at least one of a recirculation rate for the effluent stream or an agitation rate for the at least one container. In certain embodiments, the weathering model (507) comprises an additive and feedstock application model, comprising at least one of a feedstock application rate, an acid addition rate to the aqueous solution treatment system, or a $CO_2$ addition rate to the aqueous solution treatment system.

Exemplary Embodiment 6

Figure 28A:
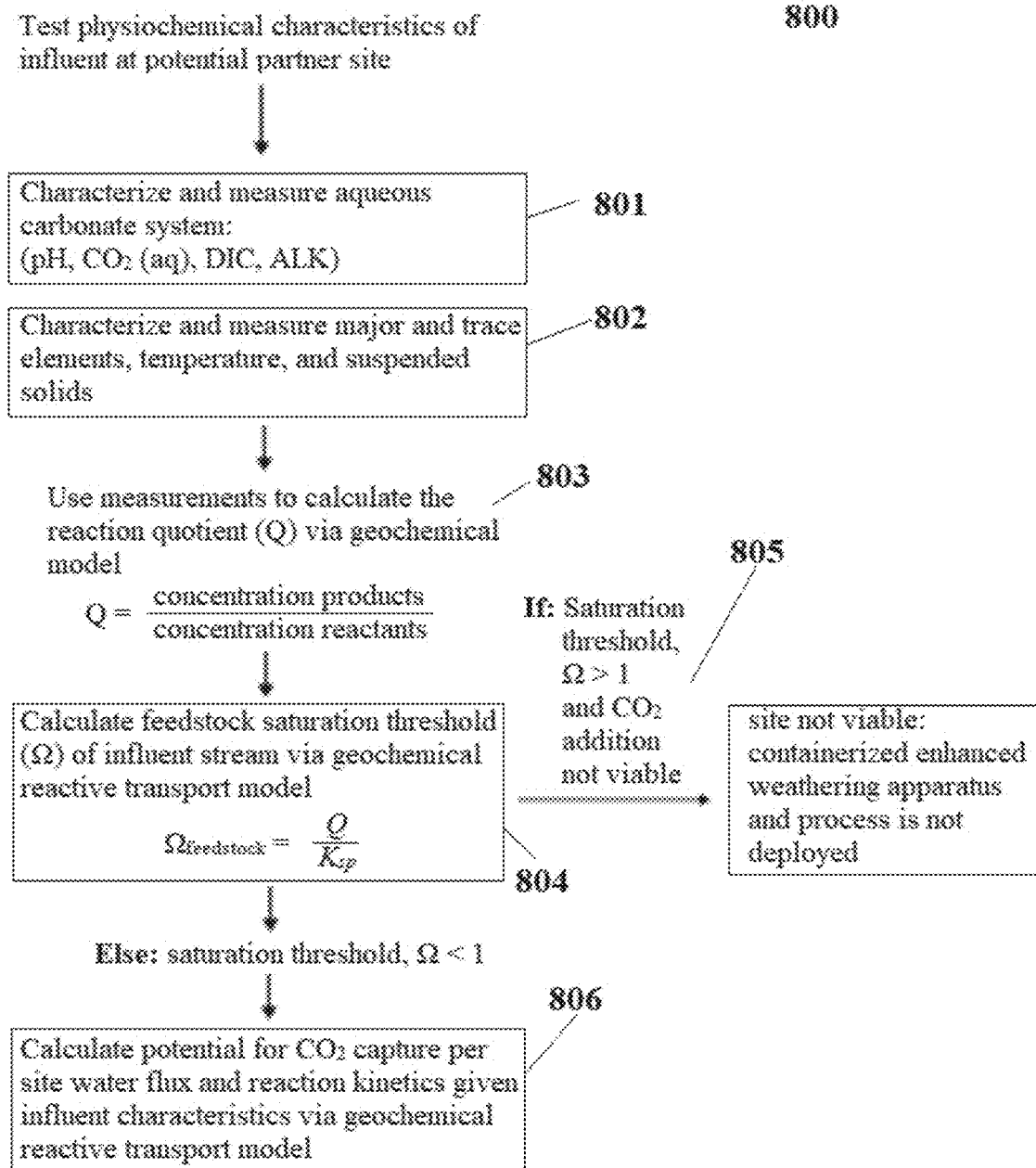
FIGS. 28A-28B provide a flow chart describing certain embodiments of the site selection methods described herein. The figures depict a flowchart schematic of the geochemical and reactive transport model of the present disclosure which is utilized to identify and design site-specific $CO_2$ removal given local physical and geochemical measurements. The geochemical and reactive transport model is composed of a series of equations used to mathematically recreate the thermodynamic and kinetic behavior of the weathering reactions and the physical transport of said reactions. The model, when run using empirical data from an aqueous solution source (e.g., municipal and industrial wastewaters, and organic matter sludge incinerator quench stream, inter alia, and/or other influent aqueous solutions equilibrated with additional $CO_2$ gas) predicts significant $CO_2$ removal rates using the containerized enhanced weathering systems, apparatuses, and/or methods of the present disclosure.
Figure 28B:
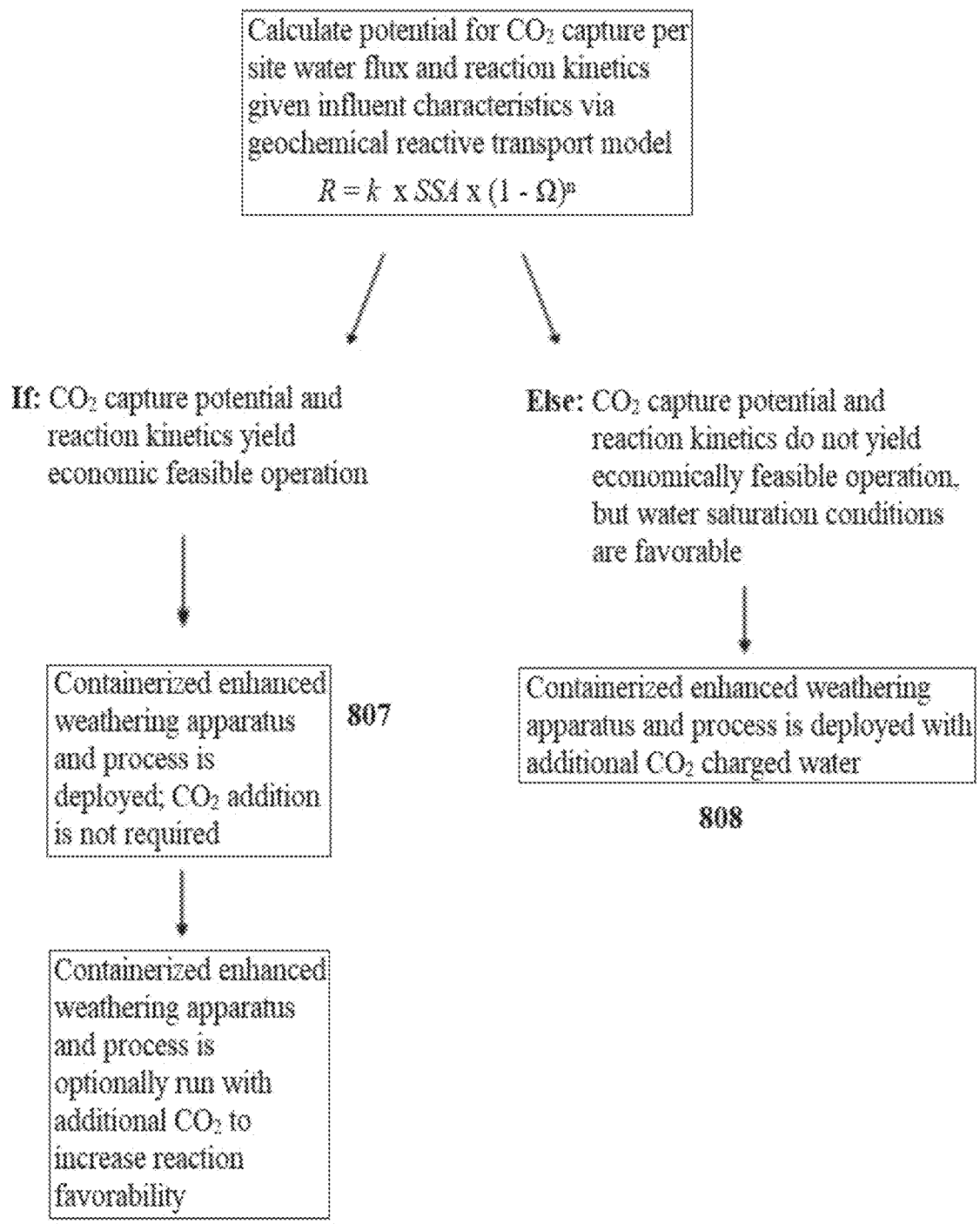

FIGS. 28A-28B depict a flow chart diagram illustrating certain mathematical and/or geochemical models (800) used for evaluation of certain enhanced weathering systems of the present disclosure. These models correspond to the reactive transport modeling or mineral weathering step (507) in FIG. 23. In certain embodiments, the physiochemical characteristics of one or more influent sources at a potential physical location are determined by measurement of one or more parameters of the influent aqueous solution selected from pH, dissolved $CO_2$ concentration, partial pressure of $CO_2$, dissolved inorganic carbon concentration, dissolved bicarbonate ion concentration, dissolved carbonate ion concentration, and alkalinity (801). In certain embodiments, concentration of major and trace elements, temperature, conductivity, and suspended solids of the influent aqueous solution are measured (802).

In certain embodiments, the measurements are used as input to calculate a reaction quotient (Q) via a geochemical model (i.e., Q=concentration products/concentration reactants) (803). In certain embodiments, the feedstock saturation threshold ($\Omega$) of the influent aqueous solution source is calculated via a geochemical model ($\Omega$=Q/Ksp) (804).

In certain embodiments, if the saturation threshold ($\Omega$) is greater than 1 and addition n of gaseous $CO_2$ is not viable, the site is considered not viable (805).

In other embodiments, wherein the saturation threshold ($\Omega$) is less than 1, the potential for $CO_2$ capture per site water flux and reaction kinetics given the characteristics of the influent is calculated via a geochemical reactive transport model (R=k·SSA·(1–$\Omega$)$^n$) (806).

In certain embodiments, if the $CO_2$ capture potential and reaction kinetics yield economically feasible operation, a containerized enhanced weathering apparatus and/or system of the present disclosure is deployed and $CO_2$ addition is not required (807). In other embodiments, if the $CO_2$ capture potential and reaction kinetics do not yield an economically feasible operation, but water saturation conditions are favorable, a containerized enhanced weathering apparatus and/or system of the present disclosure is deployed, and equipped with an exogenous source of $CO_2$ for treatment of the influent aqueous solution (808).

Exemplary Embodiment 7

Figure 29:
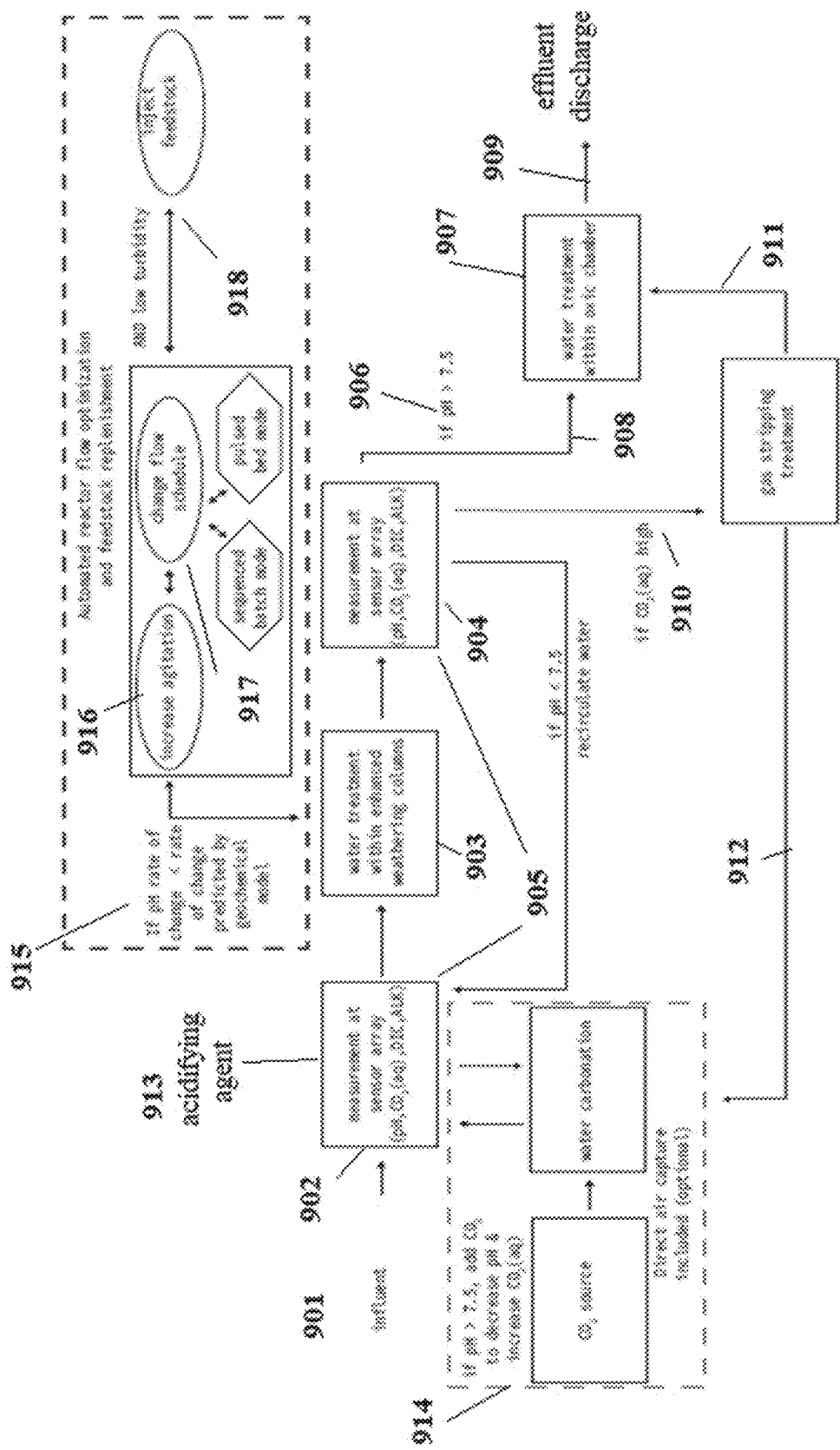
FIG. 29 provides a flow diagram describing certain control parameters of certain embodiments of the use of exemplary enhanced weathering systems of the present disclosure.

FIG. 29 depicts a control flow diagram indicating certain controlling features used in the methods described herein for enhanced weathering (900). In certain embodiments, influent enters the system via an inlet with an optionally sealable junction (901). In certain embodiments, the influent contacts one or more sensor arrays which measure at least two parameters selected from the group consisting of pH, dissolved $CO_2$ concentration, partial pressure of $CO_2$, dissolved inorganic carbon concentration, and alkalinity (902).

In certain embodiments, if the pH of the influent is greater than about 7.5, the influent is treated with an acidifying agent (913) or gaseous $CO_2$ stream (914) via one or more optionally sealable junctions. In certain embodiments, if the dissolved concentration of $CO_2$ is low, the influent is treated with a gaseous $CO_2$ stream (914).

In certain embodiments, influent enters one or more reactors and/or containers comprising at least one mineral feedstock (903) and subsequently contacts one or more sensor arrays which measure at least two selected from the group consisting of pH, dissolved $CO_2$ concentration, partial pressure of $CO_2$, dissolved inorganic carbon concentration, and alkalinity (904). In certain embodiments, the sensor arrays (902) and (904) are positioned at opposing termini of the one or more containers or the sensor arrays (902) and (904) are position different distances from the inlet and/or outlet (905) of the one or more reactors and/or containers comprising at least one mineral feedstock (903).

In certain embodiments, if the pH is greater than 7.5 (906), the treated influent (i.e., first effluent) is transferred to an oxic chamber (907) via an optionally sealable junction (908) in fluid communication with the one or more containers (903). In certain embodiments, the oxic chamber (907) facilitate precipitation of one or more metals dissolved in the first effluent, providing a second effluent, which can be discharged via an outlet (909).

In certain embodiments, if the dissolved concentration of $CO_2$ is high (910), the treated influent (i.e., first effluent) is subjected to gas stripping in a gas stripping line and/or container (919) providing a gaseous $CO_2$ stream and a degassed first effluent (911). In certain embodiments, the degassed first effluent is transferred to the oxic chamber (907) via an optionally sealable junction in fluid communication with the gas stripping line and/or container (919). In certain embodiments, the oxic chamber (907) facilitates precipitation of one or more metals dissolved in the degassed first effluent, providing a second effluent, which can be discharged via an outlet (909). In certain embodiments, the gaseous $CO_2$ stream is transferred to a $CO_2$ (g) storage container via an optionally sealable $CO_2$ line (912) in fluid communication with the gas stripping line and/or container (914).

In certain embodiments, if the rate of pH change detected between sensor arrays (902) and (904) are less than the rate predicted by geochemical modeling, then at least one of the following applies (915): agitation of the mineral feedstock in the at least one container (903) is initiated and/or increased (916); and/or a change of flow schedule occurs (917). In certain embodiments, the change in flow schedule (917) comprises sequenced batch mode. In certain embodiments, the change in flow schedule (917) comprises pulsed bed mode.

In certain embodiments, if the rate of pH change detected between sensor arrays (902) and (904) are less than the rate predicted by geochemical modeling and low turbidity or total suspended solids of the aqueous solution in the at least one container (903) is detected, then mineral feedstock is added to the at least one container (903) as a solid, slurry, or any combination thereof (918).

Site Selection Methods

In another aspect, the present disclosure provides a method of optimizing the design and operation of a system for at least partial sequestration of $CO_2$ from a water source.

In certain embodiments, the method comprises: (a) determining values for at least two parameters of the water source.

In certain embodiments, the treatment system comprises: (b) determining at least one parameter related to selecting, transporting, and procuring at least one mineral feedstock, wherein the at least one mineral feedstock comprises a metal silicate, a metal carbonate, and a metal oxide, or any combination thereof.

In certain embodiments, the treatment system comprises: (c) performing a geospatial information systems (GIS) transport network analysis of the at least one parameter related to selecting, transporting and procuring the at least one mineral feedstock.

In certain embodiments, the treatment system comprises: (d) calculating a weathering model of the at least two parameters of the water source and the GIS transport network analysis results.

In certain embodiments, the treatment system comprises: (e) designing and operating an aqueous solution treatment system comprising at least one container for at least partially sequestering $CO_2$ from the source of water according to an output of the weathering model.

In certain embodiments, the aqueous solution treatment system further comprises a system of the present disclosure.

In certain embodiments, the method further comprises: (f) measuring at least two parameters of an effluent stream from the aqueous solution treatment system.

In certain embodiments, the method further comprises: (g) updating the reactive transport model with the measured at least two parameters of the effluent stream.

In certain embodiments, the method further comprises: (h) recalculating the weathering model based on the updated reactive transport model.

In certain embodiments, the at least two parameters of the water source are selected from the group consisting pH, alkalinity, dissolved $CO_2$ concentration, dissolved inorganic carbon (DIC) concentration, bicarbonate ion concentration, carbonate ion concentration, temperature, and partial pressure of $CO_2$ (g).

In certain embodiments, the at least two parameters of the effluent stream are selected from the group consisting of pH, alkalinity, dissolved $CO_2$ concentration, dissolved inorganic carbon (DIC) concentration, bicarbonate ion concentration, carbonate ion concentration, temperature, and partial pressure of $CO_2$ (g).

In certain embodiments, the at least one parameter related to procuring at least one mineral feedstock is a mineral-based feedstock type. In certain embodiments, the at least one parameter related to procuring at least one mineral feedstock is a feedstock cost. In certain embodiments, the at least one parameter related to procuring at least one mineral feedstock is a feedstock $CO_2$ capture rate. In certain embodiments, the at least one parameter related to procuring at least one mineral feedstock is a distance between a feedstock source and the water source to be treated.

In certain embodiments, the weathering model generates a target average particle grind size of the at least one mineral feedstock.

In certain embodiments, the weathering model generates a flow design for the aqueous solution treatment system comprising at least one of a recirculation rate for the effluent stream or an agitation rate for the at least one container.

In certain embodiments, the weathering model comprises an additive and feedstock application model, comprising at least one of a feedstock application rate, an acid addition rate to the aqueous solution treatment system, or a $CO_2$ addition rate to the aqueous solution treatment system.

In certain embodiments, the water source is municipal wastewater. In certain embodiments, the water source is industrial wastewater. In certain embodiments, the water source is rainwater. In certain embodiments, the water source is river water. In certain embodiments, the water source is lake water. In certain embodiments, the water source is freshwater. In certain embodiments, the water source is tap water. In certain embodiments, the water source is runoff. In certain embodiments, the water source is storm water. In certain embodiments, the water source is groundwater. In certain embodiments, the water source is seawater.

To inform project design for each selected site, a series of initial guiding analyses is conducted which is then tested through field trials. Analyses include geospatial analysis, geochemical modeling, initial theoretical lifecycle assessment, identification of relevant of local, state, and federal regulations, and articulation of potential environmental as well as health and safety risks.

After the pilot deployments, the results are used to compare the accuracy of the initial geochemical models, cost estimates, lifecycle assessments, and environmental impact analyses. With these results, a more refined, coupled geochemical modeling and geospatial analysis is conducted to identify wastewater treatment plants in optimal settings for field trials and applications worldwide, and to explore supportive business models.

The present disclosure provides a workflow schematic of geochemical and geospatial model (FIG. 23). The geochemical and geospatial model is configured to help identify, design, and improve site-specific $CO_2$ removal and cost, while providing a realistic estimate of how much $CO_2$ can be removed across potential clients in the market. Using chemical and physical data captured by the Unit, the geochemical model may be used to prescribe, alter, and/or specify various parameters of the Unit. Depending on physiochemical parameters of local wastewaters, the model may determine the grinding regime such that weathering rates are maximized. Depending on physiochemical parameters of local wastewaters, the model may additionally or alternatively determine the frequency of wastewater flow recirculation and/or flow agitation to increase or enhance the weathering potential of the system. Depending on physiochemical parameters of local wastewaters, the model may be configured to identify when and/or how much feedstock and/or other additives (including but not limited to hydrochloric acid to break up cementation of feedstock) are delivered to the Unit. Depending on physiochemical parameters of local wastewaters, the model may be configured to identify when and how much of a $CO_2$ source is added to the unit.

In some embodiments, a model as shown in FIG. 23 may further include one or more geospatial modeling elements as included in the GIS transport network analysis. As contemplated herein, geospatial modeling analysis further refine the performance of the overall model of FIG. 23 by including cost of feedstock (for example per ton of rock), carbon capture potential (for example per ton of rock), and cost of transporting feedstock from one or more sources to a treatment site. Transport costs may include distance, available transportation means and associated costs, etc. The result of the combination of the reactive transport model and the transport network model is a holistic model for carbon capture using weathering, including one or more selected sources of one or more mineral feedstocks, cost-effective mining methods and transportation routes from the source to a water treatment site, a target particle size for grinding the delivered feedstock, a flow design including recirculation and/or agitation rates, and optional additive, feedstock, and $CO_2$ application rates to the system. Once calculated, the model may be constructed at a site of a flow of water with the constructed system used to treat the water. In some embodiments, one or more parameters of the water flowing out of the system constructed from the calculated model may be measured and fed back into the modeling calculations, to refine and improve the model for current and/or future iterations.

EXAMPLES

Various embodiments of the present application can be better understood by reference to the following Examples which are offered by way of illustration. The scope of the present application is not limited to the Examples given herein.

Example 1: Carbon Captured Using an Enhanced Weathering System (Tap Water and/or Acidified Deionized Water)

The present disclosure provides an exemplary embodiment of the enhanced weathering systems and/or apparatus of the present disclosure for carbon dioxide capture. In certain embodiments, the exemplary system of the present disclosure comprises a fluidized bed reactor. In other embodiments, the exemplary system of the present disclosure comprises a batch reactor.

In the experiments provided herein, the total change in $pCO_2$ and total percentage of $CO_2$ removed throughout the course of the weathering process was observed and/or measured in a system and/or apparatus corresponding to Exemplary Embodiment 2 (FIG. 19). The mineral feedstocks used in the present example included olivine (i.e., as representative of an exemplary metal silicate) and dolomite and calcite (i.e., as representative of exemplary metal carbonates). More specifically, the feedstocks used in the present example included coarse-grained olivine with a mean grain size of 117 μm, fine-grained olivine with a mean grain size of <63 μm, medium-grained dolomitic limestone with a mean grain size of ~200 μm, coarse-grained calcitic limestone with a mean grain size of ~1,000 μm, and fine-grained calcitic limestone with a mean grain size of <63 μm. The systems, apparatuses, and/or methods are not limited to the metal silicates and/or metal carbonates exemplified herein, and alternative metal silicates and/or metal carbonates are contemplated for successful use in the present disclosure. In the fluidized bed experiments, gaseous $CO_2$ was bubbled into influent water (tap water) to increase the dissolved $CO_2$ concentration in the influent waters. These $CO_2$-charged fluids were pumped through the fluidized-bed reactor and contacted with mineral feedstock at a flow rate of 1 L/min. The change in $pCO_2$ is the difference in the continuously measured $pCO_2$ at the influent and effluent in the system that is operated continuously.

In these experiments, feedstock was loaded via slurry pump into the prototype unit (i.e., Exemplary Embodiment 2; FIG. 19). In the fluidized bed experiments, these results demonstrate that 20-81% of dissolved $CO_2$ was removed from the influent fluid. Of these, dolomitic limestone was the most effective at removing $CO_2$, followed by calcitic limestone, fine-grained olivine, and coarse-grained olivine.

When comparing results for metal silicates, it was unexpected observed that fine-grained olivine feedstock outperformed the coarse-grained olivine feedstock by a factor of approximately 2.4. However, this factor may be varied depending on feedstock grain sizes, reactor style, and flow rate. As such, these removal efficiencies can be controlled by changing certain parameters of the system and apparatus such as flow rate, reactor style, feedstock type, and feedstock grain size, inter alia. For example, capture efficiency can be increased as demonstrated by changing water:rock contact times and water:rock ratios (cf fluidized bed and batch reactor results in Tables 2A-2B).

In batch reactor experiments, dolomitic limestone (average grain size 200 um) was mixed with a) Milli-Q water acidified with HCl to a pH of 3.5 and b) Milli-Q water equilibrated with 0.01 mol/kg dissolved inorganic carbon (DIC) and acidified to a pH of 3.5. The acidification of these fluids was meant to mimic the pH conditions of the incinerator wastewater stream. These experiments were performed in sealed batch reactors and stirred constantly. Water:rock ratio ranged from 5:1-100:1 to investigate the effect of feedstock mass on $CO_2$ removal efficiency. Surprisingly, in the batch reactor experiments, these results demonstrate that 80-97% of dissolved $CO_2$ was removed from the influent fluid with the highest percentage of removed $CO_2$ was the experiment with the highest water:rock ratio (10:1), indicating near perfect removal of $CO_2$ in the influent aqueous solution. These results indicated that by controlling the water:rock contact time (i.e., comparing results from fluidized bed reactors and batch reactors), $CO_2$ removal can be optimized.

TABLE 2A

Change in $pCO_2$ and $CO_2$ removal with enhanced weathering

| Experiment No. | Aqueous Solution | Feedstock Type | Feedstock Mineral | Grain Size (μm) | Water:Mineral Ratio |
|---|---|---|---|---|---|
| 1 | A | Metal silicate | Olivine | 120 | — |
| 2 | A | Metal silicate | Olivine | <63 | — |
| 3 | A | Metal carbonate | Dolomite | 150-250 | — |
| 4 | A | Metal carbonate | Calcite | 1000 | — |
| 5 | A | Metal carbonate | Calcite | 1000 ± <0.63 | — |
| 6 | B | Metal carbonate | Dolomite | 150-250 | 10:1 |
| 7 | B | Metal carbonate | Dolomite | 150-250 | 50:1 |
| 8 | B | Metal carbonate | Dolomite | 150-250 | 100:1 |

Aqueous Solution A - Tap Water + $CO_2$; Aqueous Solution B - Milli-Q + HCl + $NaHCO_3$.

TABLE 2B

Change in $pCO_2$ and $CO_2$ removal with enhanced weathering

| Experiment No. | Duration (min) | Reactor | Starting/Ending pH | ΔpCO$_2$ (atm) | % CO$_2$ removed |
|---|---|---|---|---|---|
| 1 | 10080 | Fluidized Bed | 5.01/6.06 | −1.53 | 22 |
| 2 | 5760 | Fluidized Bed | 5.05/6.22 | −4.72 | 47 |
| 3 | 4020 | Fluidized Bed | 4.46/6.89 | −15.9 | 81 |
| 4 | 300 | Fluidized Bed | 4.36/5.85 | −2.27 | 65 |
| 5 | 120 | Fluidized Bed | 4.41/5.82 | −1.403 | 67 |
| 6 | 5760 | Batch | 3.5/7.61 | −0.316 | 97 |
| 7 | 5760 | Batch | 3.5/7.19 | −0.298 | 91 |
| 8 | 5760 | Batch | 3.5/6.93 | −0.261 | 80 |

Example 2: Carbon Capture Using an Enhanced Weathering System (Wastewater Derived from Organic Matter Sludge Incinerator Quench Stream)

Figure 24A:
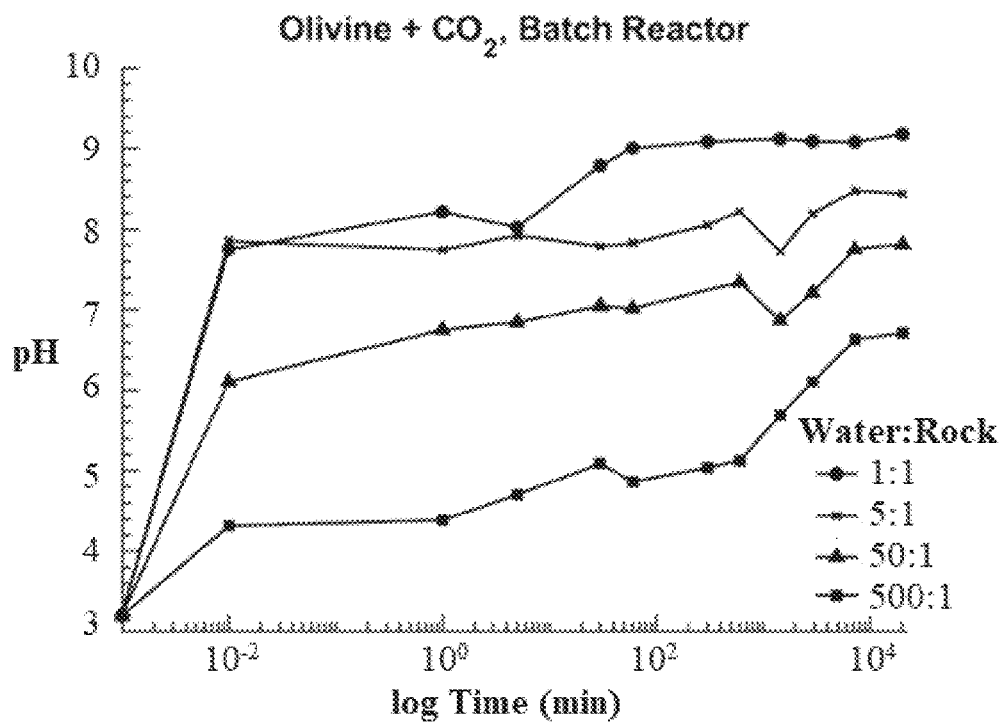
FIG. 24A: depicts a graph of measured data from actual experiments in the present disclosure depicting neutralization of acidic wastewater stream taken from the organic matter sludge incinerator quench stream from a municipal wastewater treatment facility using fine-grained olivine as a mineral feedstock under various water:rock ratios in batch reactors.
Figure 24B:
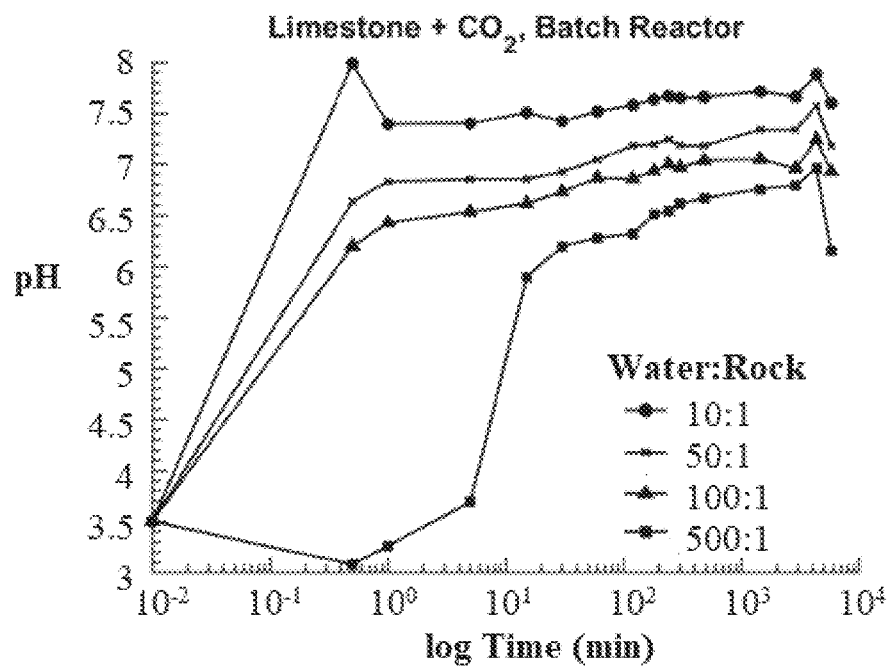
FIG. 24B: provides a graph of measured data from actual experiments of the present disclosure change in pH with time for dolomitic limestone in batch reactors at varying water:rock ratios.

The present disclosure provides an exemplary embodiment of the enhanced weathering systems and/or apparatus of the present disclosure for carbon dioxide capture. In certain embodiments, the exemplary system of the present disclosure comprises a fluidized bed reactor. In other embodiments, the exemplary system of the present disclosure comprises a batch reactor. The present example utilized an embodiment of the system of the present disclosure comprising batch reactor(s) (FIGS. 24A-24B).

In certain embodiments, the enhanced weathering systems and/or apparatuses, and methods of use thereof, are suitable for carbon capture using acidic wastewater stream taken from the organic matter sludge incinerator quench stream from a municipal wastewater treatment facility. In certain embodiments of the system of the present example, fine-grained olivine with a mean grain size of 12 μm was used as mineral feedstock under various water:rock ratios in batch reactors. The water stream is a fluid equilibrated with 10-20% $CO_2$. With a starting pH of ~3.2, the acidic wastewater stream is adjusted by 1.5-6 pH units within 20 minutes implying rapid conversion of dissolved $CO_2$ in the wastewater stream to bicarbonate ($HCO_3^-$; FIG. 2). The rate of pH change was unexpectedly rapid and points to the optimization of feedstock grain size, which can be controlled by milling feedstock to finer particle sizes, thereby increasing surface area, and water:rock contact time. The distribution of carbon species is a function of pH, and given that the starting pH is 3.2, it implies that all carbon is in the form of dissolved $CO_2$ in the untreated water (FIG. 2).

The present example further demonstrates a change in pH with time for dolomitic limestone in batch reactors at varying water:rock ratios. For all experiments, the starting pH was 3.5. The starting fluid was deionized water equilibrated with 0.01 mol/L dissolved inorganic carbon (DIC), sealed to prevent solution degassing, and acidified to a pH of 3.5 with 5% HCl to convert dissolved bicarbonate ($HCO_3^-$) to dissolved $CO_2$. As described above, the acidic, $CO_2$-rich fluid is rapidly neutralized, with a pH increase of 2.9-3.9 pH units within 1 minute of reaction and all experiments shown reaching a pH of 7 with 1 hour of reaction. The rate of pH change was unexpectedly rapid and points to the optimization of feedstock type. This pH increase implies conversion of dissolved $CO_2$ to bicarbonate (FIG. 2), which can then be considered captured carbon.

Figure 25A:
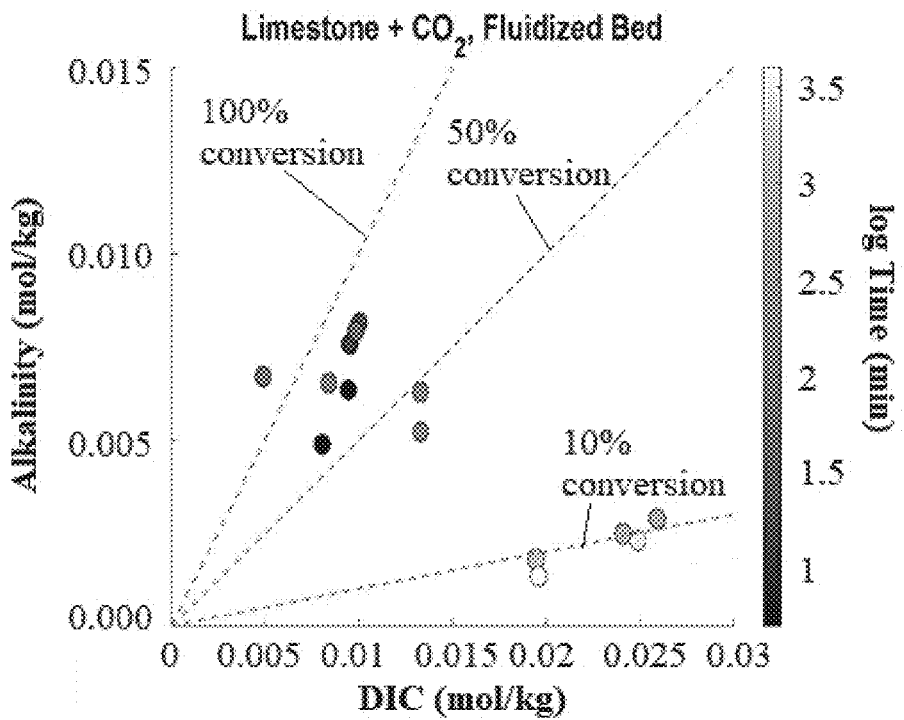
FIGS. 25A-25B provide graphs of measured data from actual experiments of the present disclosure showing alkalinity versus dissolved inorganic carbon (DIC) in the effluent. This relationship reflects the conversion of dissolved inorganic carbon species towards alkalinity ($HCO_3^-$) during the enhanced weathering process. Data in this plot were collected from the prototype unit as a fluidized bed.

Example 3: Alkalinity Versus Dissolved Inorganic Carbon (DIC) in Effluent from an Enhanced Weathering System The present disclosure provides an exemplary embodiment of the enhanced weathering systems and/or apparatus of the present disclosure for carbon dioxide capture corresponding to Exemplary Embodiment 2 (FIG. 19). In certain embodiments, the exemplary system of the present disclosure comprises a fluidized bed reactor. In other embodiments, the exemplary system of the present disclosure comprises a batch reactor. Alkalinity and dissolved inorganic carbon (DIC) of the effluent were observed and/or compared in the present example for both fluidized-bed (FIGS. 25A-25B) and batch (FIG. 26) reactors.

Fluidized Bed Reactors

Figure 25B:
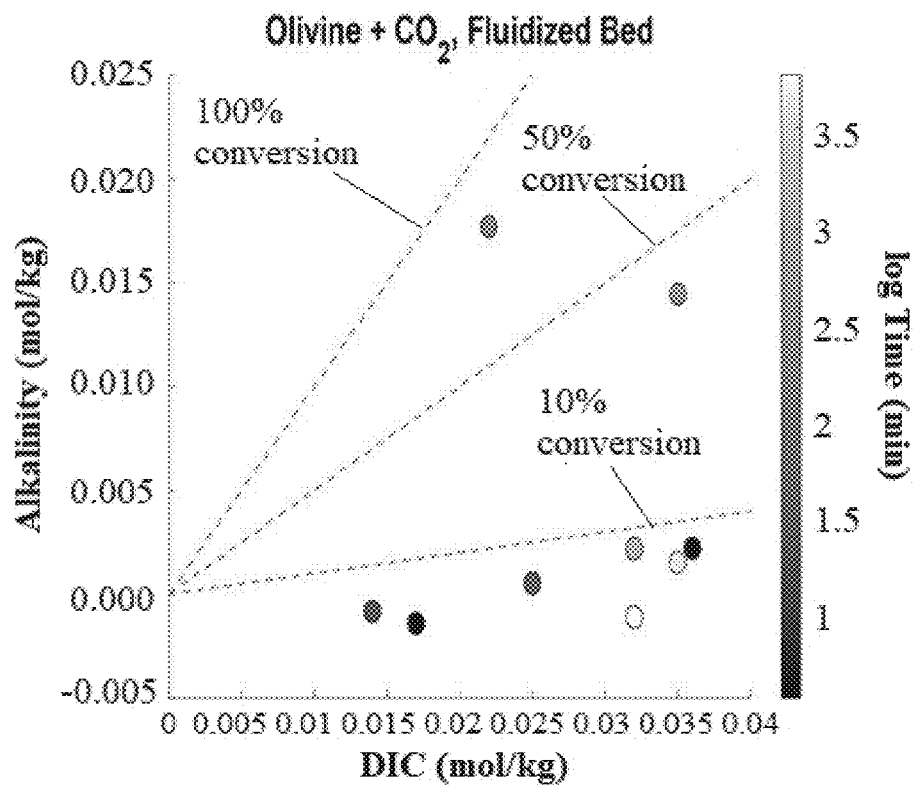

The present example describes data collected from an exemplary embodiment of the system and/or apparatus of the present disclosure comprising a fluidized-bed reactor. The exemplary experiment was conducted with medium-grained dolomitic limestone with a mean grain size of 200 μm (FIG. 25A) and with fine-grained olivine with a mean grain size of <63 μm (FIG. 25B). Gaseous $CO_2$ was bubbled into influent water (tap water) to increase the dissolved $CO_2$ concentration and thus DIC in the influent waters. These $CO_2$-charged fluids were then contacted with mineral feedstock with a flow rate of 1 L/m. This data indicates the time evolution of $CO_2$ capture as alkalinity is likely driven by the controllable factors such as reactor surface area, water:rock contact times, and flow rates.

Batch Reactor

Figure 26:
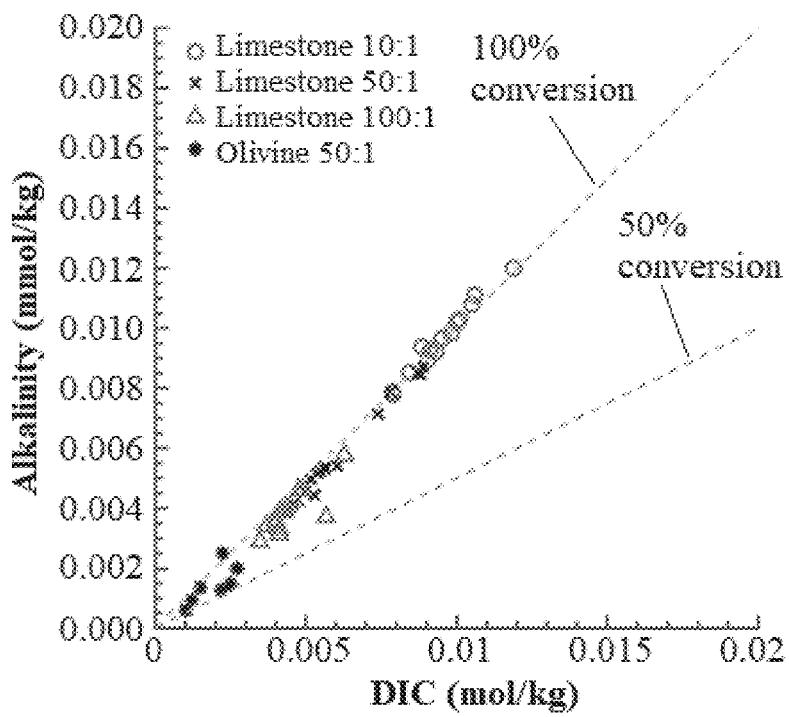
FIG. 26 provides a graph of measured data from actual experiments of the present disclosure showing alkalinity versus dissolved inorganic carbon (DIC) in the effluent reflecting the conversion of dissolved inorganic carbon species towards alkalinity ($HCO_3^-$) during the enhanced weathering process in batch reactors using medium-grained dolomitic limestone with a mean grain size 200 μm at varying water:rock ratios (i.e., 10:1 circles; 50:1 x's; and 100:1 triangles) and fine-grained olivine (<63 μm; stars).
Figure 27A:
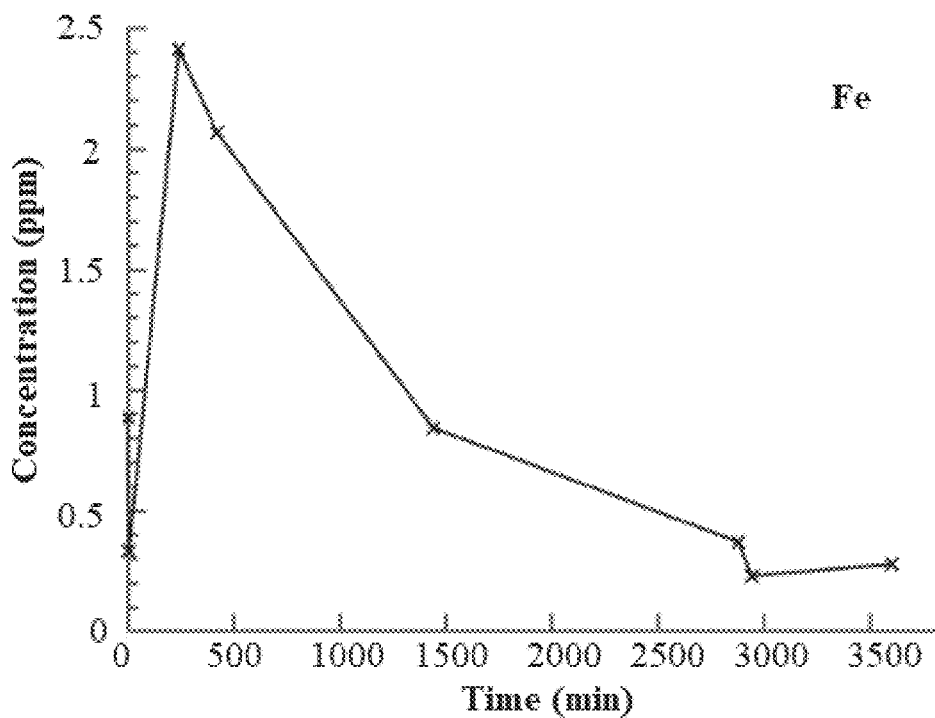
FIGS. 27A-27D provide graphs of measured data from actual experiments of the present disclosure depicting the release of Fe (FIG. 27A), Ni (FIG. 27B), Co (FIG. 27C), and Cr (FIG. 27D) during olivine dissolution over time in a batch reactor comprising olivine and deionized water acidified with HCl. The starting pH of this experiment after acidification was 3.3. When olivine is dissolved, Fe, Ni, Co, and Cr are released; as Fe oxidizes and is removed from solution in the form of Fe-oxides, Ni, Co, and Cr are also removed through adsorption onto the oxide surface.
Figure 27B:
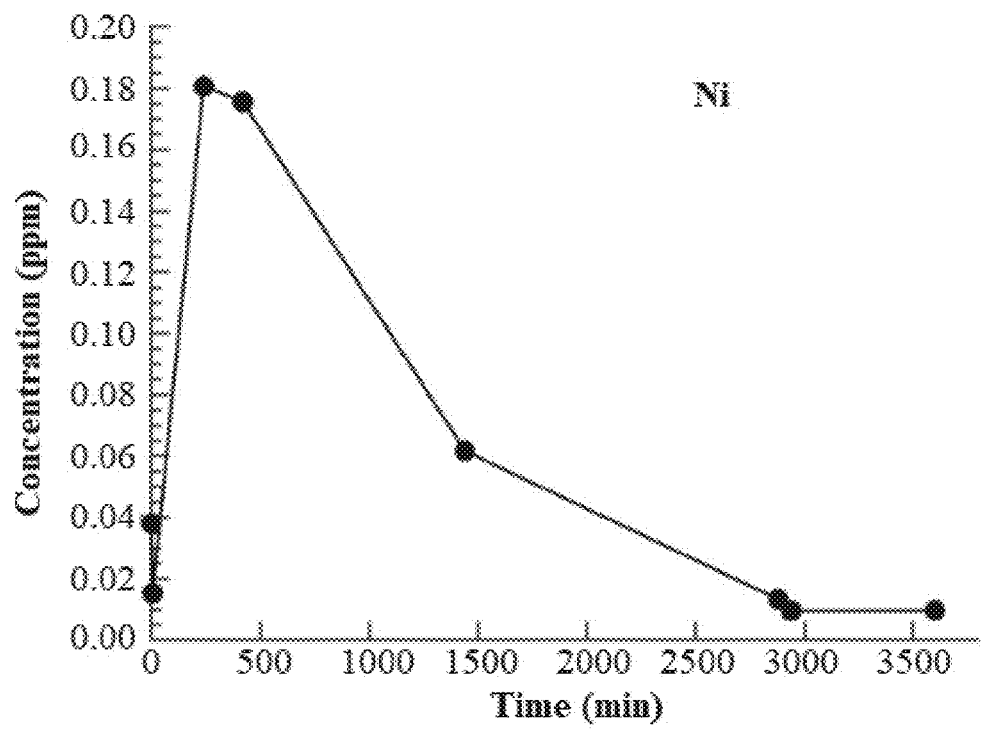
Figure 27C:
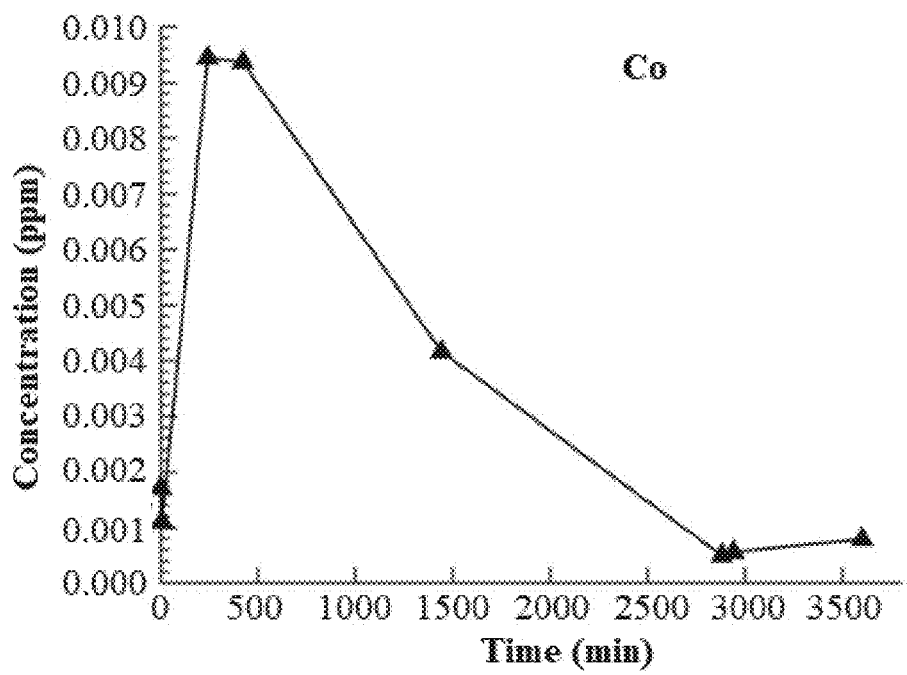
Figure 27D:
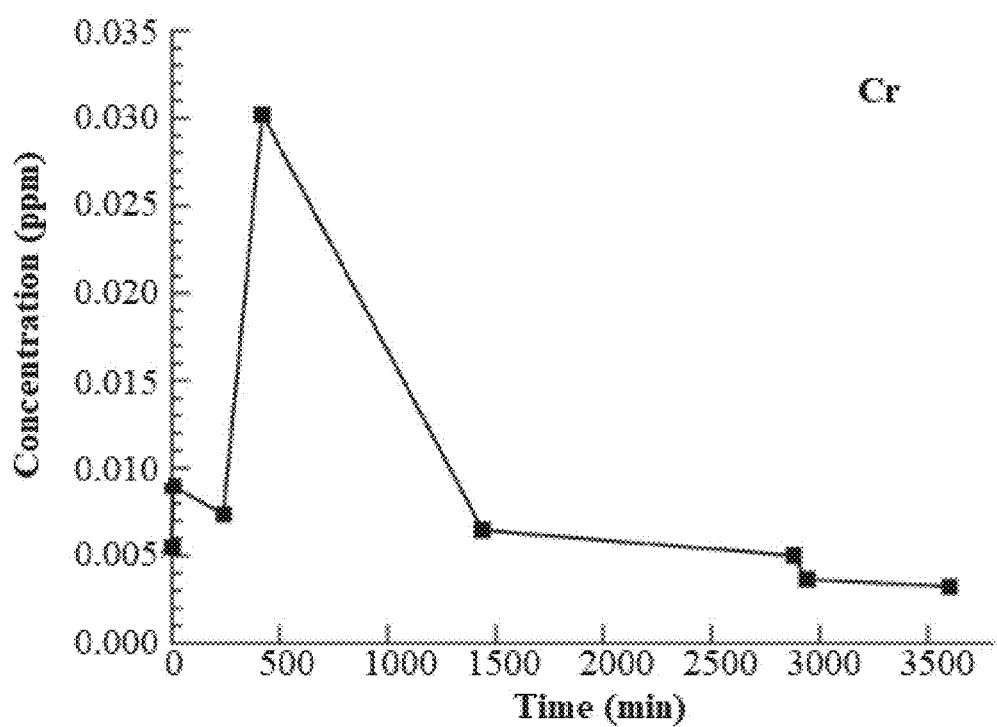

The present example describes data collected from an exemplary embodiment of the system and/or apparatus of the present disclosure comprising a batch reactor (FIG. 26). In the present example, medium-grained dolomitic limestone with a mean grain size 200 μm was employed at varying water:rock ratios and fine-grained olivine (<63 μm). The starting aqueous solution for the dolomitic limestone experiments was deionized water equilibrated with 0.01 mol/L dissolved inorganic carbon (DIC), sealed to prevent solution degassing, and acidified to a pH of 3.5 with 5% HCl (aq) to convert dissolved bicarbonate ($HCO_3^-$) to dissolved $CO_2$. The starting aqueous solution for the olivine experiments was wastewater collected from the incinerator stream of a local municipal wastewater treatment facility. These $CO_2$-charged fluids were then contacted with mineral feedstock. It was surprisingly discovered that approximately 50% to 100% $CO_2$ from aqueous solutions collected from the incinerator stream of a local municipal wastewater treatment facility was captured as alkalinity in olivine experiments.

Example 4: Release of Metals During Mineral Dissolution Using an Enhanced Weathering System and/or Apparatus As described elsewhere herein, upon contact with an acidic aqueous solution, metal impurities contained in a mineral feedstock can be released into the effluent. The present example describes the release of metals (i.e., Fe, Ni, Co, and Cr) during olivine dissolution over time in a batch reactor containing olivine and deionized water acidified with HCl (FIGS. 27A-27D). When olivine is dissolved, Fe, Ni, Co, and Cr are released. As Fe oxidizes and is removed from the aqueous solution in the form of iron oxides. Further, Ni, Co, and Cr are also removed from the aqueous solution through adsorption onto the oxide surface, permitting efficient removal of metals released after feedstock dissolution during enhanced weathering processes. This permits the use of the enhanced weathering systems, apparatuses, and/or methods of the present disclosure in settings that may otherwise be deemed unsafe for enhance weathering processes (e.g., agricultural and/or marine settings) as a consequence of high heavy metal concentrations (e.g., Ni, Co, and/or Cr). Surprisingly, this increases the utility of minerals with high heavy metal concentrations (e.g., ultramafic rocks), as such minerals can be used in enhanced weathering methods and may further serve as a potential as a source of metals relevant for battery manufacturing.

Example 5: Increase in pH and Alkalinity During Aqueous Solution Recirculation Using an Enhanced Weathering System and/or Apparatus The present disclosure provides an exemplary embodiment of the enhanced weathering systems and/or apparatus of the present disclosure for carbon dioxide capture corresponding to Exemplary Embodiment 2 (FIG. 19). In certain embodiments, the exemplary system of the present disclosure comprises a fluidized bed reactor. In other embodiments, the exemplary system of the present disclosure comprises a batch reactor. In other embodiments, the exemplary system of the present disclosure comprises a pulsed bed reactor. In other embodiments, the exemplary system of the present disclosure comprises a fixed bed reactor.

In the experiments provided herein, the increase in pH and alkalinity with flow recirculation throughout the course of the weathering process was observed and/or measured in a system and/or apparatus corresponding to Exemplary Embodiment 2 (FIG. 19). The experiments illustrate the effect of flow recirculation on pH adjustment and alkalinity increase, which corresponds to capture of $CO_2$ via enhanced weathering reactions (FIG. 2). The mineral feedstocks used in the present example included calcite (i.e., as representative of exemplary metal carbonate). More specifically, the feedstock used in the present example included coarse-grained calcitic limestone with a mean grain size of ~1,000 μm and fine-grained calcitic limestone with a mean grain size of <63 μm. The systems, apparatuses, and/or methods are not limited to the metal silicates and/or metal carbonates exemplified herein, and alternative metal silicates and/or metal carbonates are contemplated for successful use in the present disclosure. In the fluidized bed experiments, gaseous $CO_2$ was bubbled into influent water (tap water) to increase the dissolved $CO_2$ concentration in the influent waters. These $CO_2$-charged fluids were pumped through the fluidized-bed treatment container and contacted with mineral feedstock at a flow rate of 1 L/min. The initially treated effluent was then collected, recirculated, and newly contacted with mineral feedstock to promote additional enhanced weathering reactions.

With a starting pH of ~4.4, the influent is initially adjusted by ~1.1-1.3 pH units after initial contacting in the treatment container comprising calcitic limestone with a mean grain size of ~1,000 μm (Table 3). In Experiment 1, the flow was recirculated through a feedstock of similarly sized calcitic limestone with a mean grain size of ~1,000 μm (Table 3). Even in a surprisingly short treatment period (i.e., 300 minutes), pH increased another 0.14 pH units which suggested significant consumption of acidity given that pH is log scale. In Experiment 2, the flow was recirculated through a feedstock of finer-grained calcitic limestone with a mean grain size of <63 μm (Table 3). As with Experiment 1, pH increased another 0.34 pH even in a surprisingly short treatment period (i.e., 120 minutes). These results implied rapid conversion of dissolved $CO_2$ in the influent to bicarbonate ($HCO_3^-$; FIG. 2). This was confirmed with the measured increase in alkalinity (Table 3).

In Experiment 1, a 7-fold increase in alkalinity was observed in the first treatment step and an additional 1.2-fold increase in the recirculation step (Table 3). In Experiment 2, a 4-fold increase in alkalinity was observed in the first treatment step and an additional 2.25-fold increase in the recirculation step (Table 3). The rate and magnitude of pH and alkalinity change was unexpected and points to the controlling capabilities of the present disclosure and means of optimization via flow recirculation.

TABLE 3

Change in pH and alkalinity during aqueous solution recirculation using an enhanced weathering system and/or apparatus

| Experiment | 1 | 2 |
|---|---|---|
| Feedstock Type | Metal carbonate | Metal carbonate |
| Feedstock Mineral | Calcite | Calcite |
| Duration (min) | 300 | 120 |
| Initial Treatment Container Grain Size (μm) | 1000 | 1000 |
| Recirculated Treatment Container Grain Size (μm) | 1000 | <0.63 |
| Avg. Influent pH | 4.37 | 4.42 |
| Avg. Effluent pH; Initial Treatment Container | 5.73 | 5.58 |
| Avg. Effluent pH; Recirculated Treatment Container | 5.87 | 5.92 |
| Avg. Influent Alkalinity (mol/kg) | 0.001 | 0.001 |
| Avg. Effluent Alkalinity; Initial Treatment Container (mol/kg) | 0.007 | 0.004 |
| Avg. Effluent Alkalinity; Recirculated Treatment Container (mol/kg) | 0.012 | 0.009 |

Enumerated Embodiments

The following exemplary embodiments are provided, the numbering of which is not to be construed as designating levels of importance:

Embodiment 1 provides a method of at least partially sequestering $CO_2$ from an influent aqueous solution comprising aqueous and/or gaseous $CO_2$, the method comprising:
(a) measuring in the influent aqueous solution comprising dissolved aqueous and/or gaseous $CO_2$, at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g);
(b) feeding the influent aqueous solution through at least one container comprising a mineral feedstock, wherein the mineral feedstock comprises at least one selected from the group consisting of a metal silicate, a metal carbonate, and a metal oxide;
(c) contacting the influent aqueous solution with the mineral feedstock to provide an effluent aqueous solution comprising one or more metal ions and/or carbonate ions dissolved therein;
(d) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g);
(e) comparing the at least two measured parameters of the influent aqueous solution and the at least two measured parameters of the effluent aqueous solution to calculate a change in dissolved $CO_2$ concentration; and
(f) modifying at least one parameter of the influent aqueous solution and/or contacting step if the change comprises a decrease in dissolved $CO_2$ concentration of less than about 95%.

Embodiment 2 provides the method of Embodiment 1, further comprising measuring in the influent and effluent at least one parameter selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration,
wherein the dissolved metal is optionally at least one metal selected from the group consisting of calcium, magnesium, sodium, aluminum, nickel, iron, cobalt, and chromium, and
wherein the dissolved non-metal is optionally at least one non-metal or metalloid selected from the group consisting of phosphorus, silica, and oxygen.

Embodiment 3 provides the method of Embodiment 1 or 2, wherein at least one parameter selected from the group consisting of pH and alkalinity is measured in the effluent.

Embodiment 4 provides the method of any one of Embodiments 1-3, wherein the method is repeated beginning at step (b), by recirculation of the effluent to provide a recirculated effluent, if at least one of the following occurs:
(a) the pH of the effluent is less than about 8.5, 8.0, 7.5, or 7.0;
(b) the change comprises a decrease in dissolved $CO_2$ concentration of less than about 95%; and
(c) the alkalinity of the effluent aqueous solution is less than 5% different than the alkalinity in the influent aqueous solution.

Embodiment 5 provides the method of Embodiment 4, wherein at least one of the following applies:
(a) if the pH of the influent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the influent; and
(b) if the pH of the effluent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the recirculated effluent.

Embodiment 6 provides the method of Embodiment 5, wherein the acidifying agent is at least one selected from the group consisting of $CO_2$ (g), $CO_2$ (aq), an organic acid, and an inorganic acid.

Embodiment 7 provides the method of Embodiment 6, wherein the inorganic acid is at least one selected from the group consisting of $H_2CO_3$, $H_2SO_4$, $HNO_3$, HCl (aq), and HCl (g).

Embodiment 8 provides the method of any one of Embodiments 1-7, wherein the effluent is subjected to gas stripping if at least one of the following applies:
(a) the dissolved $CO_2$ concentration of the effluent is greater than the dissolved $CO_2$ concentration of the influent; and
(b) the partial pressure of $CO_2$ of the effluent is greater than atmospheric partial pressure of $CO_2$.

Embodiment 9 provides the method of any one of Embodiments 1-8, wherein at least one of the following applies:

(a) step (a) further comprises measuring in the influent at least one selected from the group consisting of dissolved metal concentration and dissolved non-metal or metalloid concentration; and (b) step (d) further comprises measuring in the effluent at least one selected from the group consisting of dissolved metal concentration and dissolved non-metal or metalloid concentration.

Embodiment 10 provides the method of Embodiment 9, further comprising treating the effluent to provide a second effluent, wherein the second effluent has at least one selected from the group consisting of a dissolved metal concentration and a dissolved non-metal or metalloid concentration which is less than that of the influent and/or effluent.

Embodiment 11 provides the method of Embodiment 10, wherein the treating comprises aerating the effluent.

Embodiment 12 provides the method of Embodiment 11, wherein the aeration results in formation of at least one selected from the group consisting of a metal oxide, a non-metal oxide, a metal hydroxide, a non-metal hydroxide, a metal oxyhydroxide, and a non-metal oxyhydroxide.

Embodiment 13 provides the method of Embodiment 12, wherein the metal or non-metal is at least one selected from the group consisting of P, Fe, Ni, Cr, and Co.

Embodiment 14 provides the method of any one of Embodiments 10-13, wherein the treating comprises contacting the effluent with at least one sorbent.

Embodiment 15 provides the method of Embodiment 14, wherein the at least one sorbent is selected from the group consisting of activated carbon, one or more clay minerals, and biochar, and combinations thereof.

Embodiment 16 provides the method of Embodiment 14 or 15, wherein the at least one sorbent adsorbs at least one metal or non-metal selected from the group consisting of P, Fe, Ni, Cr, and Co.

Embodiment 17 provides the method of any one of Embodiments 10-16, further comprising measuring in the second effluent at least two parameters selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), and optionally at least one selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

Embodiment 18 provides the method of any one of Embodiments 1-17, wherein the at least one container comprises at least two containers.

Embodiment 19 provides the method of Embodiment 18, wherein the at least two containers are arranged in series, parallel, or any combination thereof.

Embodiment 20 provides the method of Embodiment 19, wherein the at least two containers are arranged in series.

Embodiment 21 provides the method of Embodiment 20, wherein the metal silicate, metal carbonate, and/or metal oxide have a particle size which decreases in each subsequent container arranged in series, optionally wherein the particle size in an upstream container can be at least 2, 4, 6, 8, 10, 50, or 100 times larger than the particle size in a downstream container.

Embodiment 22 provides the method of any one of Embodiments 1-21, further comprising feeding the effluent or second effluent through at least one filter.

Embodiment 23 provides the method of Embodiment 22, wherein the filter has a porosity ranging from about 1 μm to about 100 μm, optionally wherein the porosity ranges from about 1 μm to about 50 μm.

Embodiment 24 provides the method of any one of Embodiments 1-23, wherein the influent aqueous solution comprising dissolved aqueous and/or gaseous $CO_2$ comprises at least one water source selected from the group consisting of municipal wastewater, industrial wastewater, rainwater, river water, lake water, freshwater, tap water, runoff, storm water, groundwater, and seawater.

Embodiment 25 provides the method of any one of Embodiments 1-24, wherein the metal carbonate has a formula of:

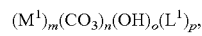

$(M^1)_m(CO_3)_n(OH)_o(L^1)_p$, wherein:

$M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^1$ can comprise one element, two identical elements, or two distinct elements;

$L^1$ is a neutral ligand, wherein the neutral ligand is optionally $H_2O$; and
wherein m, n, o, and p are each independently numbers which are selected such that the metal carbonate has a net zero charge, and
wherein each number is independently optionally an integer.

Embodiment 26 provides the method of any one of Embodiments 1-25, wherein the metal silicate has a formula of:

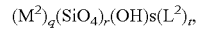

$(M^2)_q(SiO_4)_r(OH)s(L^2)_t$, wherein:

$M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^2$ can comprise one element, two identical elements, or two distinct elements;

$L^2$ is a neutral ligand, wherein the neutral ligand is optionally $H_2O$; and
wherein q, r, s, and t are each independently numbers which are selected such that the metal silicate has a net zero charge, and
wherein each number is independently optionally an integer.

Embodiment 27 provides the method of any one of Embodiments 1-26, wherein the metal oxide has a formula of:

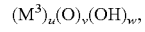

$(M^3)_u(O)_v(OH)_w$, wherein:

$M^3$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^3$ can comprise one element, two identical elements, or two distinct elements; and wherein u, v, and w are each independently numbers which are selected such that the metal oxide has a net zero charge, and
wherein each number is independently optionally an integer.

Embodiment 28 provides the method of any one of Embodiments 1-27, wherein the at least one container is agitated, wherein the agitation is optionally performed using at least one selected from the group consisting of an agitator, baffle, flow pulsator, aerator, and impellor.

Embodiment 29 provides the method of any one of Embodiments 1-28, further comprising increasing or decreasing influent or effluent flow rate.

Embodiment 30 provides the method of any one of Embodiments 1-29, wherein the metal oxide is at least one selected from the group consisting of magnesium oxide, sodium oxide, and calcium oxide.

Embodiment 31 provides the method of any one of Embodiments 1-30, wherein the metal silicate, metal carbonate, and/or metal oxide each independently have an average particle size ranging from about 1 micron to 100 mm.

Embodiment 32 provides the method of any one of the Embodiment 1-31, wherein measurement steps (a) and (d) are performed in discrete containers.

Embodiment 33 provides the method of any one of Embodiments 1-32, wherein at least one selected from the group consisting of turbidity and total suspended solids of the effluent is measured at a first time point and a second time point, wherein the first time point precedes the second time point.

Embodiment 34 provides the method of Embodiment 33, wherein the turbidity and/or total suspended solids measurements of the effluent are performed in the container in which influent and mineral feedstock contacting occurs.

Embodiment 35 provides the method of Embodiment 33, wherein the turbidity and/or total suspended solids measurements of the effluent are performed in a container other than that in which the influent and mineral feedstock contacting occurs.

Embodiment 36 provides the method of Embodiment 33 or 34, wherein if the turbidity and/or total suspended solids of the effluent at the second time point is substantially less than the turbidity and/or total suspended solids of the effluent at the first time point, mineral feedstock comprising at least one selected from the group consisting of a metal silicate, a metal carbonate, and a metal oxide is added to the at least one container.

Embodiment 37 provides the method of Embodiment 36, wherein the mineral feedstock is added to the at least one container manually as a solid or as a slurry, wherein the addition optionally occurs via a conveyor as a solid or via a pump as a slurry.

Embodiment 38 provides the method of Embodiment 37, wherein the feedstock slurry is made by mixing feedstock with at least one aqueous fluid selected from the group consisting of municipal wastewater, industrial wastewater, rainwater, river water, lake water, freshwater, tap water, runoff, storm water, groundwater, and seawater, and wherein the mineral feedstock comprises at least 1% (w/w) of the slurry.

Embodiment 39 provides the method of any one of Embodiments 1-38, wherein the effluent is discharged to at least one surface and/or underground body of water selected from the group consisting of a river, lake, ocean, sea, bay, groundwater, pond, stream, and wastewater reservoir.

Embodiment 40 provides the method of any one of Embodiments 1-39, wherein the at least one container comprises at least one selected from the group consisting of a fluidized bed reactor, a continuous stirred tank reactor, a batch reactor, a semi-batch reactor, a pulsed bed reactor, a fixed-bed reactor, and a plug flow reactor.

Embodiment 41 provides an aqueous solution treatment system comprising:
(a) an influent aqueous solution inlet connected to a container by an optionally sealable junction,
wherein the container comprises at least one optionally sealable inlet suitable for addition of at least one acidifying agent to an aqueous solution contained therein, and
wherein the container is suitable to contain a mineral feedstock, wherein the mineral feedstock comprises at least one selected from the group consisting of a metal silicate, a metal carbonate, and a metal oxide; and
(b) an effluent aqueous solution outlet connected to the container by an optionally sealable junction,
wherein each container is equipped with at least two sensors suitable to measure at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g), and optionally further suitable to measure at least one parameter of an aqueous solution contained therein selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration,
wherein the dissolved metal is optionally at least one metal selected from the group consisting of calcium, magnesium, nickel, iron, cobalt, chromium,
wherein the dissolved non-metal is optionally at least one non-metal or metalloid selected from the group consisting of phosphorus and silica, and
wherein each of the at least two sensors are positioned within the container at different distances from the inlet junction and/or outlet junction;
(c) a means for comparing the at least two measured parameters at two of the at least two sensors in the container to calculate a change in dissolved $CO_2$ concentration; and
(d) a means for controlling the change in dissolved $CO_2$ concentration.

Embodiment 42 provides the system of Embodiment 41, wherein the means for controlling the change in dissolved $CO_2$ concentration comprises at least one of the following:
(a) a closed loop process controller that modifies at least one measured parameter at the inlet junction; and
(b) a closed loop process controller that modifies at least one contacting condition in the container which is selected from the group consisting of flow rate of the influent aqueous solution, agitation rate, flow recirculation rate or schedule, concentration (w/v %) of the metal silicate, the metal carbonate, and/or the metal oxide in the mineral feedstock.

Embodiment 43 provides the system of Embodiment 41 or 42, wherein the system comprises at least two instances of the container, which are arranged in parallel, series, or a combination thereof, and wherein each additional instance of the container is connected to each additional container by an optionally sealable junction.

Embodiment 44 provides the system of any one of Embodiments 41-43, wherein the inlet and outlet junction of each instance of the container are positioned at opposing termini of the container.

Embodiment 45 provides the system of any one of Embodiments 41-44, wherein the system further comprises a recirculating line, wherein at least one of the following applies:
  (a) the recirculating line connects a first point and a second point of the container, wherein the first point and second point are positioned within the container at different distances from the inlet junction and/or outlet junction; and
  (b) the recirculating line connects two instances of the container in series;
  wherein the recirculating line comprises two termini which are each connected to the container with a sealable junctions.

Embodiment 46 provides the system of Embodiment 45, wherein the recirculating line permits upstream transfer of an aqueous solution.

Embodiment 47 provides the system of Embodiment 45 or 46, wherein the recirculating line facilitates recirculation of an aqueous solution contained therein upon detection of an aqueous solution having a pH less than about 8.5, 8.0, 7.5, or 7.0.

Embodiment 48 provides the system of any one of Embodiments 41-47, wherein each instance of the container is equipped with a means for agitating at least one of an aqueous solution contained therein and a mineral feedstock contained therein.

Embodiment 49 provides the system of Embodiment 48, wherein the means for agitating is selected from the group consisting of an agitator, baffle, and impellor.

Embodiment 50 provides the system of any one of Embodiments 41-49, wherein the effluent outlet optionally connects to an ancillary pH adjustment system suitable to modify effluent pH to within a desired range upon detection of an aqueous liquid having a pH greater than 5 but less than 8.

Embodiment 51 provides the system of any one of Embodiments 41-50, wherein each instance of the container is optionally connected to a mineral feedstock inlet by an optionally sealable junction.

Embodiment 52 provides the system of Embodiment 51, wherein the mineral feedstock inlet is connected to an aqueous mineral slurry container, wherein the aqueous mineral slurry container is equipped with a pump suitable to permit transfer of the aqueous mineral slurry contained therein to at least one instance of the container.

Embodiment 53 provides the system of any one of Embodiments 41-52, wherein the system further comprises at least one gas stripper.

Embodiment 54 provides the system of any one of Embodiments 41-53, wherein at least one instance of the container is equipped with a device suitable for aeration of an aqueous solution contained therein.

Embodiment 55 provides the system of any one of Embodiments 41-54, wherein the system further comprises an aeration container connected to at least one instance of the container by an optionally sealable junction.

Embodiment 56 provides the system of Embodiment 55, wherein the aeration container comprises a device suitable for aeration of an aqueous solution contained therein.

Embodiment 57 provides the system of any one of Embodiments 41-55, wherein the system further comprises a dissolved metal treatment container connected to at least one instance of the container by an optionally sealable junction.

Embodiment 58 provides the system of Embodiment 57, wherein the dissolved metal treatment container comprises at least one sorbent.

Embodiment 59 provides the system of Embodiment 58, wherein the at least one sorbent selected from the group consisting of activated carbon, one or more clay minerals, and biochar, and combinations thereof.

Embodiment 60 provides the system of Embodiment 58 or 59, wherein the at least one sorbent adsorbs at least one metal or non-metal selected from the group consisting of P, Fe, Ni, Cr, and Co.

Embodiment 61 provides the system of Embodiment 55 or 56, wherein the aeration container has an inlet which comprises the connection to at least one instance of the container, and an outlet which is optionally connected to at least one instance of the container.

Embodiment 62 provides the system of any one of Embodiments 57-60, wherein the dissolved metal treatment container has an inlet which comprises the connection to at least one instance of the container, and an outlet which is optionally connected to at least one instance of the container.

Embodiment 63 provides the system of any one of Embodiments 41-62, wherein each instance of the effluent outlet is equipped with at least one filter.

Embodiment 64 provides the system of Embodiment 63, wherein the filter has a porosity ranging from about 1 μm to about 100 μm, optionally wherein the porosity ranges from about 1 μm to about 50 μm.

Embodiment 65 provides the system of any one of Embodiments 41-64, wherein the influent aqueous solution inlet is connected to at least one water source selected from the group consisting of municipal wastewater, industrial wastewater, rainwater, river water, lake water, freshwater, tap water, runoff, storm water, groundwater, and seawater.

Embodiment 66 provides the system of any one of Embodiments 41-65, wherein the acidifying agent is at least one selected from the group consisting of $CO_2$ (g), $CO_2$ (aq), one or more organic acids, and one or more inorganic acids.

Embodiment 67 provides the system of any one of Embodiments 41-66, wherein the metal carbonate has a formula of:

$$(M^1)_m(CO_3)_n(OH)_o(L^1)_p,$$

wherein:
  $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
    wherein each occurrence of $M^1$ can comprise one element, two identical elements, or two distinct elements;
  $L^1$ is a neutral ligand, wherein the neutral ligand is optionally $H_2O$; and
    wherein m, n, o, and p are each independently numbers which are selected such that the metal carbonate has a net zero charge, and
    wherein each number is independently optionally an integer.

Embodiment 68 provides the system of any one of Embodiments 41-67, wherein the metal silicate has a formula of:

$$(M^2)_q(SiO_4)_r(OH)_s(L^2)_t,$$

wherein:
M² comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M² can comprise one element, two identical elements, or two distinct elements;
L² is a neutral ligand, wherein the neutral ligand is optionally H₂O; and
  wherein q, r, s, and t are each independently numbers which are selected such that the metal silicate has a net zero charge, and
  wherein each number is independently optionally an integer.

Embodiment 69 provides the system of any one of Embodiments 41-68, wherein the metal oxide has a formula of:

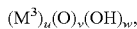

$(M^3)_u(O)_v(OH)_w$, wherein:
M³ comprises at least one element selected from the group consisting of a Group IA, Group IIA, Group IIIA, Group IVA, Group IB, Group IIB, Group IIIB, Group IVB, Group VB, Group VIB, and Group VIIIB element,
  wherein each occurrence of M³ can comprise one element, two identical elements, or two distinct elements; and
  wherein u, v, and w are each independently numbers which are selected such that the metal oxide has a net zero charge,
  wherein each number is independently optionally an integer.

Embodiment 70 provides the system of any one of Embodiments 41-69, wherein the metal oxide is at least one selected from the group consisting of magnesium oxide, sodium oxide, and calcium oxide.

Embodiment 71 provides the system of any one of Embodiments 41-70, wherein the system is a portable self-contained unit or incorporated into a non-portable structure.

Embodiment 72 provides a method of at least partially sequestering CO₂ from a gaseous CO₂ source, the method comprising:
(a) providing an optionally compressed gas stream comprising CO₂ at a concentration ranging from about 1% (v/v) to about 100% (v/v);
(b) feeding the compressed gas stream into an influent aqueous solution to provide a second influent aqueous solution comprising CO₂;
(c) measuring in the second influent aqueous solution at least two parameters selected from the group consisting of pH, alkalinity, dissolved CO₂ concentration, dissolved inorganic carbon (DIC) concentration, bicarbonate ion concentration, carbonate ion concentration, and partial pressure of CO₂ (g);
(d) feeding the second influent aqueous solution into at least one container comprising a mineral feedstock, wherein the mineral feedstock is selected from the group consisting of a metal silicate, a metal carbonate, and a metal oxide, and combinations thereof;
(e) contacting the second influent aqueous solution and the mineral feedstock in the container to form an effluent aqueous solution;
(f) measuring in the effluent aqueous solution at least two parameters selected from the group consisting of pH, alkalinity, dissolved CO₂ concentration, dissolved inorganic carbon (DIC) concentration, bicarbonate ion concentration, carbonate ion concentration, and partial pressure of CO₂ (g); and
(g) comparing the at least two measured parameters of the second influent aqueous solution and the at least two measured parameters of the effluent aqueous solution to calculate a change in dissolved CO₂ concentration; and
(h) modifying at least one parameter of the influent aqueous solution and/or contacting step if the change comprises a decrease in dissolved CO₂ concentration of less than about 95%.

Embodiment 73 provides the method of Embodiment 72, wherein the optionally compressed gas stream comprising CO₂ is obtained from at least one source selected from the group consisting of a direct air capture (DAC) unit, CO₂ from organic component combustion, direct CO₂ sources (e.g., flue gas), CO₂ from an industrial source, CO₂ captured from high-purity oxygen activate sludge process, CO₂ from hydrogen production, CO₂ from syngas production, and CO₂ from biogas production.

Embodiment 74 provides the method of Embodiment 73, wherein the direct air capture (DAC) unit is a liquid based DAC system or a solid based DAC system.

Embodiment 75 provides the method of any one of Embodiments 72-74, further comprising measuring in the second influent aqueous solution and/or effluent aqueous solution at least one parameter selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

Embodiment 76 provides the method of any one of Embodiments 72-75, wherein at least one parameter selected from the group consisting of pH and alkalinity is measured in the effluent.

Embodiment 77 provides the method of any one of Embodiments 72-76, wherein the method is repeated beginning at step (c), by recirculation of the effluent, if at least one of the following occurs:
(a) the pH of the effluent is less than about 8.5, 8.0, 7.5, or 7.0;
(b) the change comprises a decrease in dissolved CO₂ concentration of less than about 95%; and
(c) the alkalinity in the effluent aqueous solution is less than 5% different than the alkalinity in the influent aqueous solution.

Embodiment 78 provides the method of any one of Embodiments 72-77, wherein at least one of the following applies:
(a) if the pH of the second influent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the second influent; and
(b) if the pH of the effluent is greater than about 2.0, 2.5, 3.0, 3.5, 4.0, 4.5, 5.0, 5.5, 6.0, 6.5, or 7.0, at least one acidifying agent is added in a quantity sufficient to achieve a pH of less than about 8.5, 8.0, 7.5, or 7.0 in the recirculated effluent.

Embodiment 79 provides the method of Embodiment 78, wherein the acidifying agent is at least one selected from the group consisting of CO₂ (g), CO₂ (aq), one or more organic acids, and one or more inorganic acids.

Embodiment 80 provides the method of Embodiment 79, wherein the inorganic acid is at least one selected from the group consisting of $H_2CO_3$, $H_2SO_4$, $HNO_3$, HCl (aq), and HCl (g).

Embodiment 81 provides the method of any one of Embodiments 72-80, wherein the effluent is subjected to gas stripping if at least one of the following applies:
(a) the dissolved $CO_2$ concentration of the effluent is greater than the dissolved $CO_2$ concentration of the second influent; and
(b) the partial pressure of $CO_2$ of the effluent is greater than atmospheric partial pressure of $CO_2$.

Embodiment 82 provides the method of any one of Embodiments 72-81, wherein at least one of the following applies:
(a) step (c) further comprises measuring in the influent at least one selected from the group consisting of dissolved metal concentration and dissolved non-metal or metalloid concentration; and
(b) step (f) further comprises measuring in the effluent at least one selected from the group consisting of dissolved metal concentration and dissolved non-metal or metalloid concentration.

Embodiment 83 provides the method of Embodiment 82, further comprising treating the effluent to provide a second effluent, wherein the second effluent has at least one selected from the group consisting of a dissolved metal concentration and dissolved non-metal or metalloid concentration which is less than that of the influent and/or effluent.

Embodiment 84 provides the method of Embodiment 83, wherein the treating comprises aerating the effluent.

Embodiment 85 provides the method of Embodiment 84, wherein the aeration results in formation of at least one selected from the group consisting of a metal oxide, a non-metal oxide, a metal hydroxide, a non-metal hydroxide, a metal oxyhydroxide, and a non-metal oxyhydroxide.

Embodiment 86 provides the method of Embodiment 85, wherein the metal or non-metal is at least one selected from the group consisting of P, Fe, Ni, Cr, and Co.

Embodiment 87 provides the method of Embodiment 83, wherein the treating comprises contacting the effluent with at least one sorbent.

Embodiment 88 provides the method of Embodiment 87, wherein the at least one sorbent is selected from the group consisting of activated carbon, one or more clay minerals, and biochar, and combinations thereof.

Embodiment 89 provides the method of Embodiment 87 or 88, wherein the at least one sorbent adsorbs at least one metal or non-metal selected from the group consisting of P, Fe, Ni, Cr, and Co.

Embodiment 90 provides the method of any one of Embodiments 83-89, further comprising measuring in the second effluent at least two parameters selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), and optionally at least one selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

Embodiment 91 provides the method of any one of Embodiments 72-90, wherein the at least one container comprises at least two containers.

Embodiment 92 provides the method of Embodiment 72-91, wherein the at least two containers are arranged in series, parallel, or any combination thereof.

Embodiment 93 provides the method of Embodiment 92, wherein the at least two containers are arranged in series.

Embodiment 94 provides the method of Embodiment 93, wherein the metal silicate, metal carbonate, and/or metal oxide have a particle size which decreases in each subsequent container arranged in series, optionally wherein the particle size in an upstream container can be at least 2, 4, 6, 8, 10, 50, or 100 times larger than the particle size in a downstream container.

Embodiment 95 provides the method of any one of Embodiments 72-94, further comprising feeding the effluent or second effluent through at least one filter.

Embodiment 96 provides the method of Embodiment 95, wherein the filter has a porosity ranging from about 1 µm to about 100 µm, optionally wherein the porosity ranges from about 1 µm to about 50 µm.

Embodiment 97 provides the method of any one of Embodiments 72-96, wherein the influent aqueous solution comprising $CO_2$ comprises at least one water source selected from the group consisting of municipal wastewater, industrial wastewater, rainwater, river water, lake water, freshwater, tap water, runoff, storm water, groundwater, and seawater.

Embodiment 98 provides the method of any one of Embodiments 72-97, wherein the metal carbonate has a formula of:

$$(M^1)_m(CO_3)_n(OH)_o(L^1)_p,$$

wherein: $M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element, wherein each occurrence of $M^1$ can comprise one element, two identical elements, or two distinct elements; $L^1$ is a neutral ligand, wherein the neutral ligand is optionally $H_2O$; and wherein m, n, o, and p are each independently numbers which are selected such that the metal carbonate has a net zero charge, and wherein each number is independently optionally an integer.

Embodiment 99 provides the method of any one of Embodiments 72-98, wherein the metal silicate has a formula of:

$$(M^2)_q(SiO_4)_r(OH)_s(L^2)_t,$$

wherein: $M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element, wherein each occurrence of $M^2$ can comprise one element, two identical elements, or two distinct elements; $L^2$ is a neutral ligand, wherein the neutral ligand is optionally $H_2O$; and wherein q, r, s, and t are each independently numbers which are selected such that the metal silicate has a net zero charge, wherein each number is independently optionally an integer.

Embodiment 100 provides the method of any one of Embodiments 72-99, wherein the metal oxide has a formula of:

$$(M^3)_u(O)_v(OH)_w,$$

wherein: $M^3$ comprises at least one element selected from the group consisting of a Group IA, Group IIA, Group IIIA, Group IVA, Group IB, Group IIB, Group IIIB, Group IVB, Group VB, Group VIB, and Group VIIIB element, wherein each occurrence of $M^3$ can comprise one element, two identical elements, or two distinct elements; and wherein u, v, and w are each independently numbers which are selected such that the metal oxide has a net zero charge, and wherein each number is independently optionally an integer.

Embodiment 101 provides the method of any one of Embodiments 72-100, wherein the metal oxide is at least one selected from the group consisting of magnesium oxide, sodium oxide, and calcium oxide.

Embodiment 102 provides the method of any one of Embodiments 72-101, wherein the metal silicate, metal carbonate, and/or metal oxide each independently have an average particle size ranging from about 1 micron to 100 mm.

Embodiment 103 provides the method of any one of Embodiments 72-102, wherein measurement steps (a) and (d) are performed in discrete containers.

Embodiment 104 provides the method of any one of Embodiments 72-103, wherein at least one selected from the group consisting of turbidity and total suspended solids of the effluent is measured at a first time point and a second time point, wherein the first time point precedes the second time point.

Embodiment 105 provides the method of Embodiment 104, wherein if the turbidity and/or total suspended solids of the effluent at the second time point is substantially less than the turbidity or total suspended solids of the effluent at the first time point, mineral feedstock comprising at least one selected from the group consisting of a metal silicate, a metal carbonate, and a metal oxide is added to the at least one container.

Embodiment 106 provides the method of Embodiment 105, wherein the mineral feedstock is added to the at least one container manually as a solid or as a slurry, wherein the addition optionally occurs via a conveyor as a solid, or via a pump as a slurry.

Embodiment 107 provides the method of Embodiment 106, wherein the mineral feedstock slurry is made by mixing feedstock with at least one aqueous fluid selected from the group consisting of municipal wastewater, industrial wastewater, rainwater, river water, lake water, freshwater, tap water, runoff, storm water, groundwater, and seawater, and wherein the mineral feedstock comprises at least 1% (w/w) of the slurry.

Embodiment 108 provides the method of any one of Embodiments 72-107, wherein the effluent is discharged to at least one surface and/or underground body of water selected from the group consisting of a river, lake, ocean, sea, bay, groundwater, pond, stream, and wastewater reservoir.

Embodiment 109 provides the method of any one of Embodiments 72-108, wherein the at least one container comprises at least one selected from the group consisting of a fluidized bed reactor, a continuous stirred tank reactor, a batch reactor, a semi-batch reactor, a pulsed bed reactor, a fixed-bed reactor, and a plug flow reactor.

Embodiment 110 provides a method of optimizing the design and operation of a system for at least partial sequestration of $CO_2$ from a water source, the method comprising:
 (a) determining values for at least two parameters of the water source;
 (b) determining at least one parameter related to selecting, transporting, and procuring at least one mineral feedstock, wherein the at least one mineral feedstock comprises a metal silicate, a metal carbonate, and a metal oxide, or any combination thereof;
 (c) performing a geospatial information systems (GIS) transport network analysis of the at least one parameter related to selecting, transporting and procuring the at least one mineral feedstock;
 (d) calculating a weathering model of the at least two parameters of the water source and the GIS transport network analysis results; and
 (e) designing and operating an aqueous solution treatment system comprising at least one container for at least partially sequestering $CO_2$ from the source of water according to an output of the weathering model.

Embodiment 111 provides the method of Embodiment 110, wherein the aqueous solution treatment system further comprises the system of any one of Embodiments 41-71.

Embodiment 112 provides the method of Embodiment 111, further comprising:
 (f) measuring at least two parameters of an effluent stream from the aqueous solution treatment system;
 (g) updating the reactive transport model with the measured at least two parameters of the effluent stream; and
 (h) recalculating the weathering model based on the updated reactive transport model.

Embodiment 113 provides the method of Embodiment 111 or 112, wherein the at least two parameters of the water source are selected from the group consisting pH, alkalinity, dissolved $CO_2$ concentration, dissolved inorganic carbon (DIC) concentration, bicarbonate ion concentration, carbonate ion concentration, temperature, and partial pressure of $CO_2$ (g).

Embodiment 114 provides the method of any one of Embodiments 111-113, wherein the at least two parameters of the effluent stream are selected from the group consisting of pH, alkalinity, dissolved $CO_2$ concentration, dissolved inorganic carbon (DIC) concentration, bicarbonate ion concentration, carbonate ion concentration, temperature, and partial pressure of $CO_2$ (g).

Embodiment 115 provides the method of any one of Embodiments 110-114, wherein the at least one parameter related to procuring at least one mineral feedstock is selected from the group consisting of a mineral-based feedstock type, a feedstock cost, a feedstock $CO_2$ capture rate, and a distance between a feedstock source and the water source to be treated.

Embodiment 116 provides the method of any one of Embodiments 110-115, wherein the weathering model generates a target average particle grind size of the at least one mineral feedstock.

Embodiment 117 provides the method of any one of Embodiments 110-116, wherein the weathering model generates a flow design for the aqueous solution treatment system comprising at least one of a recirculation rate for the effluent stream or an agitation rate for the at least one container.

Embodiment 118 provides the method of any one of Embodiments 110-117, wherein the weathering model comprises an additive and feedstock application model, comprising at least one of a feedstock application rate, an acid addition rate to the aqueous solution treatment system, or a $CO_2$ addition rate to the aqueous solution treatment system.

Embodiment 119 provides the method of any one of Embodiments 110-118, wherein the water source is at least one selected from the group consisting of municipal wastewater, industrial wastewater, rainwater, river water, lake water, freshwater, tap water, runoff, storm water, ground water, and seawater.

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

What is claimed is:

1. A method of at least partially sequestering $CO_2$ from an influent aqueous solution comprising aqueous or gaseous $CO_2$, the method comprising:
   (a) measuring in the influent aqueous solution comprising dissolved aqueous or gaseous $CO_2$, at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g);
   (b) feeding the influent aqueous solution through at least one container comprising a mineral feedstock, wherein the mineral feedstock comprises at least one selected from the group consisting of a metal silicate, a metal carbonate, and a metal oxide;
   (c) contacting the influent aqueous solution with the mineral feedstock to provide an effluent aqueous solution comprising one or more metal ions or carbonate ions dissolved therein;
   (d) measuring in the effluent aqueous solution at least two parameters selected from the group consisting of pH, alkalinity, dissolved $CO_2$ concentration, dissolved inorganic carbon (DIC) concentration, bicarbonate ion concentration, carbonate ion concentration, and partial pressure of $CO_2$ (g);
   (e) comparing the at least two measured parameters of the influent aqueous solution and the at least two measured parameters of the effluent aqueous solution to calculate a change in dissolved $CO_2$ concentration; and
   (f) modifying at least one parameter of the influent aqueous solution or contacting step if the change comprises a decrease in dissolved $CO_2$ concentration of less than about 95% wherein:
      (i) the at least one parameter of the influent aqueous solution or contacting step is selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), temperature, turbidity, total suspended solids, conductivity, and mineral feedstock particle size; and
      (ii) the modifying comprises at least one selected from the group consisting of acidification, carbonation, aeration, agitation, addition of mineral feedstock, temperature modification, and flow rate modification.

2. The method of claim 1, further comprising measuring in the influent and effluent at least one parameter selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration,
   wherein the dissolved metal is optionally at least one metal selected from the group consisting of calcium, magnesium, sodium, aluminum, nickel, iron, cobalt, and chromium, and
   wherein the dissolved non-metal is optionally at least one non-metal or metalloid selected from the group consisting of phosphorus, silica, and oxygen.

3. The method of claim 1, wherein the method is repeated beginning at step (b), by recirculation of the effluent to provide a recirculated effluent, if at least one of the following occurs:
   (a) the pH of the effluent is less than about 8.5;
   (b) the change comprises a decrease in dissolved $CO_2$ concentration of less than about 95%; and
   (c) the alkalinity of the effluent aqueous solution is less than 5% different than the alkalinity in the influent aqueous solution.

4. The method of claim 3, wherein at least one of the following applies:
   (a) if the pH of the influent is greater than about 7.0, at least one acidifying agent is added to the influent in a quantity sufficient to achieve a pH of less than about 7.0 in the influent; and
   (b) if the pH of the effluent is greater than about 7.0, at least one acidifying agent is added to the effluent in a quantity sufficient to achieve a pH of less than about 7.0 in the recirculated effluent.

5. The method of claim 1, wherein the effluent is subjected to gas stripping if at least one of the following applies:
   (a) the dissolved $CO_2$ concentration of the effluent is greater than the dissolved $CO_2$ concentration of the influent; and
   (b) the partial pressure of $CO_2$ of the effluent is greater than atmospheric partial pressure of $CO_2$.

6. The method of claim 1, wherein at least one of the following applies:
   (a) step (a) further comprises measuring in the influent at least one selected from the group consisting of dissolved metal concentration and dissolved non-metal or metalloid concentration; and
   (b) step (d) further comprises measuring in the effluent at least one selected from the group consisting of dissolved metal concentration and dissolved non-metal or metalloid concentration,
   further comprising treating the effluent to provide a second effluent,
   wherein the second effluent has at least one selected from the group consisting of a dissolved metal concentration and a dissolved non-metal or metalloid concentration which is less than that of the influent or effluent, and
   wherein the treatment of the effluent is selected from the group consisting of aeration and addition of a sorbent.

7. The method of claim 6, further comprising measuring in the second effluent at least two parameters selected from the group consisting of pH, alkalinity, dissolved $CO_2$ concentration, dissolved inorganic carbon (DIC) concentration, bicarbonate ion concentration, carbonate ion concentration, partial pressure of $CO_2$ (g), and optionally at least one selected from the group consisting of temperature, conductivity, turbidity, salinity, dissolved oxygen concentration, total suspended solids concentration, total dissolved solids concentration, hardness, dissolved metal concentration, and dissolved non-metal or metalloid concentration.

8. The method of claim 1, wherein the at least one container comprises at least two containers arranged in series, parallel, or combination thereof.

9. The method of claim 8, wherein the metal silicate, metal carbonate, or metal oxide has a particle size which decreases in each subsequent container arranged in series, optionally wherein the particle size in an upstream container can be at least 2 times larger than the particle size in a downstream container.

10. The method of claim 1, wherein the influent aqueous solution comprising dissolved aqueous or gaseous $CO_2$ comprises at least one water source selected from the group consisting of municipal wastewater, industrial wastewater, rainwater, river water, lake water, freshwater, tap water, runoff, storm water, groundwater, and seawater.

11. The method of claim 1, wherein the metal carbonate has a formula of:

$$(M^1)_m(CO_3)_n(OH)_o(L^1)_p,$$

wherein:
$M^1$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^1$ can comprise one element, two identical elements, or two distinct elements;
$L^1$ is a neutral ligand, wherein the neutral ligand is optionally $H_2O$; and
wherein m, n, o, and p are each independently numbers which are selected such that the metal carbonate has a net zero charge, and
wherein each number is independently optionally an integer.

12. The method of claim 1, wherein the metal silicate has a formula of:

$$(M^2)_q(SiO_4)_r(OH)_s(L^2)_t,$$

wherein:
$M^2$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^2$ can comprise one element, two identical elements, or two distinct elements;
$L^2$ is a neutral ligand, wherein the neutral ligand is optionally $H_2O$; and
wherein q, r, s, and t are each independently numbers which are selected such that the metal silicate has a net zero charge, and
wherein each number is independently optionally an integer.

13. The method of claim 1, wherein the metal oxide has a formula of:

$$(M^3)_u(O)_v(OH)_w,$$

wherein:
$M^3$ comprises at least one element selected from the group consisting of a Group IA, Group IIA, Group IIIA, Group IVA, Group IB, Group IIB, Group IIIB, Group IVB, Group VB, Group VIB, and Group VIIIB element,
wherein each occurrence of $M^3$ can comprise one element, two identical elements, or two distinct elements; and
wherein u, v, and w are each independently numbers which are selected such that the metal oxide has a net zero charge, and
wherein each number is independently optionally an integer.

14. The method of claim 1, wherein the at least one container is agitated,
wherein the agitation is optionally performed using at least one selected from the group consisting of an agitator, baffle, flow pulsator, aerator, and impellor.

15. The method of claim 1, wherein the at least one parameter of the influent aqueous solution or contacting step is turbidity or conductivity and the modification is influent aqueous solution flow rate.

16. The method of claim 1, wherein the metal silicate, metal carbonate, or metal oxide each independently have an average particle size ranging from about 1 micron to 100 mm.

17. The method of claim 1, wherein turbidity or total suspended solids measurements of the effluent are performed at a first time point.

18. The method of claim 17, wherein turbidity or total suspended solids measurements are performed at a second time point,
wherein if the turbidity or total suspended solids of the effluent at the second time point is substantially less than the turbidity or total suspended solids of the effluent at the first time point, mineral feedstock comprising at least one selected from the group consisting of a metal silicate, a metal carbonate, and a metal oxide is added to the at least one container.

19. The method of claim 1, wherein the effluent is discharged to at least one surface or underground body of water selected from the group consisting of a river, lake, ocean, sea, bay, groundwater, pond, stream, and wastewater reservoir,
wherein the discharge occurs after measurement of the at least two parameters of the effluent.

20. The method of claim 1, wherein the at least one container comprises at least one selected from the group consisting of a fluidized bed reactor, a continuous stirred tank reactor, a batch reactor, a semi-batch reactor, a pulsed bed reactor, a fixed-bed reactor, and a plug flow reactor.

* * * * *